(12) United States Patent
White et al.

(10) Patent No.: US 10,495,163 B2
(45) Date of Patent: Dec. 3, 2019

(54) TONE RING AND ATTACHMENT STRUCTURE

(71) Applicant: Hendrickson USA, L.L.C., Itasca, IL (US)

(72) Inventors: Jay D. White, Massillon, OH (US); Dhawal P. Dharaiya, Twinsburg, OH (US); Matthew P. Karich, Fairlawn, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 10 days.

(21) Appl. No.: 15/962,069

(22) Filed: Apr. 25, 2018

(65) Prior Publication Data

US 2018/0313417 A1 Nov. 1, 2018

Related U.S. Application Data

(60) Provisional application No. 62/639,134, filed on Mar. 6, 2018, provisional application No. 62/490,064, filed on Apr. 26, 2017.

(51) Int. Cl.
*F16D 65/12* (2006.01)
*B05D 1/04* (2006.01)
(Continued)

(52) U.S. Cl.
CPC ............. *F16D 65/123* (2013.01); *B05D 1/04* (2013.01); *B05D 3/005* (2013.01); *C09D 5/106* (2013.01);
(Continued)

(58) Field of Classification Search
CPC .... F16D 65/123; F16D 65/128; F16D 65/847; F16D 65/0025; B05D 1/04; B05D 3/005; C09D 5/106
(Continued)

(56) References Cited

U.S. PATENT DOCUMENTS 5,053,656 A 10/1991 Hodge
5,166,611 A 11/1992 Kujawa, Jr. et al.
(Continued)

FOREIGN PATENT DOCUMENTS

DE 4445236 C1 12/1994
EP 0614715 A1 4/1994
(Continued)

*Primary Examiner* — Vishal R Sahni
(74) *Attorney, Agent, or Firm* — Dureska & Moore, LLC; David P. Dureska; Greg Strugalski

(57) ABSTRACT

A tone ring attachment for a disc brake rotor. The disc brake rotor has a disc portion that includes a plurality of circumferentially-spaced lugs. Each one of the lugs has a groove. A discrete tone ring body has a plurality of bosses. Each one of the bosses is receivable in a respective one of the grooves in the lugs. A dart projection extends from at least one of the bosses. The dart projection engages a respective one of the lugs to inhibit relative axial movement and relative rotational movement in at least one direction between the tone ring and the disc brake rotor. A tab is formed on at least one of the bosses. The tab is engageable with a portion of the lug to inhibit relative rotational movement in a second direction opposite the first direction between the tone ring and disc brake rotor.

34 Claims, 35 Drawing Sheets

(51) Int. Cl.
  *B05D 3/00* (2006.01)
  *C09D 5/10* (2006.01)
  *F16D 65/847* (2006.01)
  *F16D 65/00* (2006.01)
  *F16D 65/02* (2006.01)

(52) U.S. Cl.
  CPC ....... *F16D 65/0025* (2013.01); *F16D 65/128* (2013.01); *F16D 65/847* (2013.01); *F16D 2065/1328* (2013.01); *F16D 2065/1392* (2013.01); *F16D 2200/0021* (2013.01)

(58) Field of Classification Search
  USPC .................................................. 188/218 XL
  See application file for complete search history.

(56) References Cited

U.S. PATENT DOCUMENTS

| | | | |
|---|---|---|---|
| 6,135,247 A | 10/2000 | Bodin et al. | |
| 6,467,588 B1 | 10/2002 | Baumgartner et al. | |
| 6,498,475 B2 | 12/2002 | Foster et al. | |
| 6,619,440 B2 | 9/2003 | Antony et al. | |
| 6,642,709 B2 | 11/2003 | Heimann, Jr. et al. | |
| 7,219,778 B2 | 5/2007 | Pete et al. | |
| 7,306,293 B2 | 12/2007 | Redgrave | |
| 7,487,862 B2 | 2/2009 | Carlson et al. | |
| 7,980,367 B2 | 7/2011 | Hester | |
| 7,997,391 B2 | 8/2011 | Burgoon et al. | |
| 8,020,676 B2 | 9/2011 | Bradley et al. | |
| 8,800,728 B2 * | 8/2014 | Dharaiya | C23C 30/00 188/251 R |
| 9,506,515 B2 * | 11/2016 | White | F16D 65/128 |
| 2003/0052562 A1 | 3/2003 | Antony et al. | |
| 2004/0178031 A1 | 9/2004 | Gotti et al. | |
| 2006/0272906 A1 | 12/2006 | Gonska | |
| 2009/0218183 A1 | 9/2009 | Burgoon et al. | |
| 2011/0067963 A1 | 3/2011 | Pahle | |
| 2012/0228070 A1 * | 9/2012 | Dharaiya | C23C 30/00 188/251 R |
| 2014/0326551 A1 * | 11/2014 | Anderson | F16D 65/12 188/218 XL |
| 2015/0021128 A1 * | 1/2015 | White | F16D 65/128 188/218 XL |
| 2017/0122390 A1 * | 5/2017 | Maronati | B60T 8/329 |

FOREIGN PATENT DOCUMENTS

| | | |
|---|---|---|
| EP | 0666478 A1 | 1/1995 |
| EP | 1088725 A1 | 9/2000 |

* cited by examiner

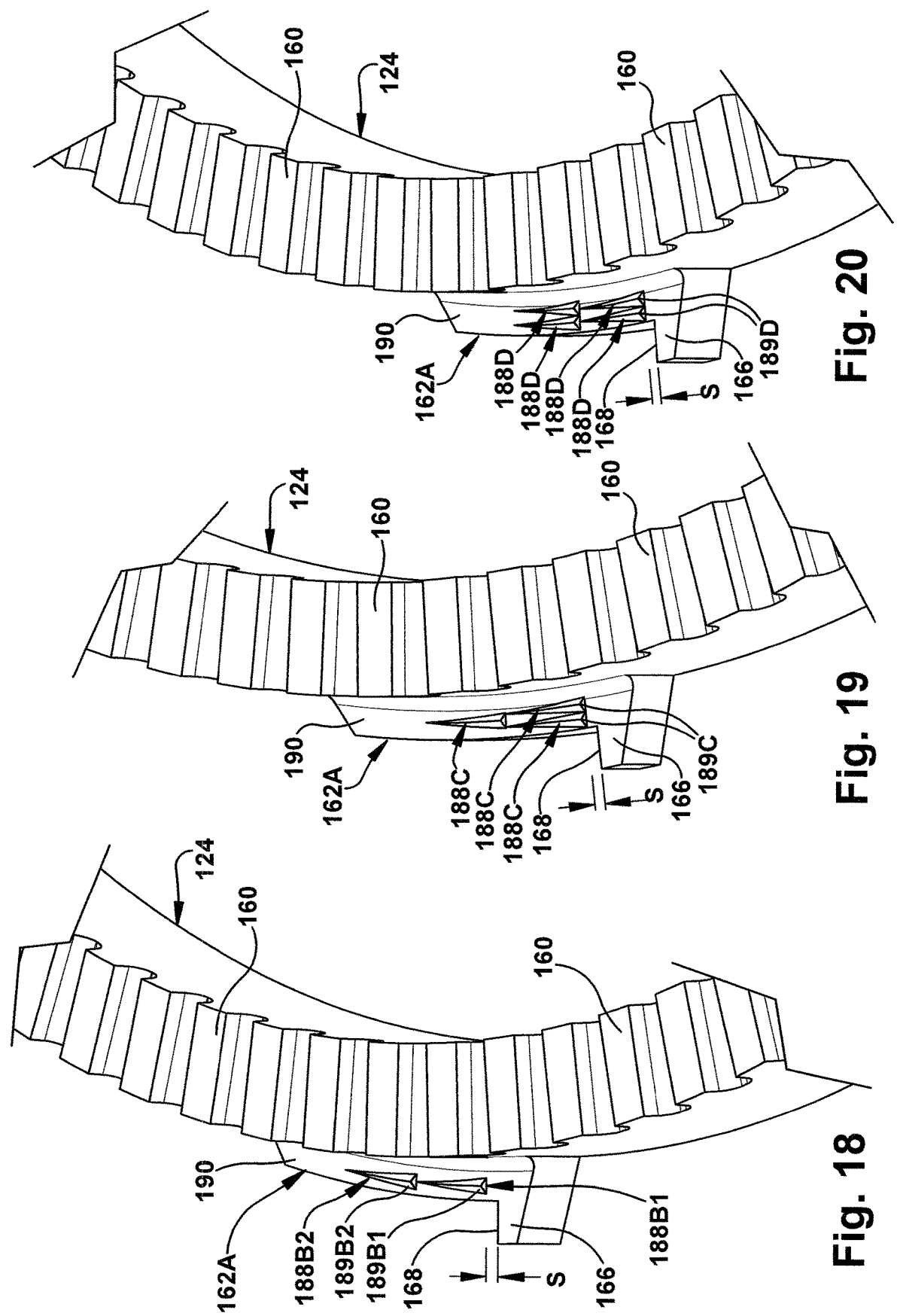

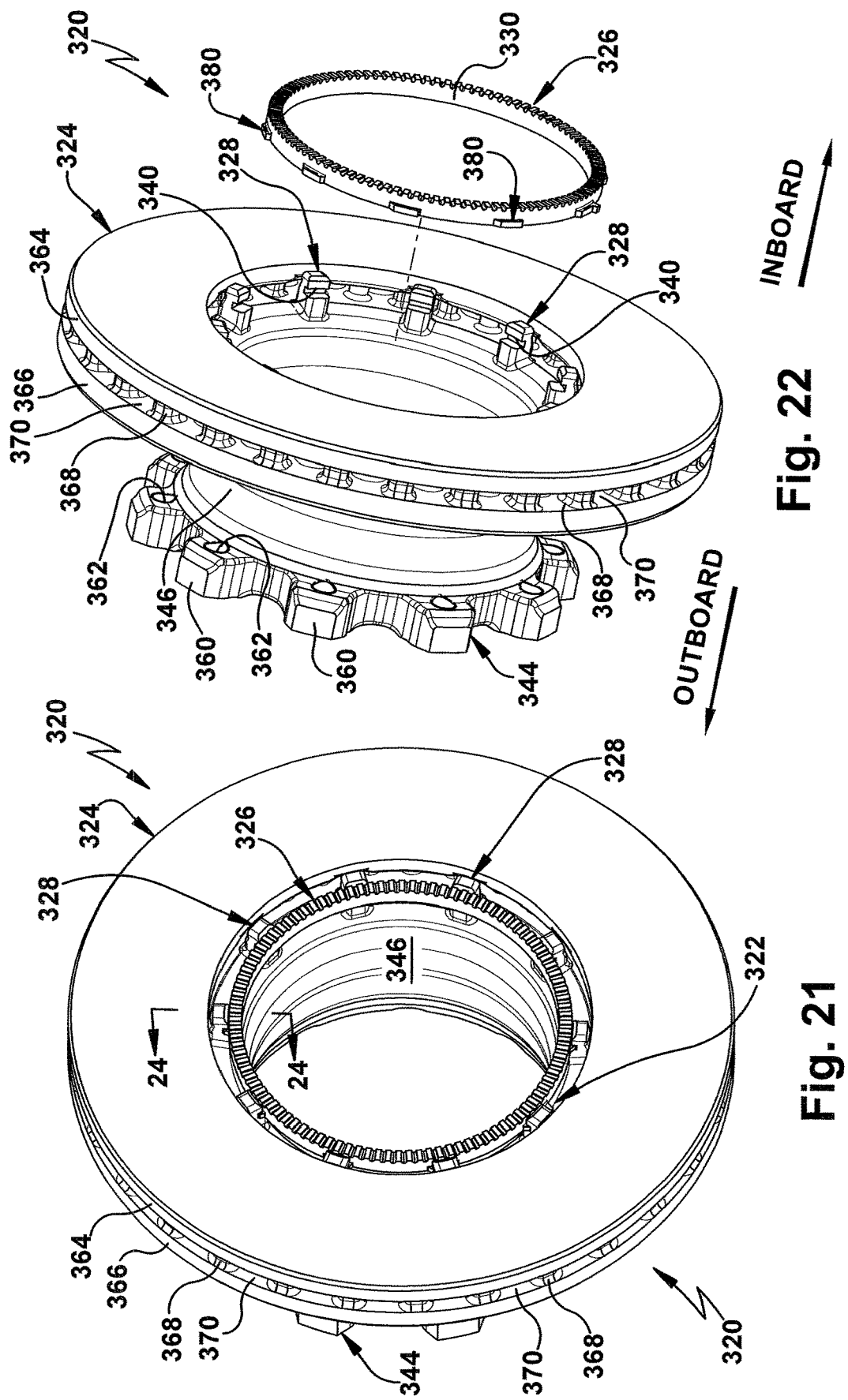

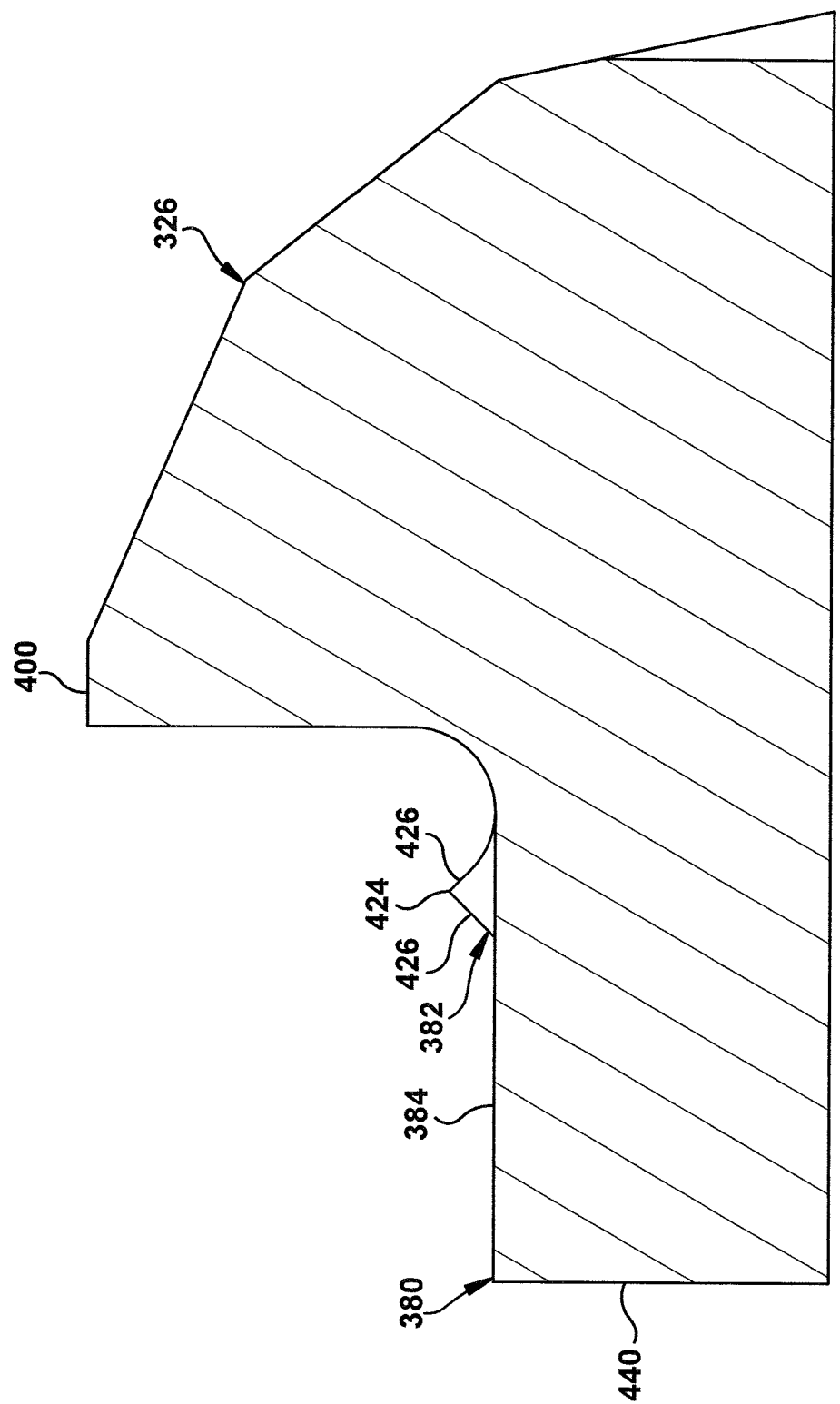

TONE RING AND ATTACHMENT STRUCTURE

CROSS-REFERENCE TO RELATED APPLICATIONS

This application claims the benefit of U.S. Provisional Patent Application Ser. No. 62/490,064, filed Apr. 26, 2017 and U.S. Provisional Patent Application Ser. No. 62/639,134, filed Mar. 6, 2018.

BACKGROUND

Technical Field

The subject matter relates generally to antilock braking systems for vehicles. In particular, the subject matter relates to structure for mounting an antilock braking system tone ring to a disc brake rotor used on heavy-duty vehicles.

Background

Antilock braking systems (ABS) are common equipment on many types of vehicles ranging from automobiles to heavy-duty vehicles. Heavy-duty vehicles include trailers, trucks and semi-trailers. Some government regulations require at least one axle of a heavy-duty vehicle to include an antilock braking system on each end of that axle. Most manufacturers of heavy-duty vehicles include antilock braking systems on every axle.

Each antilock braking system includes a sensor that is typically located adjacent to a wheel end assembly. The wheel end assembly includes a disc brake rotor mounted for relative rotation on an axle spindle of a heavy-duty vehicle. The antilock braking system also includes a tone ring that is mounted to the disc brake rotor adjacent to a respective antilock braking system sensor. The tone ring is generally circular and includes a plurality of notches, protrusions, or similar divisions, generally defining a plurality of teeth. The teeth of the tone ring are formed of a material capable of disrupting a magnetic field which is produced and detected by the sensor.

The tone ring rotates with the disc brake rotor. The sensor is mounted in close proximity to the tone ring and detects magnetic field disruption caused by each tone ring tooth as it moves past the sensor. An electrical signal indicative of the sensed disruptions is sent to an electronic control unit to calculate or determine meaningful data. Such data may include distance travelled, rotational velocity of the tone ring and change in velocity of the tone ring. Such meaningful data from every sensor on the vehicle is compared and used to control brake engagement.

In some prior art heavy-duty disc brake assemblies, the tone ring is mounted and retained in place on the rotor by mounting structure, such as that disclosed in U.S. Pat. No. 9,506,515. The prior art tone ring mounting structure includes bosses of the tone ring inserted into grooves in respective lugs of the rotor. At least one of the bosses has a tab stop surface that engages one side of a lug in order to prevent relative rotational movement of the tone ring in a first direction. In order to assure that the bosses do not detach from the grooves in the lugs, the boss also has an opening circumferentially spaced from the tab stop surface. The opening receives a device, such as a roll pin, that engages the side of the lug opposite of the side engaged by the tab stop. Such engagement prevents relative rotational movement of the tone ring in a second direction opposite the first direction. The roll pins are typically made of a ferrous metal that tends to corrode. A corroded roll pin becomes challenging to remove from the opening in the boss, making it difficult to detach the tone ring from the rotor for servicing or replacement.

The bosses of the prior art tone ring mounting structure also have a wedge-shaped spacer or shim formed on an axially facing surface of each boss. Once the bosses are seated in respective lugs, the spacer or dart projection wedges between each boss and a respective lug wall to limit or eliminate relative axial movement between the tone ring and the rotor. The prior art tone ring is generally made and shaped in a die or mold from a suitable powdered metal alloy. The bosses, tabs and dart projections are integrally formed on the tone ring in the same powdered metal manufacturing operation. One disadvantage of the powdered metal manufacturing operation is the cost of tooling and potential long lead times for production.

Tone rings are often exposed to the environment that exists under the heavy-duty vehicle, which in certain situations, can negatively impact the effectiveness of the vehicle antilock braking system. It is known that road spray may include salt or other anti-icing or de-icing chemicals present on a road surface. The chemicals can include sodium chloride, calcium chloride, magnesium chloride, and mixtures thereof. Road spray, salt and/or other chemicals can collect on the rotor and/or tone ring.

Spaces or voids may exist between the tone ring and the rotor. There can be some relative movement between the tone ring and rotor that results in a capillary action and cause the road spray, salt and/or other anti-icing or de-icing chemicals to be pumped or forced into those spaces or voids. The remaining salts and other anti-icing or de-icing chemicals can cause corrosion cells which may evolve into rust-jacking that can damage the tone ring and/or rotor. This damage can lead to a fault in the antilock braking system, requiring the vehicle to be serviced, resulting in vehicle down time.

The drawbacks, limitations and disadvantages of prior art tone ring mounting structures result from corrosion cells, rust-jacking, costly tooling and long production lead times. Thus, there is a need for an inexpensive and relatively quickly produced tone ring with attachment structure that minimizes the potential for damage from corrosion cells and rust-jacking.

SUMMARY

A summary is provided to introduce concepts of the disclosed subject matter. The summary is not intended to identify key factors or essential features of the disclosed subject matter, nor is it intended to limit the scope of the disclosed subject matter.

An improved tone ring and attachment structure for a disc brake rotor used in heavy-duty vehicles, according to an aspect of the disclosed subject matter, addresses the needs and overcomes the drawbacks, limitations and disadvantages of the prior art tone ring to rotor mounting structures. That is, at least one aspect of the disclosed subject matter provides an inexpensive and relatively quickly produced tone ring with attachment structure that minimizes the potential for damage to the rotor and/or tone ring due to corrosion cells and rust-jacking.

The improved tone ring and attachment structure is for a disc brake rotor used on a vehicle, such as a heavy-duty vehicle. The disc brake rotor has a plurality of circumferentially-spaced lugs. Each one of the lugs has a groove. A discrete tone ring has a plurality of bosses. The discrete tone ring may be made from tubular steel. Each one of the bosses is receivable in a groove in a respective one of the lugs. At least one of the bosses has a surface extending from the tone ring. A dart projection extends from the surface of at least one of the bosses. The dart projection engages a respective one of the lugs to inhibit relative axial movement and relative rotational movement in one direction between the tone ring and the disc brake rotor.

At least one of the bosses may be formed with a tab engageable with a lug to inhibit relative rotational movement between the tone ring and disc brake rotor in another direction. The apex of the dart projection may be located in a direction closer to the tab than the side walls. The tone ring may have a corrosion resistant coating on at least a portion of the tone ring. The corrosion resistant coating may be a zinc-rich material.

The dart projection may extend from a radially extending surface of the boss. The dart projection may be formed at an intersection of the radially extending surface and an axially extending surface of boss. The dart projection may have side walls forming a triangular cross-section with an apex extending from the boss. The dart projection may have an arcuate cross-section. The dart projection may be formed at one location on the at least one of the plurality of bosses from material displaced from another location of the boss.

The lug may include a boss retaining portion and a root portion. A ratio of a depth of the root portion to a depth of the boss retaining portion may be at least 1.0. A ratio of a width of the boss retaining portion to the depth of the boss retaining portion may be at least 1.0.

Another aspect of the disclosed subject matter provides a method of making a tone ring for attachment to a disc brake rotor. The method includes the step of providing a tone ring body. The tone ring body can be made from tubular steel. A plurality of bosses is formed on the tone ring body. The method also includes the step of forming a dart projection on at least one boss to inhibit relative axial movement and relative rotational movement in one direction between the tone ring and the disc brake rotor.

The method may include the step of displacing material of at least one of the bosses to form the dart projection. The method may include the step of forming a tab on at least one of the bosses. The method may include the step of forming a plurality of bosses on the tone ring body. At least a portion of the tone ring may be coated with a corrosion resistant material.

BRIEF DESCRIPTION OF THE DRAWINGS

The following description and drawings set forth certain illustrative aspects and implementations of the subject disclosure. The drawings are indicative of but a few of the various ways in which one or more aspects or implementations may be employed. Further features of the subject disclosure will become apparent from reading the following description with reference to the accompanying drawings, in which:

FIG. 18 is an enlarged perspective view of a boss with two dart projections according to an alternate aspect of the subject disclosure;

FIG. 19 is an enlarged perspective view of a boss with three dart projections according to another alternate aspect of the subject disclosure;

FIG. 20 is an enlarged perspective view of a boss with four dart projections according to yet another alternate aspect of the subject disclosure;

FIG. 21 is a perspective view of a disc brake rotor assembly incorporating a tone ring and attachment structure, according to another aspect of the disclosed subject matter;

FIG. 22 is an exploded perspective view of the disc brake rotor assembly illustrated in FIG. 21, showing a tone ring and disc brake rotor;

FIG. 26b is a cross-sectional view of the tone ring illustrated in FIG. 26, taken approximately along the line 26b-26b in FIG. 26;

DESCRIPTION

Figure 1:
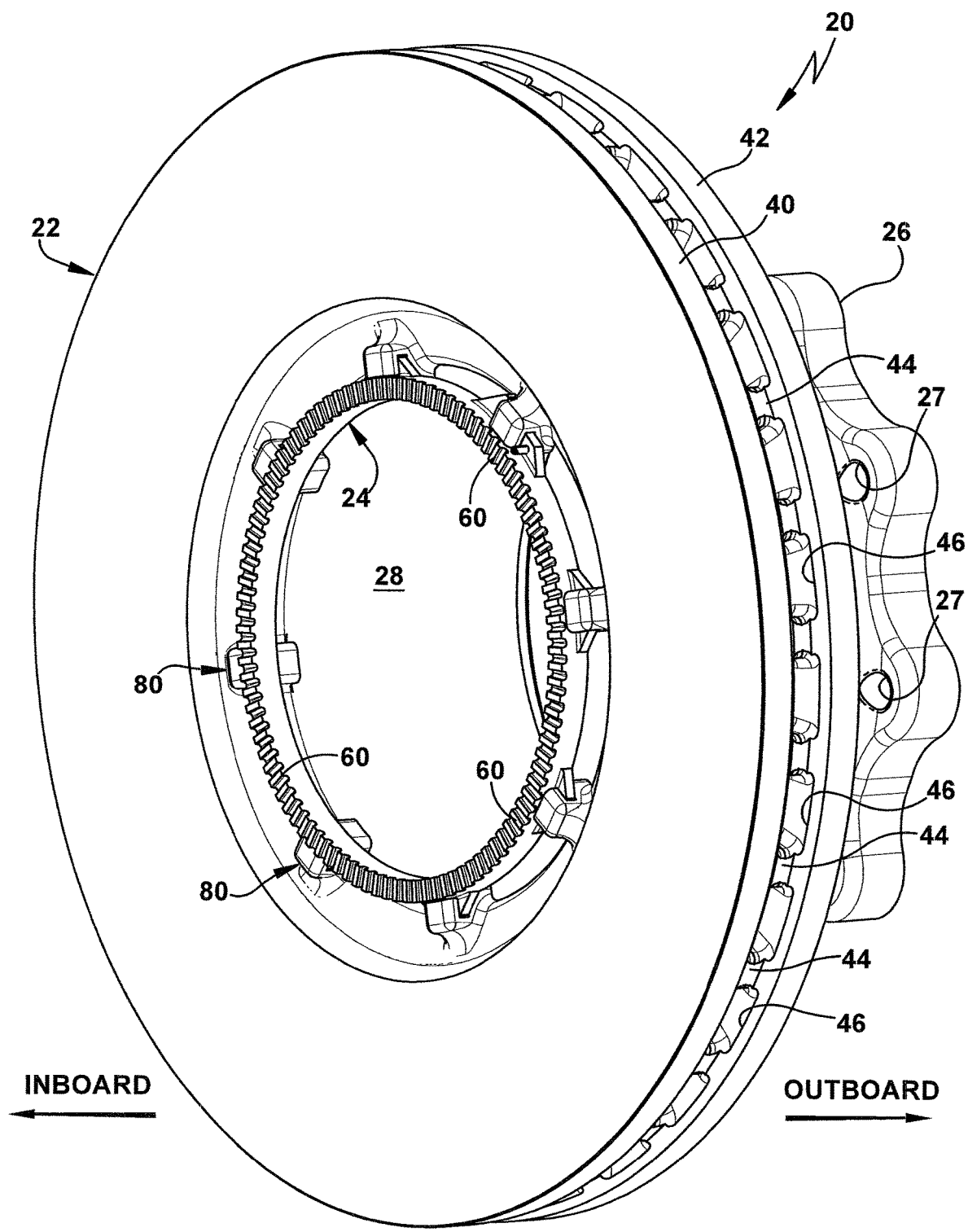
FIG. 1 is a perspective view of a prior art rotor and tone ring assembly structure.

The disclosed subject matter is described with reference to the drawings, in which like reference characters are used to refer to like elements throughout the description. For exemplary purposes, details are set forth in order to provide an understanding of the disclosed subject matter. It will be understood, however, that the disclosed subject matter can be practiced and implemented without these specific details.

The disclosed subject matter successfully incorporates an improved tone ring and attachment structure for use on a heavy-duty vehicle rotor. It is to be understood that the disclosed subject matter finds application in all types of disc brake rotors without affecting the concept or implementation of the tone ring attachment configuration. The improved tone ring and attachment structure is corrosion-resistant and provides an attachment configuration that is a relatively simple and secure way to mount a tone ring to a rotor for a heavy-duty vehicle, which may reduce installation time and, thus, vehicle downtime. In addition, the improved tone ring and attachment structure requires less components than prior art tone ring and attachment structures to securely mount a tone ring to a rotor for a heavy-duty vehicle, which may decrease manufacturing cost. The improved tone ring attachment configuration of the subject disclosure provides an effective and efficient structure which overcome limitations, drawbacks and disadvantages of the prior art.

In order to better understand the improved tone ring and attachment structure of the subject disclosure and the environment in which it operates, a prior art disc brake rotor assembly 20 for a heavy-duty vehicle is shown in FIG. 1 and will be described. The disc brake rotor assembly 20 operates in a harsh environment under the vehicle. The harsh environment can negatively affect the vehicle antilock brake system. Contaminants, such as water, brine, road spray, various road salts, or other de-icing chemicals can splash on the disc brake rotor assembly 20 during operation of the heavy-duty vehicle, and potentially create corrosion cells. Damage to components of the disc brake rotor assembly 20 from rust-jacking resulting from the corrosion cells can lead to an antilock braking system fault. Such a fault may require the disc brake rotor assembly 20 to be serviced in order to repair or replace the damaged components of the antilock braking system, resulting in down time of the heavy-duty vehicle.

The disc brake rotor assembly 20 includes a disc brake rotor portion 22 and a prior art antilock braking system tone ring 24. The prior art tone ring 24 is mounted to an inboard end of the disc brake rotor portion 22. The disc brake rotor assembly 20 is rotatably mounted on a spindle (not shown), as is known. The disc brake rotor assembly 20 includes the disc brake rotor portion 22, a flange portion 26 and a sleeve portion 28 located between and connecting the disc brake rotor portion and the flange portion. The flange portion 26 is formed with openings 27 (FIG. 2) to receive mechanical fasteners, such as bolts, to connect the disc brake rotor assembly 20 to a wheel hub (not shown) as is known. The disc brake rotor portion 22, flange portion 26 and sleeve portion 28 are integrally formed as one-piece cast from a ferrous material.

The disc brake rotor portion 22 includes an inboard disc 40 and an outboard disc 42, which are spaced apart from one another and are interconnected by a plurality of vanes or pins 44. The vanes or pins 44 are structural members that extend between the inboard disc 40 and the outboard disc 42 and are integrally formed with the inboard disc and the outboard disc. The vanes or pins 44 provide a rigid connection between the inboard disc and the outboard disc, while forming radially-extending air passages 46 between the vanes or pins. The inboard disc 40 and outboard disc 42 are operatively located adjacent a respective one of a pair of brake pads (not shown), as is known.

The tone ring 24 is typically formed from an iron-based sintered powdered metal material. Iron-based materials are capable of disrupting magnetic fields that are generated and detected by an associated antilock braking system sensor (not shown). The tone ring 24 may be made from any suitable material that has the capability of disrupting magnetic fields. The tone ring 24 is formed with a plurality of circumferentially arrayed teeth 60, each of which can disrupt a magnetic field generated by an antilock braking system sensor (not shown). The teeth 60 of the tone ring 24 are formed in a radially inboard facing portion of the tone ring. The teeth 60 are spaced apart a known distance. As is known, the antilock braking system sensor detects disruptions to the magnetic field and produces electrical signals representative of, for example, the time between sensing the presence of adjacent teeth 60. The electrical signals produced by the antilock braking system sensor are communicated to an electronic control unit (not shown) of the antilock braking system. The electronic control unit controls the antilock braking system between actuated and unactuated states under conditions programmed into the electronic control unit. As is known, the antilock braking system would be attached to a component of the heavy-duty vehicle, such as an axle, in close proximity to the tone ring 24.

A plurality of bosses 62 are formed on the tone ring 24 and extend radially outward from an outer perimeter of the tone ring. In the illustrated example, eight bosses 62 are formed on the tone ring 24. The bosses 62 are spaced uniformly about the outer circumference of the tone ring 24. At least one designated boss 62A (FIGS. 3-4) includes an opening 64 extending axially and completely through the boss. Each of the bosses 62 has a radial extent of about 6 mm.

Figure 5:
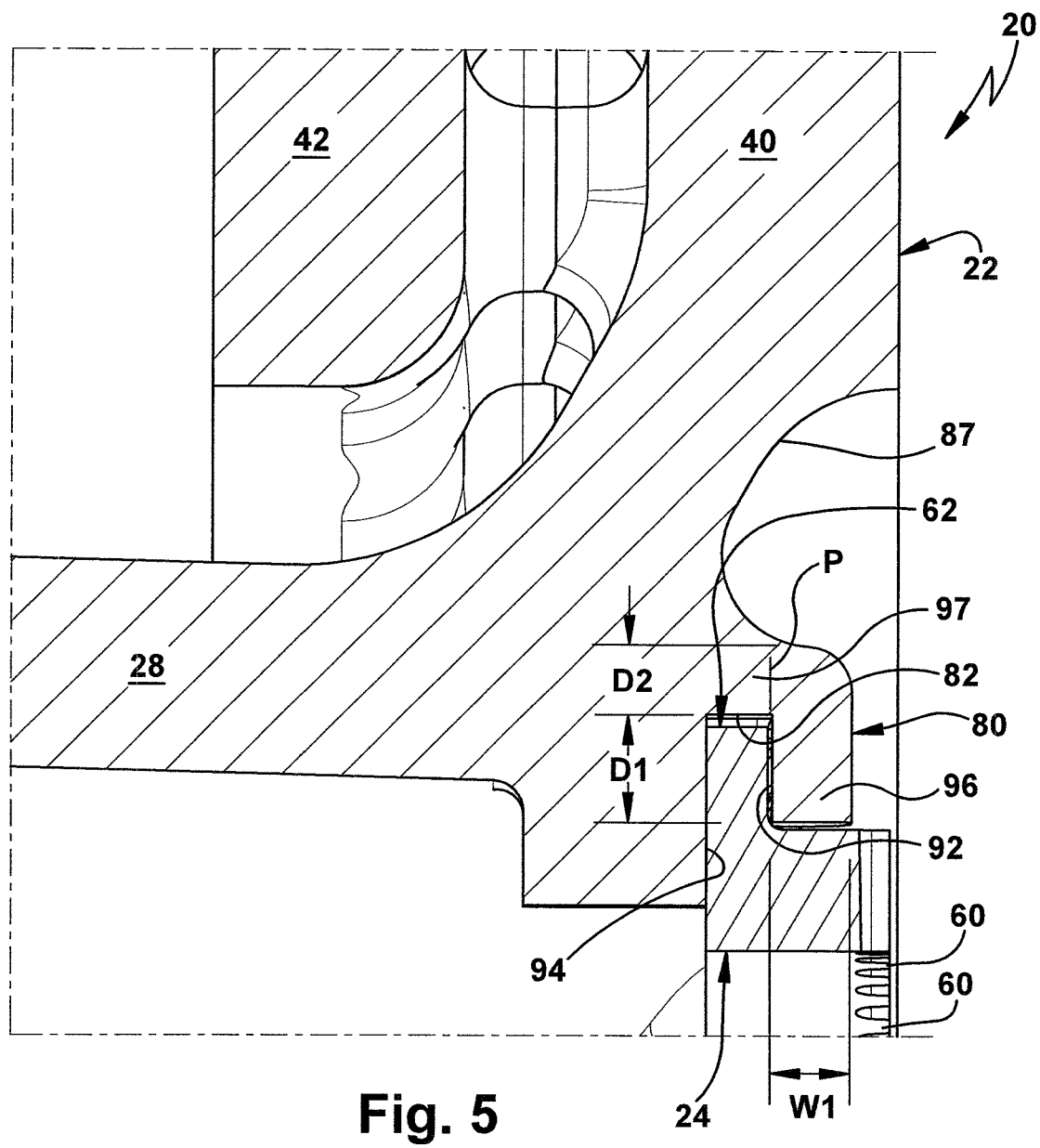
FIG. 5 is an enlarged cross-sectional view of a portion of the prior art tone ring attachment to the rotor taken approximately along the line 5-5 in FIG. 2.

A plurality of lugs 80 (FIGS. 1-3) are formed on and extend radially inward from the disc brake rotor portion 22. Eight identical lugs 80 are formed on the disc brake rotor portion 22. The lugs 80 are uniformly spaced apart about the inner circumference of the disc brake rotor portion 22. Each lug 80 is formed with surfaces defining a circumferentially-extending groove 82 (FIG. 5) in its radially inner surface.

The bosses 62 on the tone ring 24 are located and spaced to correspond to the location and spacing of respective lugs 80 on the disc brake rotor portion 22. Each lug 80 receives and captures a respective boss 62 of the tone ring 24 to secure the tone ring 24 to the disc brake rotor portion 22. The tone ring 24 is mounted on the disc brake rotor portion 22 by placing the tone ring adjacent the inboard disc 40 of the disc brake rotor portion 22. The tone ring 24 is positioned so each boss 62 is located circumferentially between adjacent lugs 80. The tone ring 24 is then rotated until each respective boss 62 is seated in a corresponding groove 82 of a respective lug 80. An angled leading edge 84 (FIG. 4) is provided on each boss 62 to guide and facilitate installation in the groove 82 of the respective lug 80.

To prevent unintentional rotation of tone ring 24 in one direction, the designated boss 62A (FIGS. 1-3) is formed with a radially outward extending shoulder or tab 66. The designated boss 62A is received within a designated lug 80A and cooperates with the designated lug to prevent rotation of tone ring 24 relative to the disc brake rotor portion 22 in one or a first direction, clockwise as viewed in FIG. 3. When each respective boss 62 is seated in a corresponding groove 82 of lug 80, a radially extending surface 68 of the shoulder or tab 66 of the designated boss 62A engages an outer surface of the designated lug 80A to stop rotation of the tone ring in the first direction.

Figure 2:
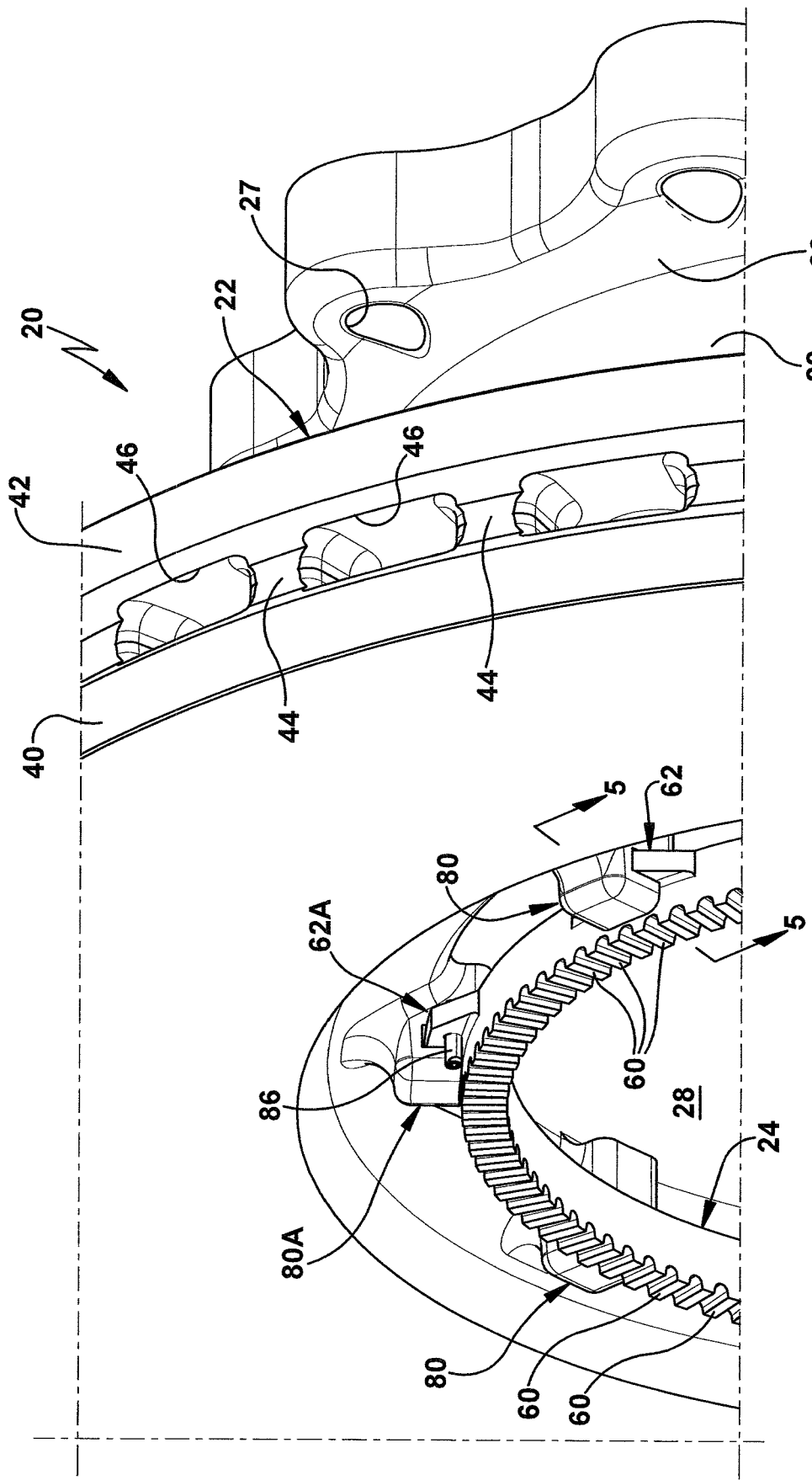
FIG. 2 is an enlarged perspective view of a portion of the prior art rotor and tone ring assembly.

To prevent relative rotation of the tone ring 24 in a second or counterclockwise direction, opening 64 formed in the designated boss 62A is located in a circumferentially opposite end portion of the designated boss from the shoulder or tab 66. A device, such as a roll pin 86, is press-fit within opening 64 in the designated boss 62A, as illustrated in FIG. 2. The roll pin 86 may engage another surface of the designated lug 80A to block rotation of the tone ring 24 in the opposite second direction. The shoulder or tab 66 of the designated boss 62A, the lug 80A, a surface defining the opening 64 in the boss, and the roll pin 86 cooperate to prevent rotation of tone ring 24 relative to disc brake rotor portion 22. Thus, unintentional rotation of the tone ring 24 relative to disc brake rotor portion 22 that may cause the tone ring to unseat from the disc brake rotor portion is prevented.

Figure 3:
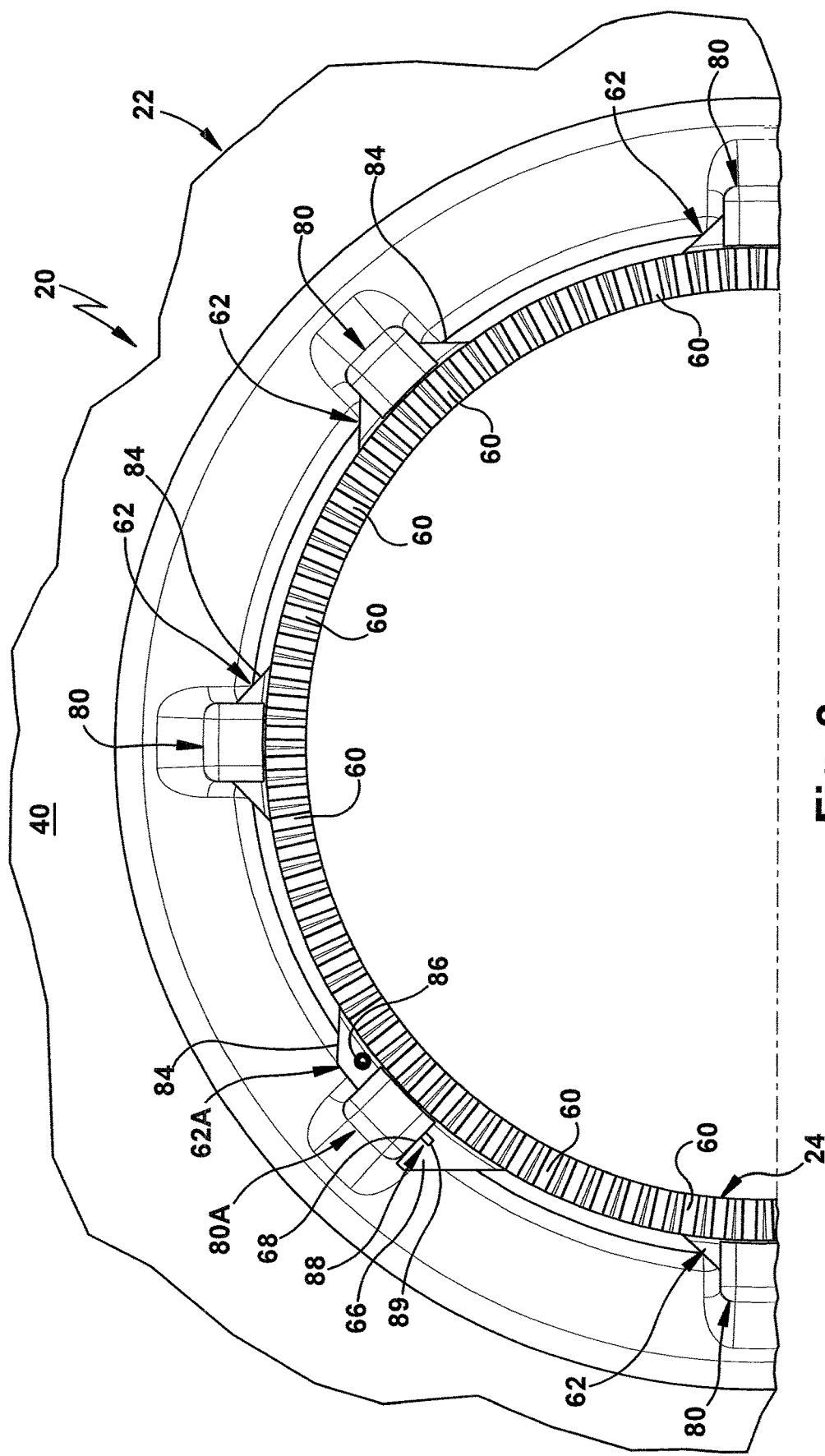
FIG. 3 is an enlarged plan view of a portion of the prior art rotor and tone ring assembly.
Figure 4:
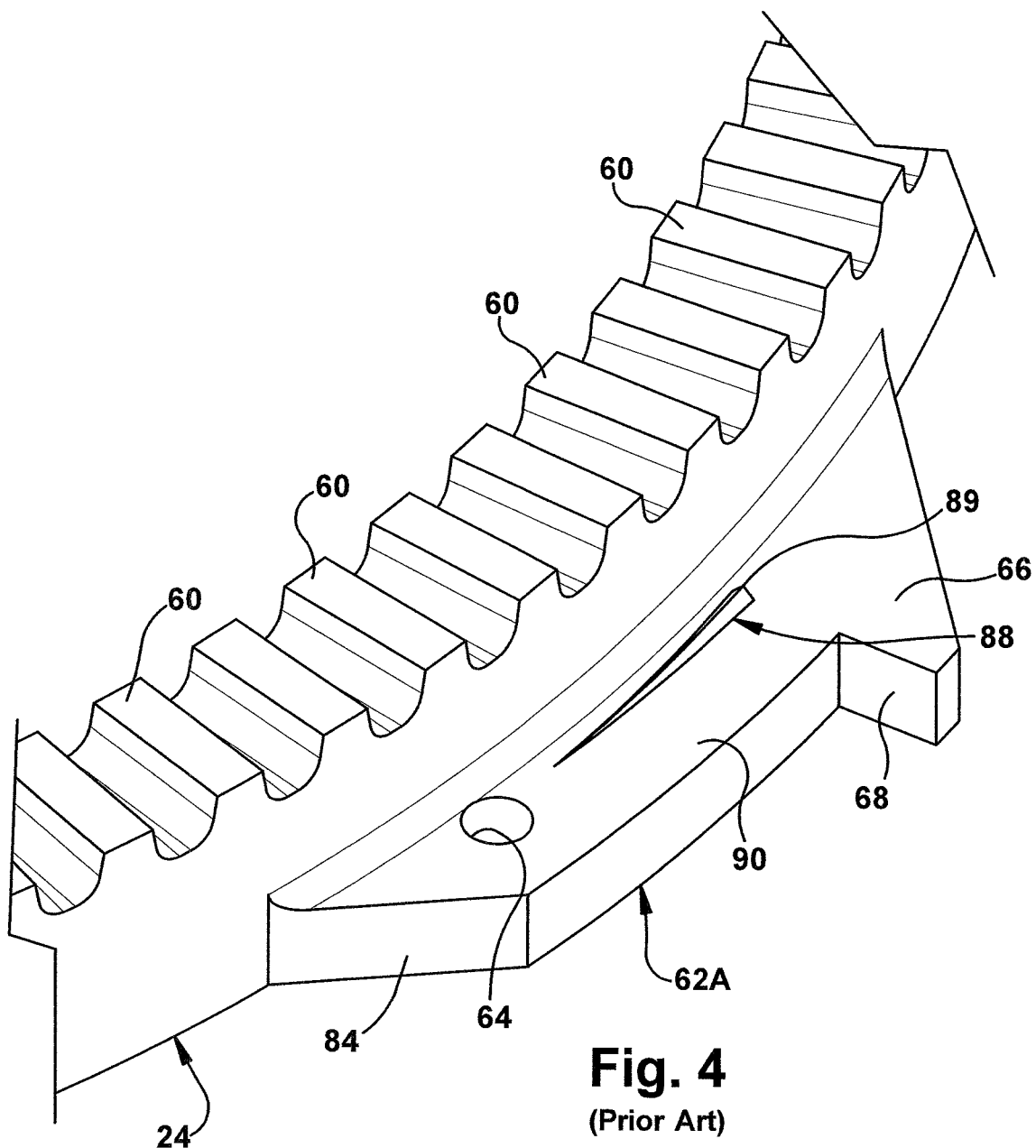
FIG. 4 is a greatly enlarged fragmentary perspective view of a prior art tone ring boss, tab and shim structure.

Each boss 62 includes a spacer or shim 88 (FIG. 4) formed on an axially inboard facing surface 90 of the boss. The shim 88 has a triangular cross-section taken in the circumferential direction. The shim 88 increases in height as it progresses to the right, as viewed in FIG. 4, to an end portion 89. The height of the end portion 89 is about 0.5 mm. As each boss 62, 62A is seated in a respective lug 80, 80A, the shim 88 rides along and wedges against an inboard surface or wall 92 (FIG. 5) of the groove 82 to occupy space between the boss and inboard walls of the lugs. The shim 88 forces the tone ring 24 against an outboard wall 94 of the groove 82. Thus, relative axial movement between the tone ring 24 and the disc brake rotor portion 22 is inhibited. The end portion 89 of the shim 88 on the designated boss 62A is located outside of the circumferential extent of the lug 80A, as illustrated in FIG. 3. Thus, the shim 88 only functions to occupy some of the space between the designated boss 62A and the inboard surface 92 of the groove 82 to inhibit relative axial movement between the tone ring 24 and the disc brake rotor portion 22. The shim 88 does not function to inhibit relative rotational movement between the tone ring 24 and the disc brake rotor portion 22 because the end portion 89 of the shim, which is the portion of the shim with the greatest height, is located outside of the circumferential extent of the lug 80A.

Each groove 82 in a respective lug 80 has a boss retaining portion 96 (FIG. 5) located directly axially inboard of the groove. The boss retaining portion 96 is defined by structure of the lug 80 of the disc brake rotor portion 22 that has an axial extent or width W1 of about 5 mm. The boss retaining portion 96 is also defined by structure of the lug 80 that has a radial extent or depth D1 of about 7 mm. The disc brake rotor portion 22 also has a root portion 97 located radially outward of the groove 82 and axially inboard relative to the outboard wall 94 of the lug 80. The root portion 97 has a radial extent or depth D2 of about 5 mm from the radial end surface of the groove 82 to a point where a line or plane P extending from the axial inboard surface 92 of the groove intersects a relief 87 cast into the inboard disc 40. The boss retaining portion 96 and root portion 97 of each lug 80 cooperate to resist rust-jacking due to growth of corrosion cells within the groove 82. The boss retaining portion 96 and root portion 97 of each lug 80 has a D2/D1 ratio of about 0.72. The boss retaining portion 96 and root portion 97 of each lug 80 has a W1/D1 ratio of about 0.72.

Since the disc brake rotor assembly 20 operates in a harsh environment under the heavy-duty vehicle, contaminants, such as water, brine, road spray or various road salts, can splash onto the disc brake rotor assembly 20 during operation of the heavy-duty vehicle, and potentially create corrosion cells between the disc brake rotor portion 22 and the tone ring 24 in the grooves 82 of the lugs 80. Rust-jacking may then occur in the grooves 82 as a result of the corrosion cells expanding and may damage the tone ring 24 and the disc brake rotor portion 22, or render at least one of them inoperable, causing down time of the heavy-duty vehicle for servicing.

The prior art disc brake rotor assembly 20, while mostly satisfactory for its intended purpose, includes certain limitations, drawbacks and disadvantages. For example, the disc brake rotor assembly 20 may be prone to the formation of corrosion cells in gaps or void spaces, such as grooves 82, that are at the interface between the tone ring 24 and the disc brake rotor portion 22 and at areas adjacent to the interface. The corrosion cells may then propagate or spread to other gaps at the interface, and/or to other areas that are adjacent to the interface. Rust may build up at the corrosion cells and create a rust-jacking condition. Once the rust buildup becomes significant, accumulation of the rust within the groove 82 may push and loosen parts of the tone ring 24 away from the parts of the disc brake rotor portion 22. If the boss retaining portion 96 and the root portion 97 of each lug 80 are not sufficiently strong to resist the force of accumulating rust in the groove 82, the boss retaining portion and the root portion could crack or fracture and loosen the tone ring 24. Loosened parts of the tone ring 24 and parts of the disc brake rotor portion 22 may result in the antilock braking system becoming unreliable and/or damage the components of the antilock braking system, such as portions of the tone ring and/or the disc brake rotor portion. In addition, prior art disc brake rotor assembly 20 requires use of a discrete component, such as roll pin 86, to cooperate with the designated boss 62A and block rotation of the tone ring 24 in the second direction, which increases manufacturing cost.

Accordingly, a new and improved tone ring and attachment structure for a disc brake rotor assembly used in heavy-duty vehicles is provided according to the disclosed subject matter. The new and improved tone ring and attachment structure overcomes the drawbacks, limitations and disadvantages of the prior art disc brake rotor assembly 20.

A new and improved tone ring and attachment structure for a disc brake rotor assembly used on heavy-duty vehicles is provided by the subject disclosure. The disc brake rotor assembly has a disc brake rotor portion. The disc brake rotor portion has a plurality of circumferentially-spaced lugs. Each one of the lugs has a groove. A discrete tone ring has a plurality of bosses equal to the number of lugs. The tone ring may be formed of tubular steel. Each one of the bosses is receivable in a respective one of the grooves in the lugs. At least one of the bosses has a dart projection. The dart projection is preferably located completely within the circumferential extent of the lug and engages the lug to inhibit relative axial movement and relative rotational movement in a first direction between the tone ring and the disc brake rotor portion. A tab is formed on at least one of the bosses. The tab has a surface that is engageable with a portion of the lug to inhibit relative rotational movement between the tone ring and disc brake rotor in a second direction opposite the first direction. The tone ring may have a corrosion resistant coating.

Figure 6:
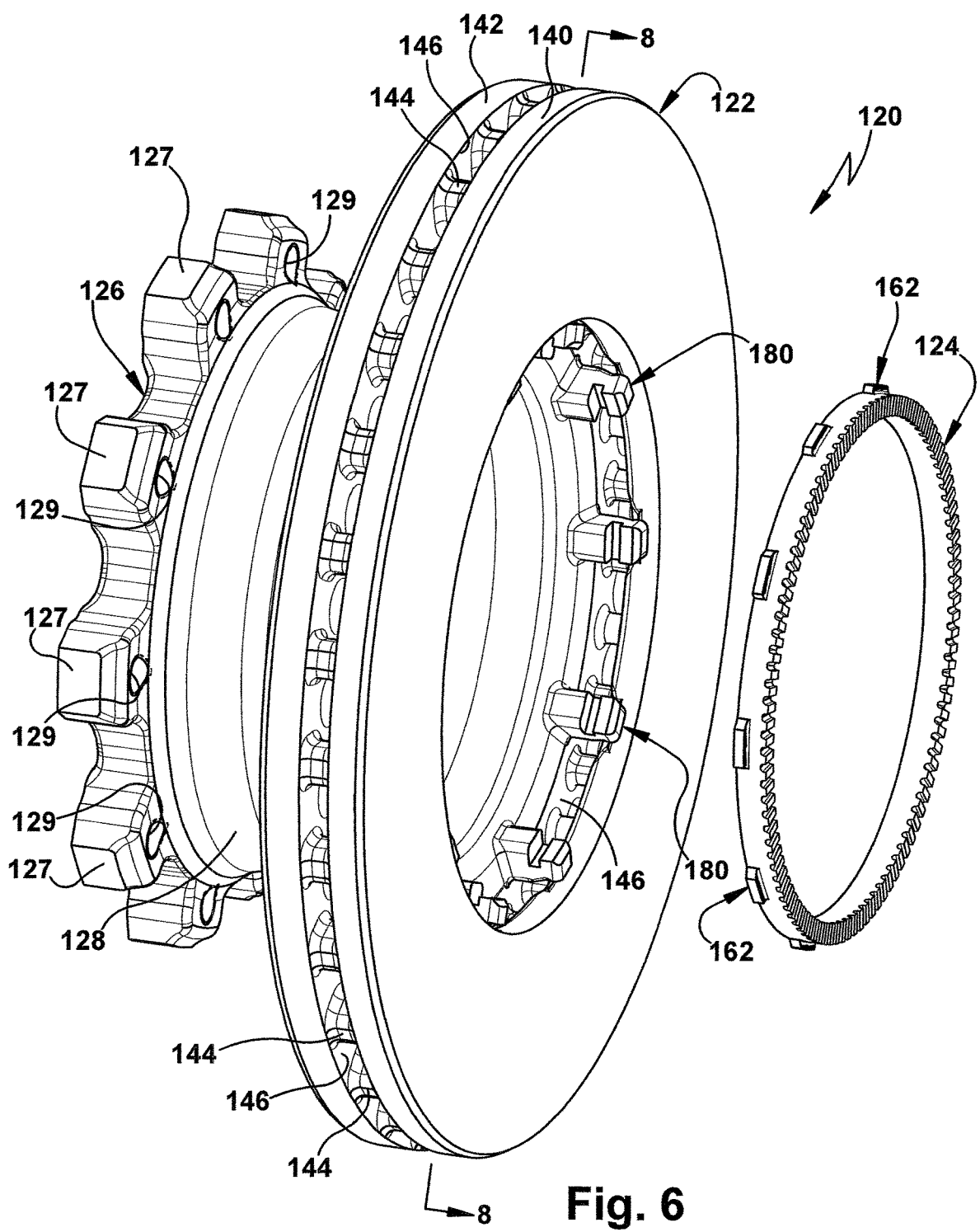
FIG. 6 is an exploded perspective view of an antilock braking disc rotor assembly including a tone ring and attachment structure according to the subject disclosure.
Figure 7:
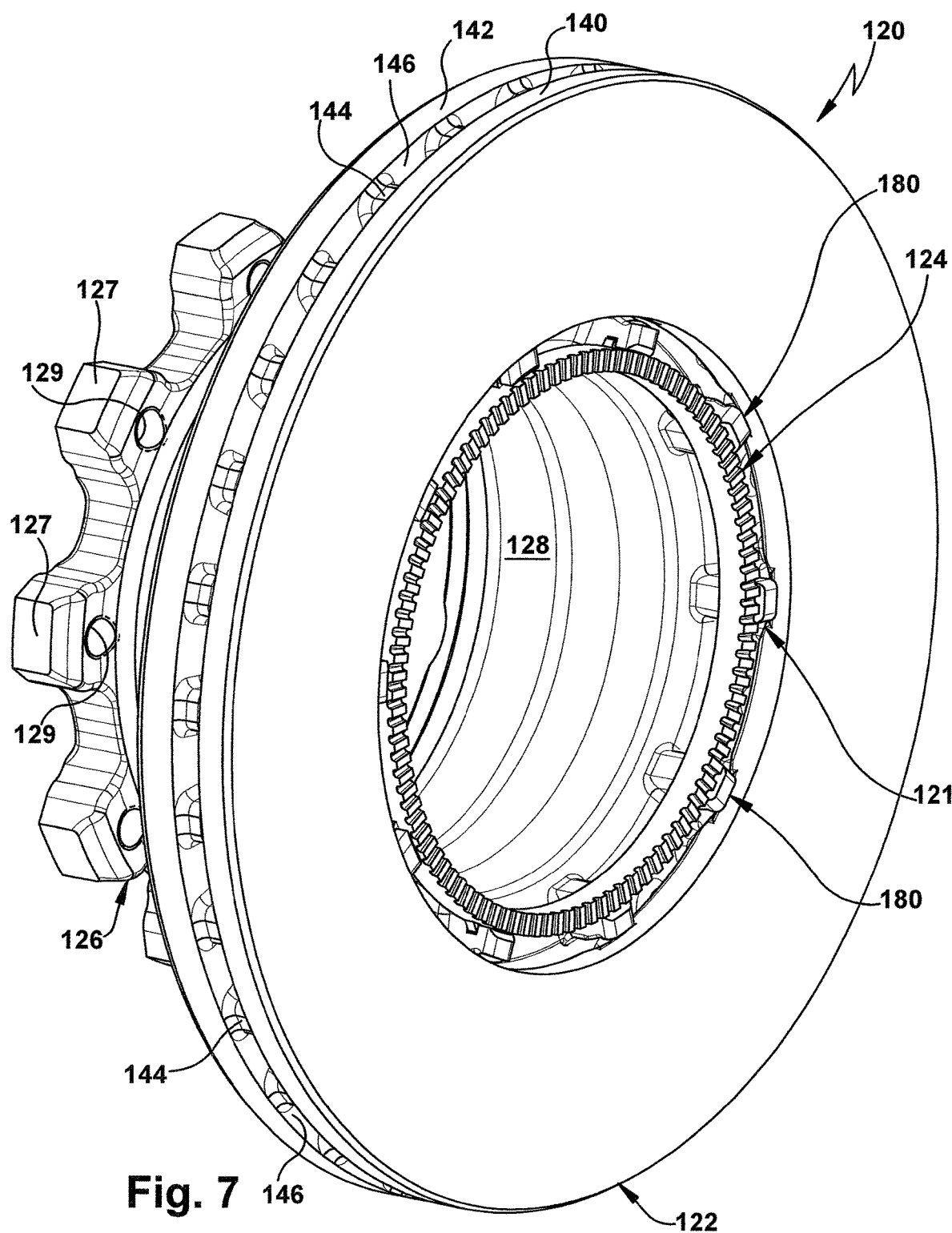
FIG. 7 is a perspective view of the antilock braking disc rotor assembly illustrated in FIG. 6 with the tone ring mounted to a rotor portion.
Figure 8:
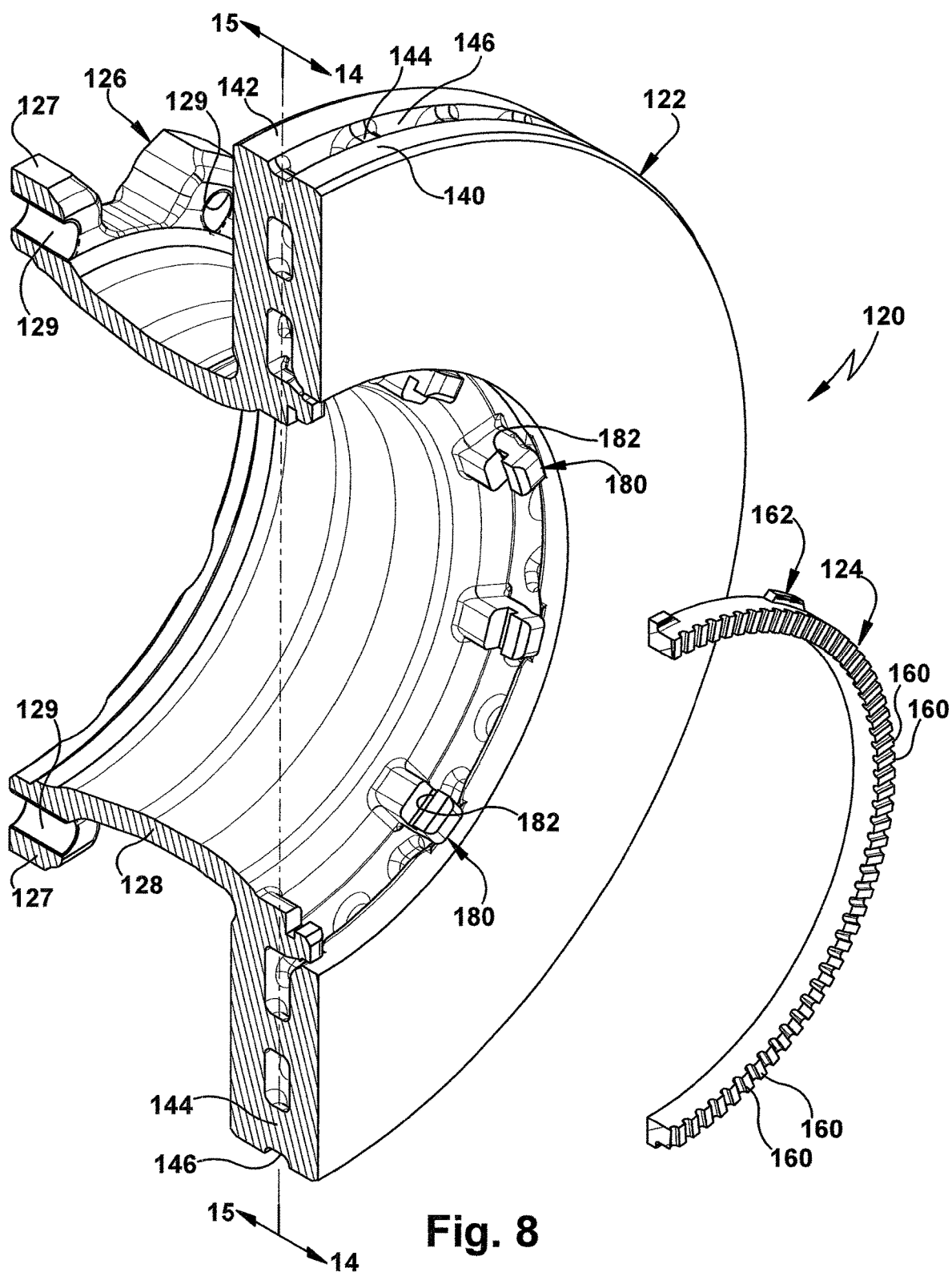
FIG. 8 is an exploded cross-sectional view of the antilock braking disc rotor assembly, taken approximately along the line 8-8 in FIG. 6.

A disc brake rotor assembly 120 (FIG. 6), constructed according to one aspect of the subject disclosure, includes a new and approved disc brake rotor portion 122, a new and improved tone ring 124 and a new and improved tone ring attachment structure 121. The tone ring 124 is mounted to an inboard end portion of the disc brake rotor portion 122, which will be described in detail below. It is to be understood that the tone ring attachment structure 121 of the disclosed subject matter finds application in all types of disc brake rotors and tone rings and all types of vehicles without affecting the concept or implementation of the tone ring attachment structure of the disclosed subject matter.

The disc brake rotor assembly 120 also includes a flange portion 126 (FIGS. 6-8 and 11) and a sleeve portion 128. The sleeve portion 128 is located between and connects the disc brake rotor portion 122 and the flange portion 126. The disc brake rotor portion 122, flange portion 126 and sleeve portion 128 may be integrally formed as a one-piece casting. The disc brake rotor portion 122 may be cast from a suitable material, such as gray iron, alloyed modified gray iron or compacted graphite iron. The disc brake rotor assembly 120 is rotatably mounted on a spindle (not shown), as is known. The disc brake rotor portion 122 may be subjected to peak temperatures in excess of 1100° F. and regularly subjected to temperatures in the 200-800F° range, so the material used to cast the disc brake rotor assembly 120 must be able to withstand these temperatures as well as physical forces it encounters.

The disc brake rotor assembly 120 is formed with features to accept a separate or discrete tone ring, such as tone ring 124. The flange portion 126 may be formed with a plurality of discrete radially extending mounting bosses 127 and respective openings 129 in each mounting boss to receive mechanical fasteners, such as bolts or wheel studs (not shown) to removably secure the disc brake rotor assembly 120 to a wheel hub (not shown), as is known. This construction enables the disc brake rotor assembly 120 to rotate with the wheel hub, while being removable from the wheel hub for servicing or replacement. The flange portion 126 may alternatively be formed as a continuous circular member (not shown) and include openings 129.

The disc brake rotor portion 122 of the disc brake rotor assembly 120 includes an inboard disc 140 and an outboard disc 142, which are spaced apart from one another and are interconnected by a plurality of pins 144. The pins 144 are structural members that extend between the inboard disc 140 and the outboard disc 142 and are integrally cast with the inboard disc and the outboard disc. The pins 144 provide a rigid connection between the inboard disc 140 and the outboard disc 142, while creating radially-extending air passages 146. The inboard disc 140 and the outboard disc 142 are each operationally located adjacent a respective one of a pair of brake pads (not shown), as is known. It is to be understood that the inboard disc 140 and the outboard disc 142 could be spaced apart from one another and interconnected by a plurality of circumferentially spaced radially extending vanes (not shown) without affecting the overall concept or operation of the disclosed subject matter.

A plurality of lugs 180 are formed on and extend radially inwardly from the disc brake rotor portion 122. At least four identical lugs 180, and preferably eight or ten identical lugs, are formed on the disc brake rotor portion 122. The lugs 180 are uniformly spaced apart about the inner circumference of the disc brake rotor portion 122. Each lug 180 has a circumferentially-extending groove 182 (FIGS. 8 and 12) in its radially inner surface for receiving or retaining the tone ring 124.

The tone ring 124 includes a plurality of circumferentially arrayed teeth 160 formed in an inboard facing surface. The tone ring 124 also includes a plurality of bosses 162 on an outer perimeter of the tone ring. At least four bosses 162, and preferably eight or ten bosses, are formed on the tone ring 124, and are uniformly spaced apart about the outer circumference of the tone ring to correspond to positions of the respective lugs 180 formed on the disc brake rotor portion 122. Each boss 162 has a radial extent of less than about 4.5 mm, and preferably about 3 mm so groove 182 can be relatively shallow to increase strength in the area of the groove. Each boss 162 is received by a respective one of lugs 180 to secure the tone ring 124 to the disc brake rotor portion 122. It is contemplated that the grooves 182 could be formed in a radially outward surface of the lugs 180 and the bosses 162 formed on an inner circumference of the tone ring 124 without affecting the overall concept or operation of the disclosed subject matter.

The disc brake rotor portion 122, thus, is constructed to accept the improved tone ring 124. The tone ring 124 may be formed of a different material than the disc brake rotor portion. Use of the tone ring 124 and tone ring attachment structure 121, according to the subject disclosure, reduces corrosion issues and enables the tone ring to more easily be removed from the disc brake rotor portion 122 for servicing.

The tone ring 124 may be made from a ferrous sintered powdered metal material. Ferrous materials are preferred because they are capable of disrupting magnetic fields that can be detected by an associated antilock braking system sensor (not shown). It will be apparent, however, that the tone ring 124 may be made from any suitable material that has the capability of disrupting magnetic fields.

Figure 9:
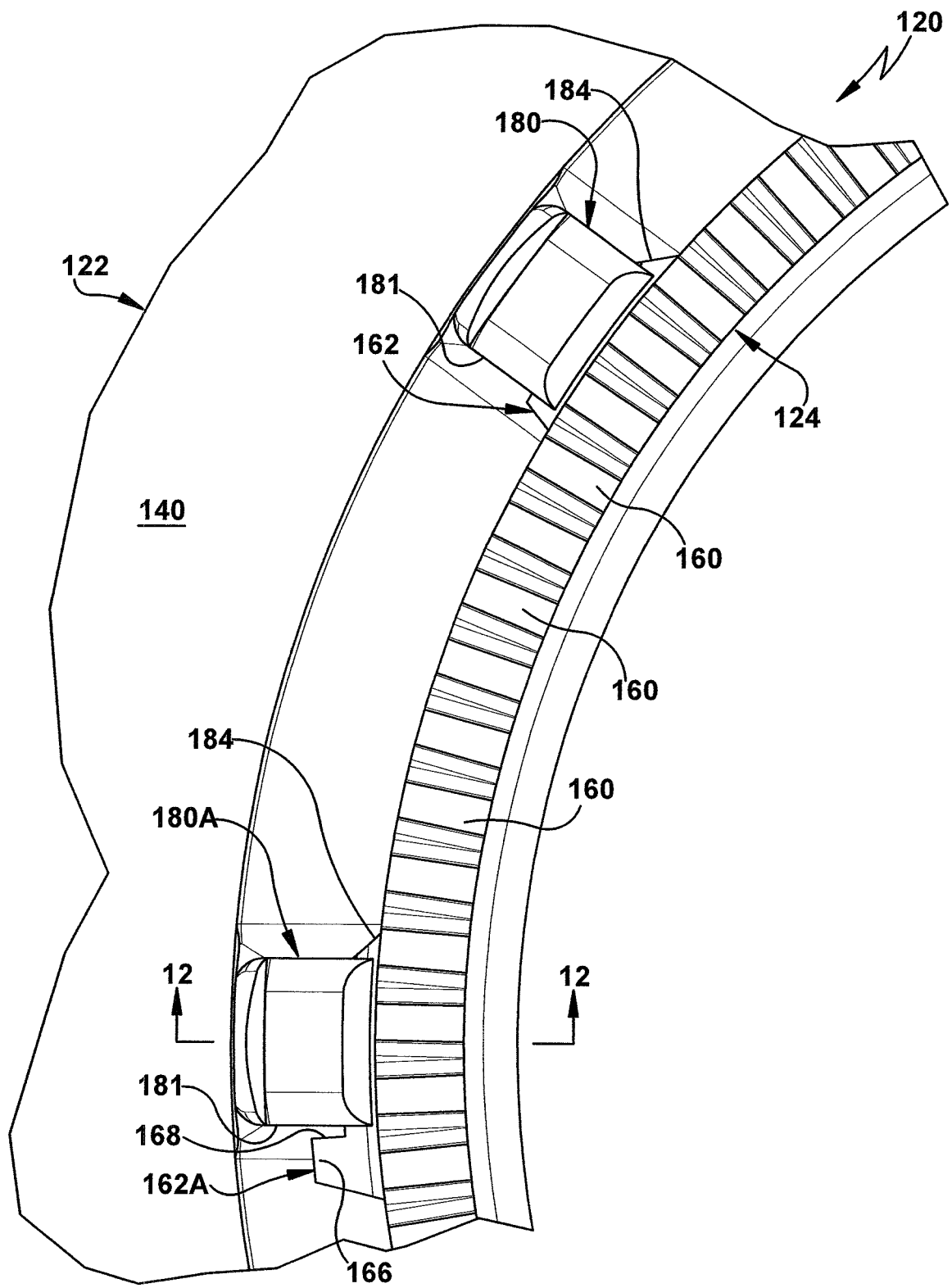
FIG. 9 is an enlarged plan view of a portion of the tone ring attached to the rotor, illustrating a tab on a boss of the tone ring engaging a lug of the rotor.
Figure 10:
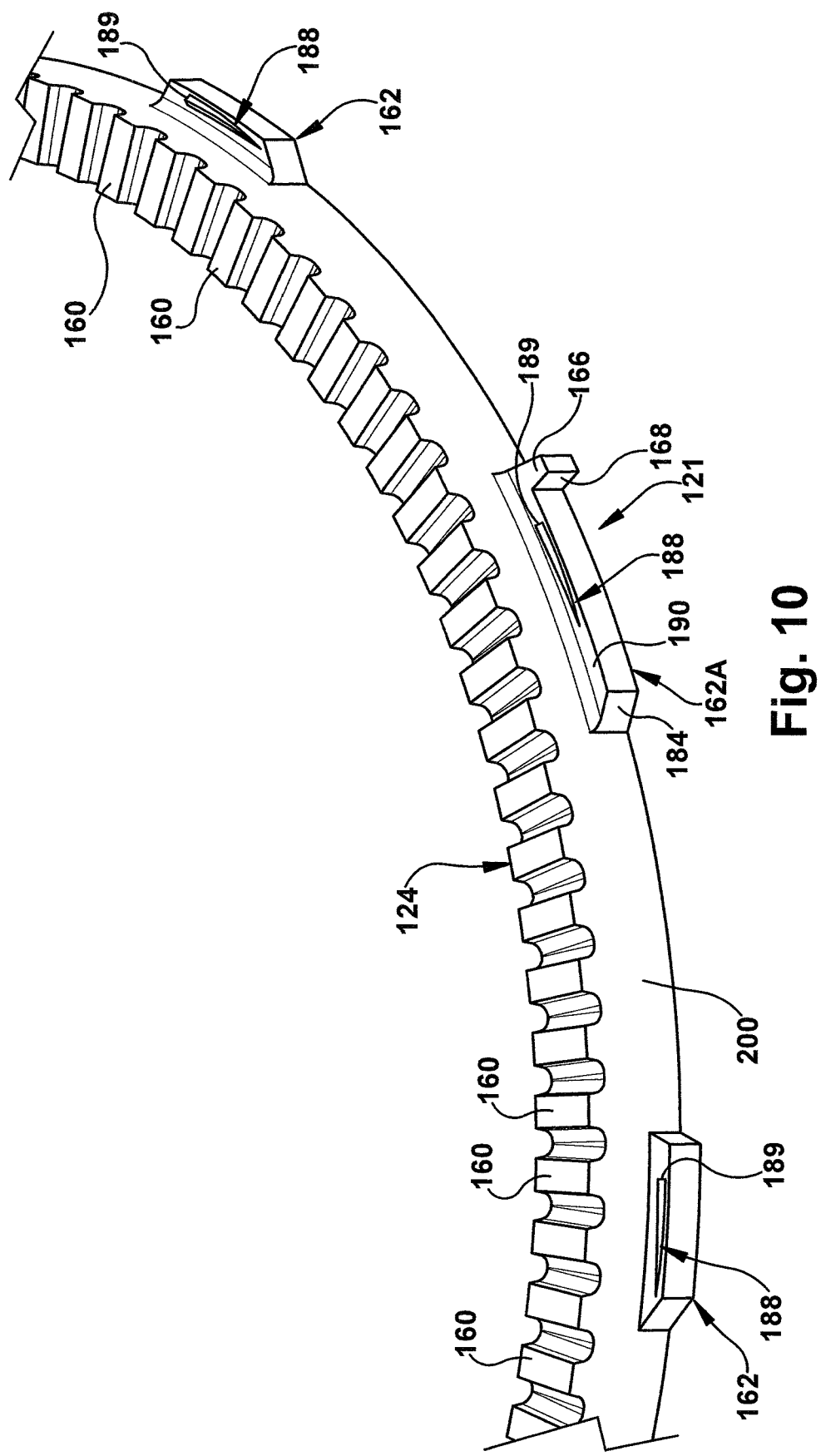
FIG. 10 is a greatly enlarged perspective view of a portion of the tone ring illustrating a boss, a tab at an end portion of the boss and a single dart projection on the boss, according to the subject disclosure.
Figure 11:
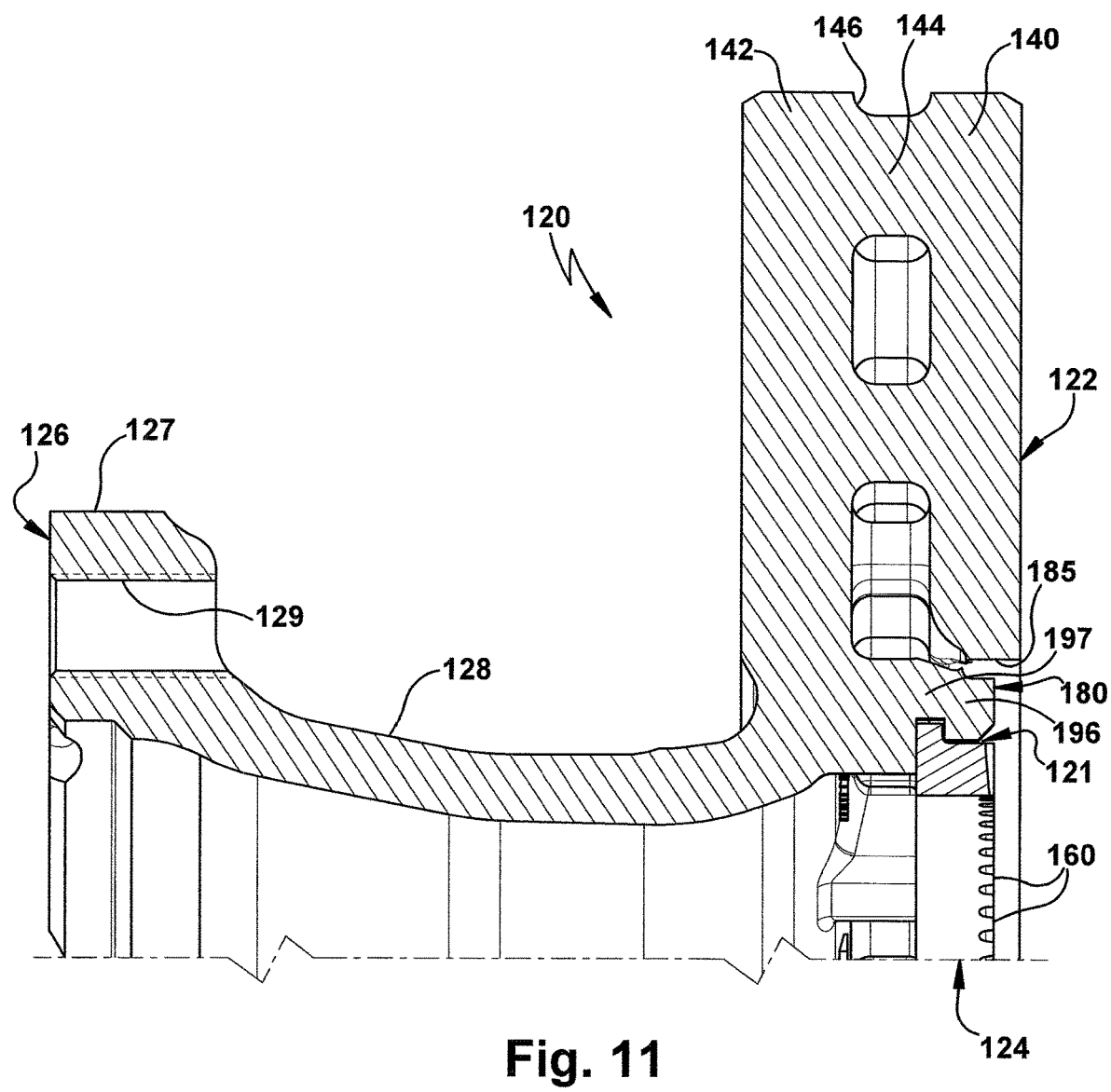
FIG. 11 is an enlarged fragmentary cross-sectional view of a portion of the tone ring mounted to the rotor.

The plurality of circumferentially arrayed teeth 160 (FIGS. 9-10) formed on the inboard facing surface of tone ring 124 can disrupt magnetic fields generated and detected by an antilock braking system sensor (not shown). The teeth 160 are spaced apart a known distance and face in an inboard direction. As is known, the antilock braking system sensor produces electrical signals representative of, for example, the time between sensing the presence of adjacent teeth 160. As is known, the antilock braking system sensor would be attached to a component of the heavy-duty vehicle, such as an axle, in close proximity to the tone ring 124. The electrical signals produced by the antilock braking system sensor are communicated to an electronic control unit (not shown) of the antilock braking system. The electronic control unit controls the antilock braking system between actuated and unactuated states that are programmed into the electronic control unit to provide antilock braking.

Each boss 162 is located and spaced to correspond to the location and spacing of respective lugs 180 on the disc brake rotor portion 122. Each lug 180 receives and captures a respective boss 162 of the tone ring 124 to secure the tone ring to the disc brake rotor portion 122. The tone ring 124 is mounted on the disc brake rotor portion 122 by placing the tone ring adjacent the inboard disc 140 of the disc brake rotor portion 122. The tone ring 124 is positioned so each boss 162 is located between respective adjacent lugs 180. The tone ring 124 is then rotated until each respective boss 162 is seated in a corresponding groove 182 of a lug 180. An angled leading edge 184 (FIG. 10) is provided on each boss 162 to guide and facilitate installation in respective groove 182 of a lug 180.

To prevent unintentional rotation of the tone ring 124 in a first direction, at least one designated boss 162A (FIG. 10), for example, is formed with a radially-extending shoulder or tab 166. The designated boss 162A engages a designated lug 180A and cooperates with a circumferential end surface 181 of the designated lug to prevent rotation of the tone ring 124 relative to the disc brake rotor portion 122 in the first direction, such as clockwise as viewed in FIG. 9.

When the tone ring 124 is rotated until each respective boss 162, 162A is seated in the groove 182 of the respective lug 180, 180A, a radially extending surface 168 (FIG. 10) of the shoulder or tab 166 of the designated boss abuts an outer surface of the designated lug to prevent rotation of the tone ring relative to the disc brake rotor portion 122 in the first direction. Unintentional rotation in the first direction of the tone ring 124 relative to disc brake rotor portion 122 that may cause the tone ring to unseat from the relative to disc brake rotor portion is prevented.

Figure 12:
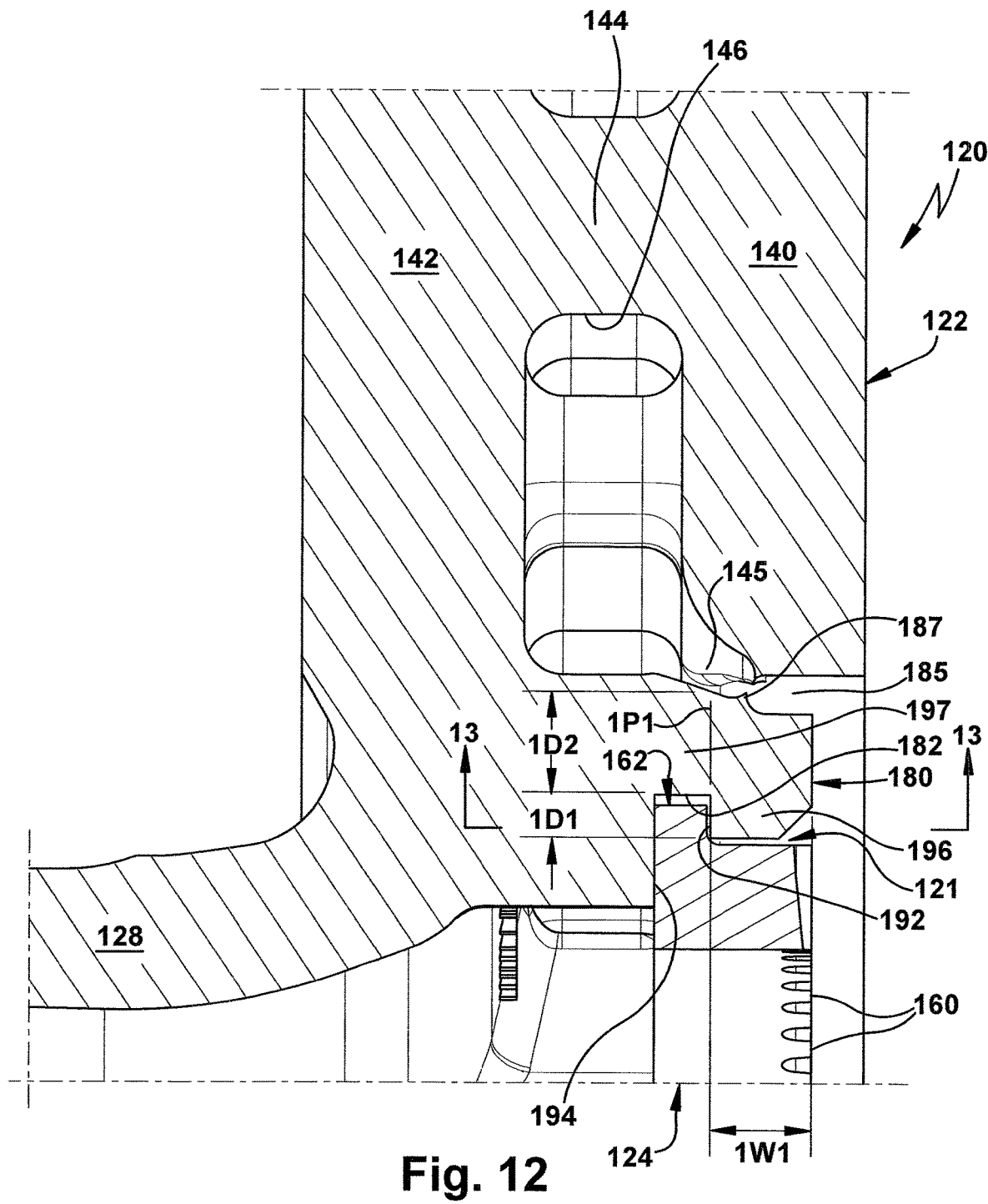
FIG. 12 is an enlarged cross-sectional view of a portion of the tone ring mounted to the rotor, taken approximately along the line 12-12 in FIG. 9.
Figure 13:
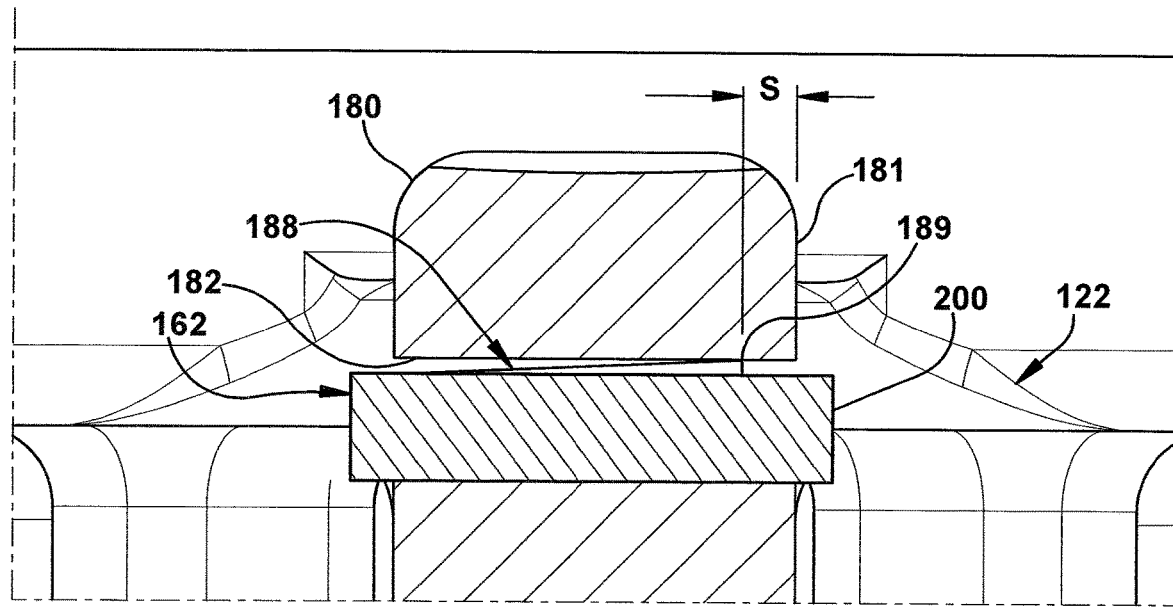
FIG. 13 is a greatly enlarged cross-sectional view of a portion of the tone ring mounted to the rotor with a dart projection on a boss of the tone ring installed in a groove of a lug of the rotor, taken approximately along the line 13-13 in FIG. 12.

Each boss 162, 162A includes a dart projection 188 formed on an inboard facing surface 190. The dart projection 188 may have a triangular cross-section taken in the circumferential direction. The dart projection 188 increases in height and cross-section as it progresses to the right, as viewed in FIG. 10, to an apex 189. The height of the apex 189 is at least about 0.35 mm and preferably at least about 0.5 mm. The trailing end or apex 189 of the dart projection 188 is preferably located circumferentially closer to tab 166 of the designated boss 162A than the leading end or end opposite of the apex of the dart projection. As each boss 162, 162A is seated in a respective lug 180, 180A and rotated in the first direction, the dart projection 188 rides along and wedges against an inboard surface 192 of the groove 182 to occupy space between the boss and the inboard surfaces of the lugs. The dart projection 188 forces the tone ring 124 against an outboard wall 194 (FIG. 12) of the groove 182. The apex 189 of the dart projection 188 is preferably located inside of the circumferential extent of the lug 180A, as illustrated in FIG. 13. The hardness of the tone ring 124 may be greater than or equal to the hardness of the lug 180A and the disc brake rotor portion 122.

The apex 189 of each dart projection 188 digs into and deforms a portion of the respective lug 180, 180A. The apex 189 of the dart projection 188 is preferably located within a spacing S (FIG. 13) of at least 0.5 mm and preferably 1.0 mm from the circumferential end surface 181 of the respective lug 180, 180A. Relative circumferential movement in a second direction opposite to the first direction, such as a counterclockwise direction as viewed in FIG. 9, between the tone ring 124 and the disc brake rotor portion 122 is prevented by the dart projection 188 deforming and digging into the inboard surface or wall 192 of the respective lug 180, 180A. The dart projection 188 occupies a portion of the space between the boss 162, 162A and the inboard surface 192 of the groove 182 of the respective lug 180, 180A to inhibit relative axial movement of the tone ring 124 relative to the disc brake rotor portion 122. It is to be understood that in certain configurations of the tone ring 124, the dart projections 188 could be formed on bosses 162, 162A such that the dart projections taper from the apexes 189 in an opposite circumferential direction than that shown without affecting the overall concept or operation of the disclosed subject matter.

Each lug 180, 180A has a boss retaining portion 196 (FIGS. 11-12) located directly axially inboard of the groove 182. The boss retaining portion 196 is defined by structure of the lug 180, 180A that has an axial extent or width 1W1 of more than about 5.0 mm and preferably at least about 7.5 mm. The boss retaining portion 196 is also defined by structure of the lug 180, 180A that has a radial extent or depth 1D1 of less than about 6.5 mm and preferably about 3.3 mm so less of a lever arm is created for the boss 162, 162A of the tone ring 124 to apply an axial force, for example, due to rust build up. The disc brake rotor portion 122 also has a root portion 197 located radially outward of the groove 182 and axially inboard relative to the outward wall 194 of the lug 180, 180A and has a radial extent or depth 1D2 of more than about 7 mm and preferably about at least 8 mm from the radial end surface of the groove 182 to a point about where a line or plane 1P1 extending from the axial inboard surface of the groove intersects a relief area 187 cast into the inboard disc 140.

The boss retaining portion 196 and root portion 197 of each lug 180 are what resist the forces created by rust-jacking due to growth of corrosion cells within the groove 182. The boss retaining portion 196 and root portion 197 of each lug 180, 180A has a 1D2/1D1 ratio of at least about 2.4, as illustrated in FIG. 12. The greater the ratio of 1D2/1D1, the better resistance to rust-jacking is provided. Thus, it is preferred that the ratio of 1D2/1D1 is at least about 1.0, preferably at least about 2.0 and more preferably at least about 2.4. The boss retaining portion 196 and root portion 197 of each lug 180 has a 1W1/1D1 ratio of about 1.5, as illustrated in FIG. 12. It is preferred that the ratio of 1W1/1D1 is at least about 1.0, preferably at least about 2.0 and more preferably at least about 2.3.

The configuration of the boss retaining portion 196 and root portion 197 of each lug 180 of the disc brake rotor portion 122 provide a relatively stronger and larger section modulus than the corresponding boss retaining portion 96 and root portion 97 of the prior art disc brake rotor portion 22. As a result, the disc brake rotor portion 122 better supports the tone ring 124 and provides less surface area for rust to build up on, resulting in relatively less rust-jacking force acting to loosen the tone ring from the disc brake rotor portion. The disc brake rotor portion 122 includes an annular passage 185 extending from the inboard side of the disc brake rotor portion 122 into the air passages 146 between the pins 144 to relieve thermal stress that may occur from the relatively high temperatures experienced during braking. The passage 185 is created after the casting operation by machining a wall that was cast in relief area 187 of the disc brake rotor portion 122 to break completely through the relief area 187 to provide the passage. Due to casting tolerances and core shift, the machining operation on the wall will make the resulting wall thin enough so it will fracture at elevated rotor operating temperature and inherently create the passage 185. Passage 185 thermally isolates the lug 180, 180A from the inboard disc 140 of the disc brake rotor portion 122 and reduces stress on the lug from thermal expansion of the disc brake rotor portion during vehicle operation.

Figure 15:
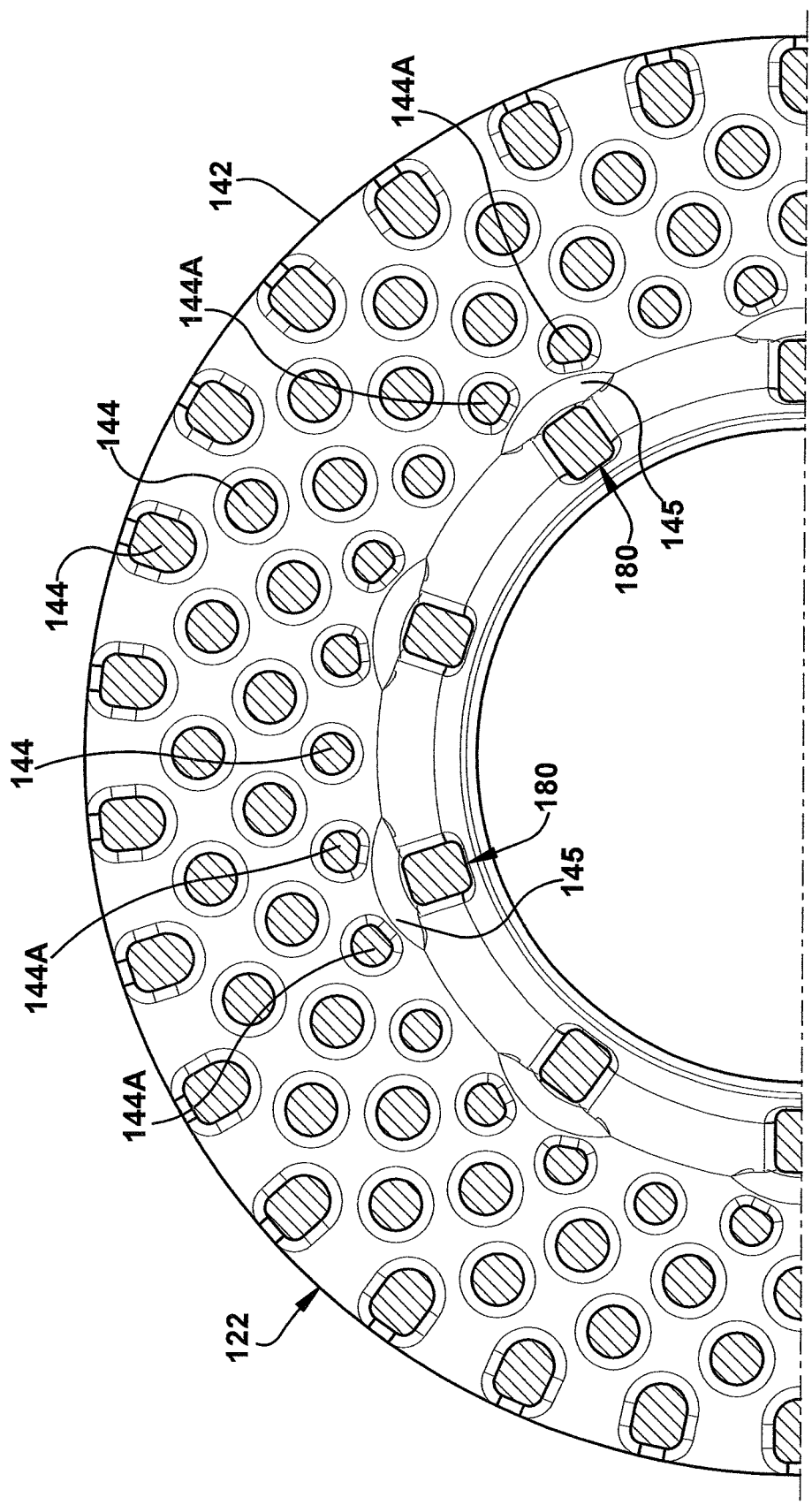
FIG. 15 is a view similar to FIG. 14 illustrating another portion of the rotor; taken approximately along the line 15-15 in FIG. 8.
Figure 16:
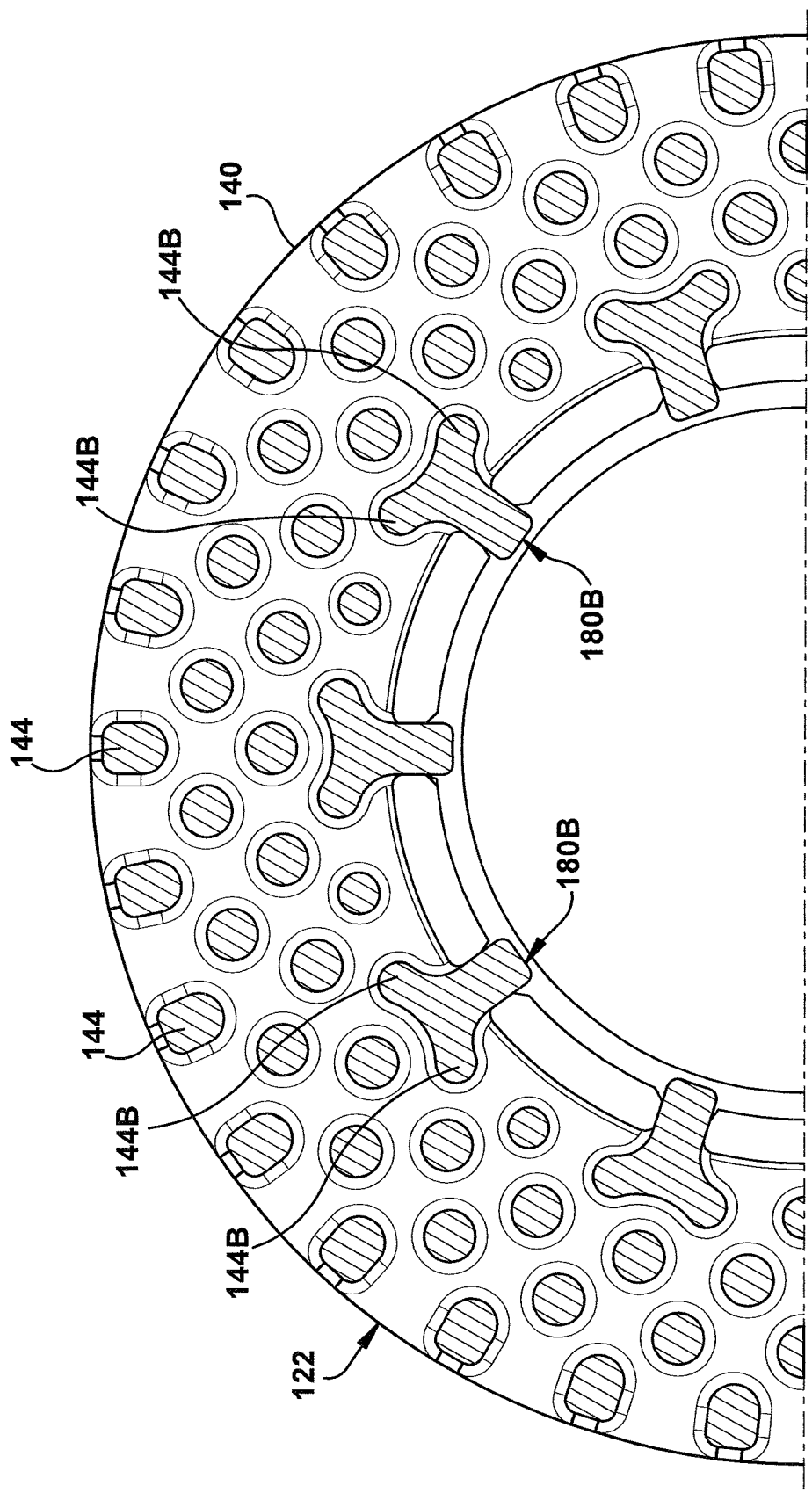
FIG. 16 is a view similar to FIG. 14 illustrating a portion of the rotor according to another aspect.
Figure 17:
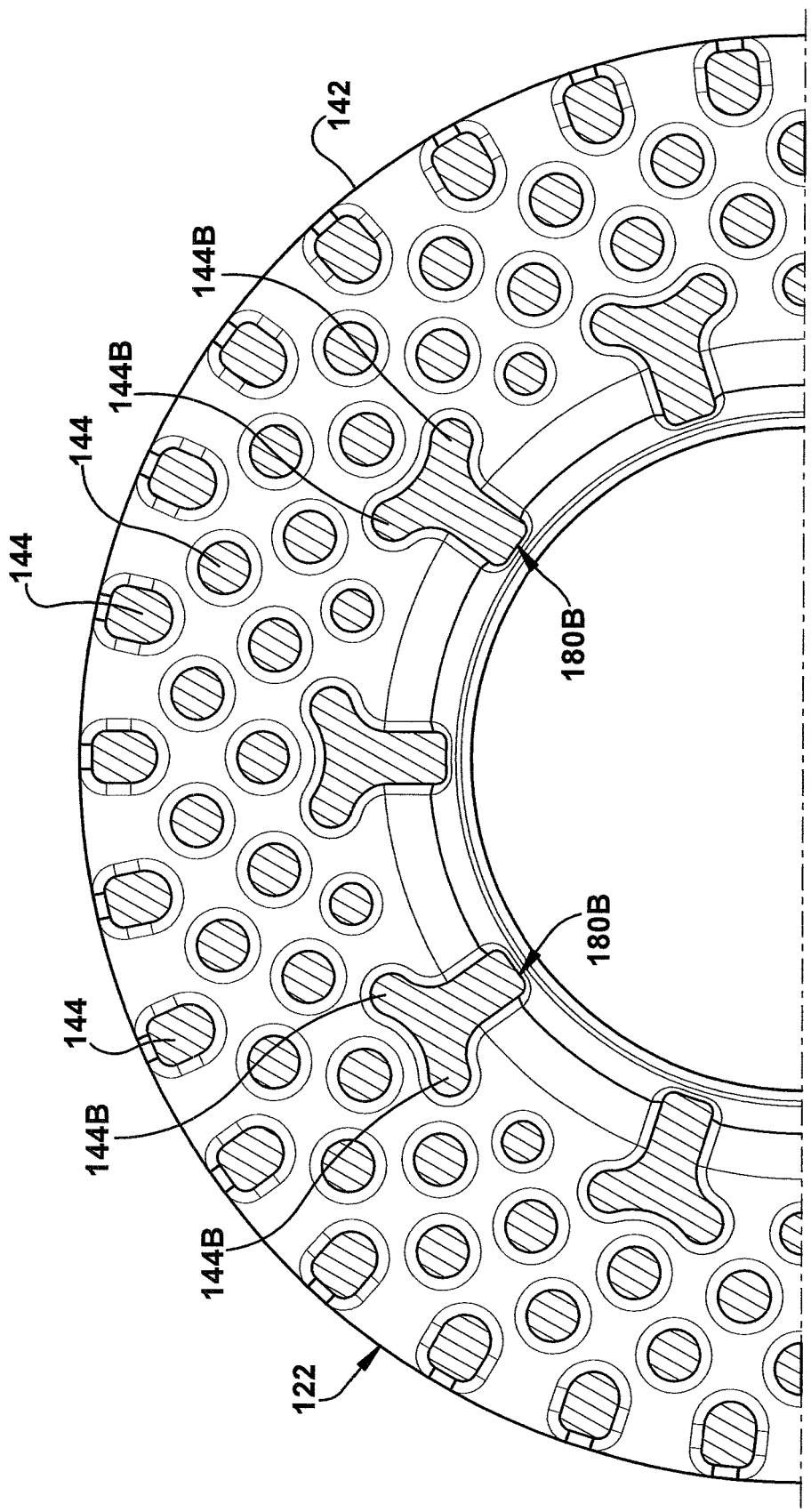
FIG. 17 is a view similar to FIG. 15 illustrating a portion of the rotor according to another aspect.

Reinforcement of the lugs 180, 180A due to placement and size of the pins 144 extending between the inboard and outboard discs 140, 142 is illustrated in FIGS. 14-17. For example, in FIG. 14, the inboard disc 140 has axially extending portions of the pins 144A truncated to create increased spacing 148 between the pins and the given lug 180, 180A to provide increased air flow. In FIG. 15, the outboard disc 142 has portions of the pins 144A truncated so material relief areas 145 can be created between the pins and a given lug 180, 180A to provide increased air flow. Material relief area 145 is cast so that when annular passage 185 is machined, such as with a plunge cut, the annular passage only needs to be machined to a depth that allows fluid communication between the annular passage and the air passage 146, which enables the depth 1D2 of root portion 197 (FIG. 12) to be maximized. In FIG. 16, the inboard disc 140 has two pins 144B integrally formed with each lug 180B. In FIG. 17, the outboard disc 142 has the pins 144B integrally formed with lug 180B into a generally Y-shaped structure to add further reinforcement and support of the lug.

Alternate versions of the boss 162, 162A on the tone ring 124 are illustrated in FIGS. 13a and 18-20. Each boss 162, 162A may alternatively include a pair of dart projections 188B1 and 188E32 (FIGS. 13a and 18) that are circumferentially aligned trailing end to leading end formed on the inboard facing surface 190 of the boss. It will be apparent that the two dart projections 188B1, 188E32 may be located side-by-side axially on the inboard facing surface 190 of the boss 162, 162A.

Each dart projection 188B1, 188E32 preferably has a triangular cross-section taken in the circumferential direction. Each dart projection 188B1, 188E32 increases in height as it progresses to the right, as viewed in FIG. 13a, to a respective apex 189B1 and 189E32. The height of each of the apexes 189B1, 189E32 is at least about 0.35 mm and preferably at least about 0.5 mm. As each boss 162, 162A is seated in a respective lug 180, 180A and rotated in the first direction, the dart projections 188B1 and 188E32 ride along and wedge against the inboard surface 192 of the groove 182 of the respective lug to fill in at least a portion of space between the respective boss and inboard surface of the lug. The dart projections 188B1 and 188E32 force the tone ring 124 against the outboard wall 194 of the groove 182.

The circumferential extent of each of the dart projections 188B1, 188E32 may be any appropriate length that will fit on the inboard facing surface 190 of the boss 162, 162A. The apex 189B1 is located circumferentially inside from the surface 168 of tab 166 or a circumferential end surface of the lug 180. The apexes 189B1 and 189B2 of both dart projections 188B1 and 188B2 are preferably located inside of the circumferential extent of the lug 180, 180A. The pair of dart projections 188B1, 188B2 provide additional holding force to resist rotation of the tone ring 124 in the second direction, or counterclockwise direction in FIG. 18, relative to the disc brake rotor portion 122 by providing two structures that deform and dig into the inboard surface 192 of the groove 182.

Specifically, the apexes 189B1, 189E32 of both of the dart projections 188B1, 188B2 preferably dig into and deform a portion of the lugs 180, 180A to provide additional holding force to resist rotation in the counterclockwise direction of the tone ring 124 relative to the disc brake rotor portion 122 by providing two structures that deform and dig into the inboard surface 192 of the groove 182. The apex 189B1 of the trailing dart projection 188B1 is located in spacing S (FIG. 18) preferably at least 0.5 mm and more preferably 1.0 mm within a respective lug 180, 180A from the circumferential end surface 181 of the lug 180 or the surface 168 of tab 166 of the designated boss 162A.

Figure 13A:
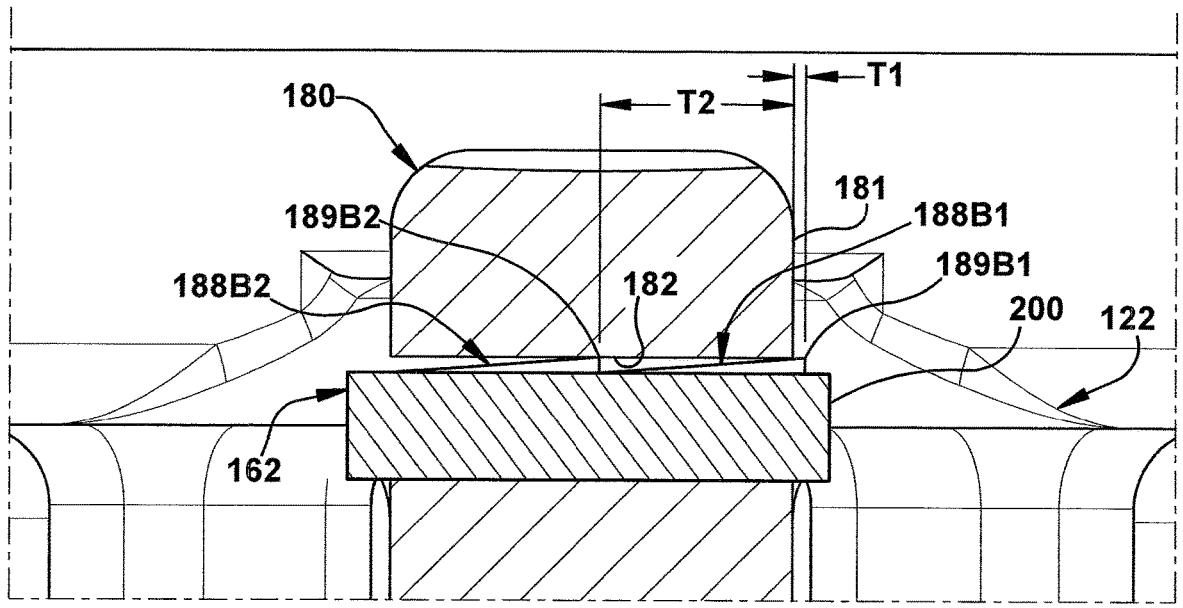
FIG. 13a is a greatly enlarged cross-sectional view of a portion of the tone ring mounted to the rotor, similar to FIG. 13, and having two dart projections on a boss of the tone ring installed in a groove of a lug of the rotor.
Figure 14:
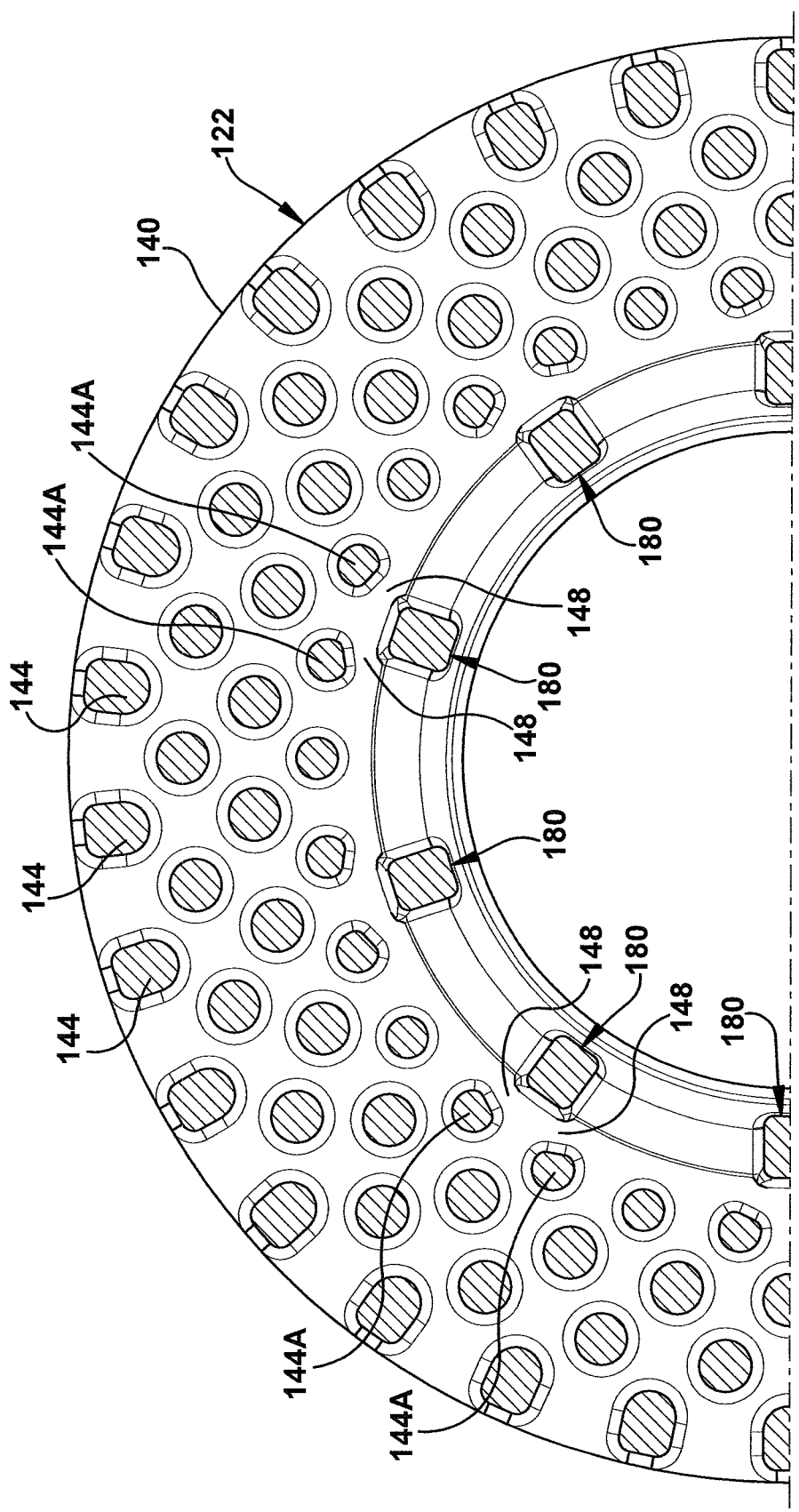
FIG. 14 is a cross-sectional view of a portion of the rotor, taken approximately along the line 14-14 in FIG. 8.

There may be situations where the apex 189B1 of dart projection 188B1 may be located outside of the circumferential extent of the lug 180, 180A by a distance T1, as illustrated in FIG. 13a. The apex 189E32 of dart projection 188E32 would be located within the circumferential extent of the lug 180 by a distance T2. Relative circumferential movement in a second opposite or counterclockwise direction between the tone ring 124 and the disc brake rotor portion 122 is, thus, prevented by the apex 189B2 of the dart projection 188E32 deforming and digging into the inboard surface 192 of the groove 182 of the lug 180, 180A.

In FIG. 19, the tone ring 124 is illustrated with the designated boss 162A having three dart projections 188C arranged in a triangular configuration. The three dart projections 188C may be arranged in any suitable configuration. The three dart projections 188C provide additional holding force to resist rotation of the tone ring 124 in the second direction, or counterclockwise direction in FIG. 19, relative to the disc brake rotor portion 122 by providing three respective apexes 189C of the three dart projections that deform and dig into the inboard surface 192 of the groove 182. The apexes 189C of the trailing dart projections 188C are located in spacing S, preferably at least 0.5 mm and more preferably 1.0 mm circumferentially from the surface 168 of tab 166. It is to be understood that any of the bosses 162 of the tone ring 124 could also include three dart projections 188C arranged in any suitable configuration.

In FIG. 20, the tone ring 124 is illustrated with the designated boss 162A having four dart projections 188D shown arranged as two side-by-side pairs, with the dart projections of each pair being circumferentially aligned trailing end to leading end. The four dart projections 188D provide additional holding force to resist rotation of the tone ring 124 in the second direction, or counterclockwise direction in FIG. 20, relative to the disc brake rotor portion 122 by providing four respective apexes 189D of the four dart projections that deform and dig into the inboard surface 192 of the groove 182. The apexes 189D of the trailing dart projections 188D are located in spacing S preferably at least 0.5 mm and more preferably 1.0 mm circumferentially from the surface 168 of tab 166. The dart projections 188D may be arranged in any suitable configuration, such as located at different radial and circumferential distances on the designated boss 162A than that shown in FIG. 20. For example, the dart projections 188D may be located and positioned on the designated boss 162A so the apexes 189D of the leading dart projections do not touch or interfere with the apexes of the trailing dart projections in deforming and digging into the inboard surface 192 of the groove 182. It is to be understood that any of the bosses 162 of the tone ring 124 could also include four dart projections 188D arranged in any suitable configuration.

The disc brake rotor assembly 120 operates in a harsh environment under the vehicle. Contaminants, such as water, brine, road spray or various road salts, can splash onto the disc brake rotor assembly 120 during operation of the heavy-duty vehicle. The contaminants can potentially create corrosion cells expanding between the disc brake rotor portion 122 and the tone ring 124 in the grooves 182 in lugs 180. Rust-jacking may then develop in the grooves 182 as a result of the corrosion cells and may damage the tone ring 124 and/or the disc brake rotor portion 122 or render at least one of them inoperable or less effective, causing down time of the heavy-duty vehicle. In order to further minimize the formation of corrosion cells and rust-jacking, the tone ring 124 may be provided with a corrosion resistant coating or treatment.

Rust-jacking is reduced or prevented by applying a corrosion resistant coating or treatment, such as a zinc-rich coating 200 (FIGS. 10, 13, and 13a), on the tone ring 124 according to the subject disclosure. The zinc-rich coating may be applied to all surfaces of the tone ring 124 or selected surfaces or portions. The zinc-rich coating 200 may be a primer that is an organic epoxy, acrylic or urethane primer, an inorganic primer, or a polyester-based coating. The zinc-rich coating 200 may also be applied to the grooves 182 of the lugs 180, 180A of the disc brake rotor portion 122. The zinc-rich coating 200 may be in a powder form or a liquid/suspension form before being applied to the tone ring 124.

The zinc-rich coating 200 applied in a powder form may include a zinc content that is in a range of from about ten percent (10%) zinc to about ninety-nine percent (99%) zinc by weight in a dried film. The zinc-rich coating 200 may include a zinc content that is in a range of from about seventy percent (70%) zinc to about ninety percent (90%) zinc by weight in a dried film.

The zinc-rich coating 200 in a powder form may include a percentage of solids that is in a range of from about sixty percent (60%) to about one-hundred percent (100%) by weight. An exemplary zinc-rich coating 200 in a powder form may be an epoxy powder coating sold by PPG Industries under the brand name Evirocron® XZR Powder Coat. The epoxy powder coating may have a composition of about sixty percent (60%) to about one about hundred percent (100%) zinc powder by weight, about five percent (5%) to about ten percent (10%) percent bisphenol-A-(epichlorhydrin) by weight, about five percent (5%) to about ten percent (10%) phenol by weight, about one percent (1%) to about five percent (5%) zinc oxide by weight, about one percent (1%) to about five percent (5%) epoxy resin by weight, and from about 1/10th percent (0.1%) to about one percent (1%) bisphenol A by weight.

The zinc-rich coating 200 may be applied to the tone ring 124 in one coat, although multiple coats may be employed, depending on specific requirements. Preferably, when zinc-rich coating 200 is applied to the tone ring 124 as a powder coat, the coating has a thickness that is about at least one thousandth of an inch (0.001") dry film thickness. The zinc-rich coating may be applied to the tone ring 124 with a minimum thickness of from about one and a half thousandths of an inch (0.0015") wet film thickness.

The zinc-rich coating 200 may also be applied in a liquid/suspension form to the tone ring 124. The zinc-rich coating 200 may include a zinc content that is in a range of from about ten percent (10%) zinc to about ninety-nine percent (99%) zinc by weight in a dried film. The zinc-rich coating 200 in a liquid/suspension form may include a zinc content that is in a range of from about seventy percent (70%) zinc to about ninety-six percent (96%) zinc by weight in a dried film. The zinc-rich coating 200 may include a zinc content that is in a range of from about eighty-five percent (85%) zinc to about eight-nine percent (89%) zinc by weight in a dried film.

The zinc-rich coating 200 in a liquid/suspension form before being applied to the tone ring 124 may include a percentage of solids that is in a range of from about fifty percent (50%) to about ninety percent (90%) by weight, or from about ten percent (10%) to about fifty percent (50%) by volume. The zinc-rich coating 200 may include a percentage of solids of about seventy percent (70%) by weight, or about thirty percent (30%) by volume. In addition, the zinc-rich coating 200 may include a maximum particle size of zinc of about 100 microns in the coating suspension.

An exemplary zinc-rich coating 200 in a liquid/suspension form may be PPG Industries ZNP-101 Organic Zinc Rich Primer, Spectracon® 611-1K Organic Zinc Rich Primer, having a composition of about thirty percent (30%) to sixty percent (60%) zinc powder by volume, about seven percent (7%) to about thirteen percent (13%) magnesium chloride by volume, about five percent (5%) to about ten percent (10%) Toluene by volume, about three percent (3%) to about seven percent (7%) butanone by volume, from about one percent (1%) to about five percent (5%) diacetone alcohol by volume, about one percent (1%) to about five percent (5%) Acetone by volume, about one (1) to about five percent (5%) Zinc Oxide by volume, about one half percent (0.5%) to about one and a half percent (1.5%) Silica by volume, about zero point one (0.1%) to about one percent (1%) xylene by volume, and from about one-tenth percent (0.1%) to about one percent (1%) Ethylbenzene by volume. Another exemplary zinc-rich coating may be Geomet® 360 or Geomet® 720.

The zinc-rich coating 200 applied from a liquid/suspension form may have a thickness that is at least about one thousandths of an inch (0.001") dry film thickness. The zinc-rich coating 200 applied from a liquid/suspension form may be applied to the tone ring 124 in a thickness of from about two thousandths of an inch (0.002") to about six thousandths of an inch (0.006) wet film thickness. The zinc-rich coating 200 applied from a liquid/suspension form may preferably be applied to the tone ring 124 in a thickness of from about 22 ten thousandths of an inch (0.0022) to about five thousandths of an inch (0.005) wet film thickness. The zinc-rich coating 200 applied from a liquid/suspension form may more preferably be applied to the tone ring 124 in a thickness of from about 24 ten thousandths of an inch (0.0024) to about forty-five ten thousandths of an inch (0.0045).

It is to be understood that other coatings, such as Zinc-Aluminum coatings, and coatings that employ combinations of Zinc and other elements, may be used without affecting the overall concept or operation of the subject disclosure. For example, zinc-rich coating 200 optionally may include compositions of other materials or elements with zinc, such as micaceous iron oxide (MIO), cadmium, aluminum, stainless steel, tin, brass, and/or manganese. In addition, coatings known to those skilled in the art, such as Geomet® coatings, Magna coatings, Dacromet coatings, and MIO coatings may be used alone in zinc-rich coating or in combination with other zinc or other elements or materials. An exemplary optional zinc-rich coating is an organic MIO primer sold by Rivera Coatings under the brand name RP-2 Zinc-MIO Primer. When RP-2 Zinc-MIO Primer is employed as a liquid/suspension coating, zinc-rich coating is applied to the tone ring 124 in a thickness of from about six thousandths of an inch (0.006") to about fourteen thousandths of an inch (0.014") wet film thickness; more preferably in a thickness of from about 65 ten thousandths of an inch (0.0065) to about 135 ten thousandths of an inch (0.0135) wet film thickness.

The zinc-rich coating 200 may be applied by spraying, dipping, or other means for applying liquid/suspension coatings known to those skilled in the art. In addition, the zinc-rich coating 200 may be applied in one coat, although multiple coats may be employed, depending on specific requirements.

Examples of other corrosion-resistant materials that can be thermally sprayed on the tone ring 124 are a nickel-based steel alloy, or a high-chrome stainless steel. Alternatively, non-ferrous materials, such as aluminum, copper-based alloys or ceramics, also may be thermally sprayed on the tone ring 124 to provide protection from corrosion. Of course, other corrosion-resistant materials that can be thermally-sprayed also are contemplated by the subject disclosure. Such thermal-spraying is effective in providing long-lasting corrosion-resistance, because the thermal-sprayed material is metallurgically bonded to the tone ring 124 at an atomic level.

The application of zinc-rich coating 200 may include preparation of the tone ring 124. The preparation may include cleaning or washing the tone ring 124 to remove oil or dirt from surfaces of the tone ring. A tone ring 124 made from sintered iron-based powdered metal would be steam treated or polymer impregnated. Next, a pre-treatment may be applied to the tone ring 124 to optimize the adhesion of zinc-rich coating to the tone ring. For example, a phosphate pre-coat may be sprayed onto the tone ring 124 or the tone ring may be dipped into a bath of the phosphate pre-coat. A known method of applying zinc-rich coating to the tone ring 124 may be electrostatic spraying enabling optimum application of the zinc-rich coating on the tone ring 124. Exemplary phosphate pre-coats include iron phosphate, zinc phosphate, zirconium phosphate, and/or manganese phosphate. Any suitable pre-treatment may be utilized, such as silane coating, shot blasting/shot cleaning, and the like. In addition, the cleaning of the tone ring 124 may optionally be combined with pre-treatment of the tone ring using one-step cleaning and pretreatment methods or products, such as an ambient one-step cleaning and pretreatment product sold by Calvary Industries, Inc. under the brand name Enviroprep®.

Thus, the disc brake rotor assembly 120 includes an improved and stronger tone ring 124 and attachment structure 121 for attaching the tone ring to the disc brake rotor portion 122 that completely eliminates the metal roll pin stop structure utilized in the prior art. The tone ring 124 also includes improved corrosion resistance. Thus, the tone ring 124 and the attachment structure 121 of the subject disclosure overcome drawbacks, limitations and disadvantages found in prior art tone ring and tone ring attachment structures.

Another aspect of an improved tone ring and attachment structure of the subject disclosure is shown in FIGS. 21-36 and utilizes tubular steel to form the tone ring body and forming at least one dart projection on at least one of a plurality of bosses of the tone ring. A disc brake rotor assembly 320 (FIGS. 21-22) includes an improved tone ring attachment structure 322 (FIG. 21) that is used, for example, in heavy-duty vehicles, according to an aspect of the disclosed subject matter. The tone ring attachment structure 322 securely and operatively connects a separate or discrete tone ring 326 to a disc brake rotor portion 324 of the disc brake rotor assembly 320.

The improved tone ring 326 and tone ring attachment structure 322 address the needs and overcomes the drawbacks, limitations and disadvantages of prior art tone ring and attachment structures. That is, the disclosed subject matter provides an inexpensive and relatively quick way to manufacture the tone ring 326 and minimizes the potential for damage to the disc brake rotor portion 324 and/or the tone ring due to corrosion and rust-jacking. It is to be understood that the tone ring attachment structure 322 of the disclosed subject matter finds application in all types of disc brake rotors and all types of vehicles without affecting the concept or implementation of the tone ring attachment structure of the disclosed subject matter.

Figure 24:
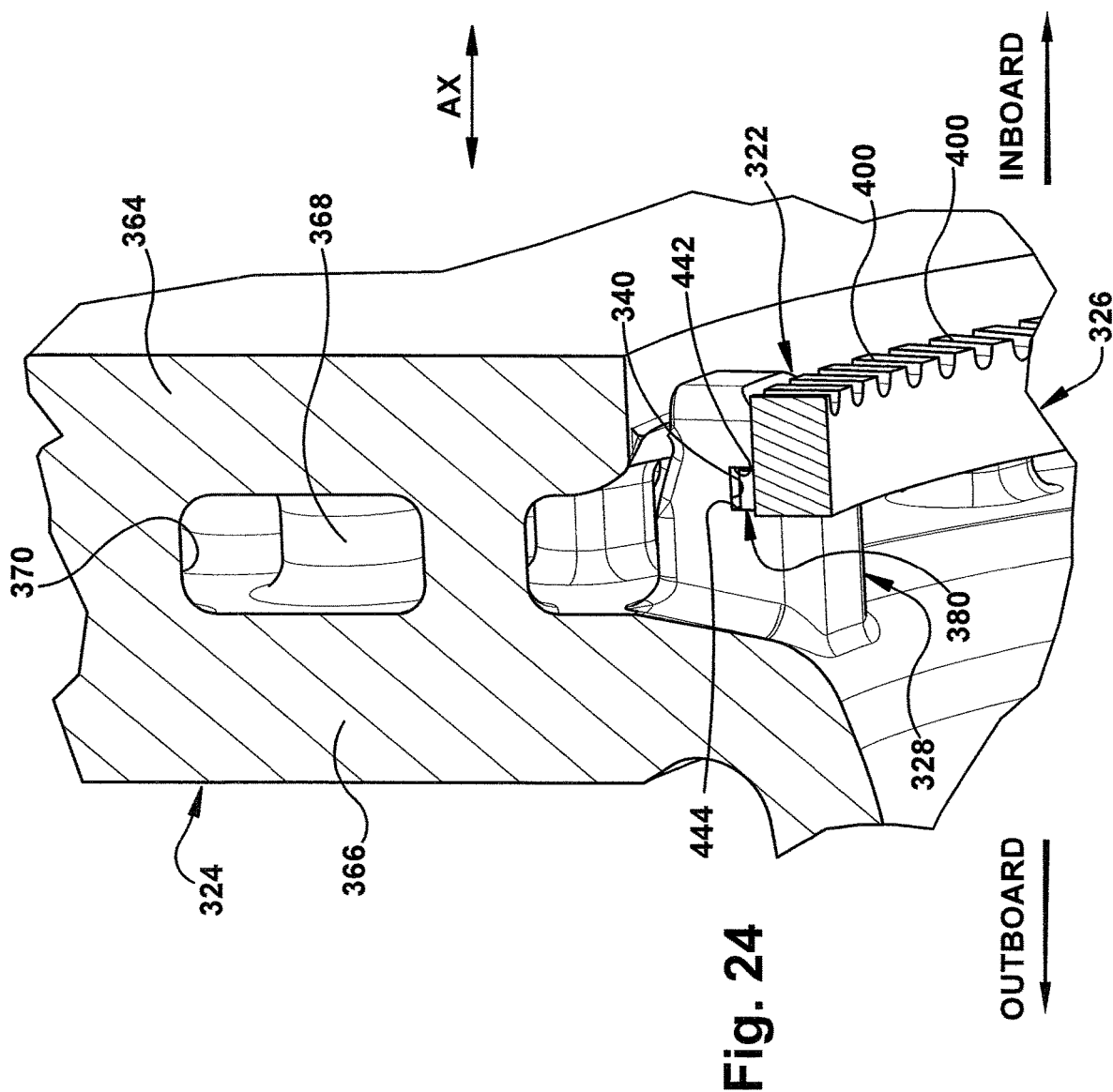
FIG. 24 is an enlarged fragmentary cross-sectional view of the tone ring attached to the disc brake rotor, taken approximately along the line 24-24 in FIG. 21.

The disc brake rotor portion 324 has a plurality of circumferentially-spaced lugs 328 (FIGS. 22 and 24-25) extending, for example, radially inward from an inboard end portion of the disc brake rotor. Each one of the lugs 328 has at least one surface defining a circumferentially extending groove 340 (FIGS. 22 and 24). The disc brake rotor portion 324 receives the tone ring 326 using the improved tone ring attachment structure 322. The tone ring 326 is typically mounted in the lugs 328 at the inboard end portion of the disc brake rotor portion 324.

The disc brake rotor assembly 320 also includes a flange portion 344 and a sleeve portion 346 (FIGS. 21-22) located between and connecting the disc brake rotor portion 324 and the flange portion. The disc brake rotor portion 342, the flange portion 344 and the sleeve portion 346 may be integrally formed as one-piece. The disc brake rotor portion 324 may be cast from a suitable material, such as gray iron, alloyed modified gray iron or compacted graphite iron. The disc brake rotor portion 324 may be subjected to peak temperatures in excess of 1100° F. and is regularly subjected to temperatures in the 480-800F° range. The material used to cast the disc brake rotor portion 324 must be able to withstand these temperatures, as well as physical forces applied during braking.

The flange portion 344 may be formed with a plurality of discrete radially extending mounting bosses 360 (FIG. 22). An opening 362 is formed in each mounting boss 360 to receive a mechanical fastener, such as a bolt (not shown), for removably securing the disc brake rotor assembly 320 with a wheel hub (not shown), as is known. The flange portion 344 may alternatively be formed as a continuous circular member and include the openings 362.

The disc brake rotor portion 324 of the disc brake rotor assembly 320 includes an inboard disc 364 (FIG. 24) and an outboard disc 366, which are spaced apart from one another and are interconnected by a plurality of pins 368 (FIGS. 22 and 24). The pins 368 provide a rigid connection between the inboard disc 364 and the outboard disc 366, while creating or defining radially-extending passages 370 to help cool the disc brake rotor. The pins 368 are structural members that extend between the inboard disc 364 and the outboard disc 366 and are integrally cast as one-piece with the inboard disc and the outboard disc. The inboard disc 364 and outboard disc 366 are typically located adjacent a respective one of a pair of brake pads (not shown), as is known, for frictional engagement to slow or stop rotation of the disc brake rotor assembly 320. It is to be understood that the inboard disc 364 and the outboard disc 366 could be spaced apart from one another and interconnected by a plurality of circumferentially spaced radially extending vanes (not shown) without affecting the overall concept or operation of the disclosed subject matter.

The lugs 328 are integrally formed on and extend radially inward from the disc brake rotor portion 324. At least four identical lugs 328, and preferably eight or ten identical lugs, are formed on the disc brake rotor portion 324. The lugs 328 are uniformly spaced apart about the inner circumference of the disc brake rotor portion 324. Each lug 328 is formed with the circumferentially extending groove 340 (FIGS. 22 and 24) in its radially inward facing surface.

Figure 23:
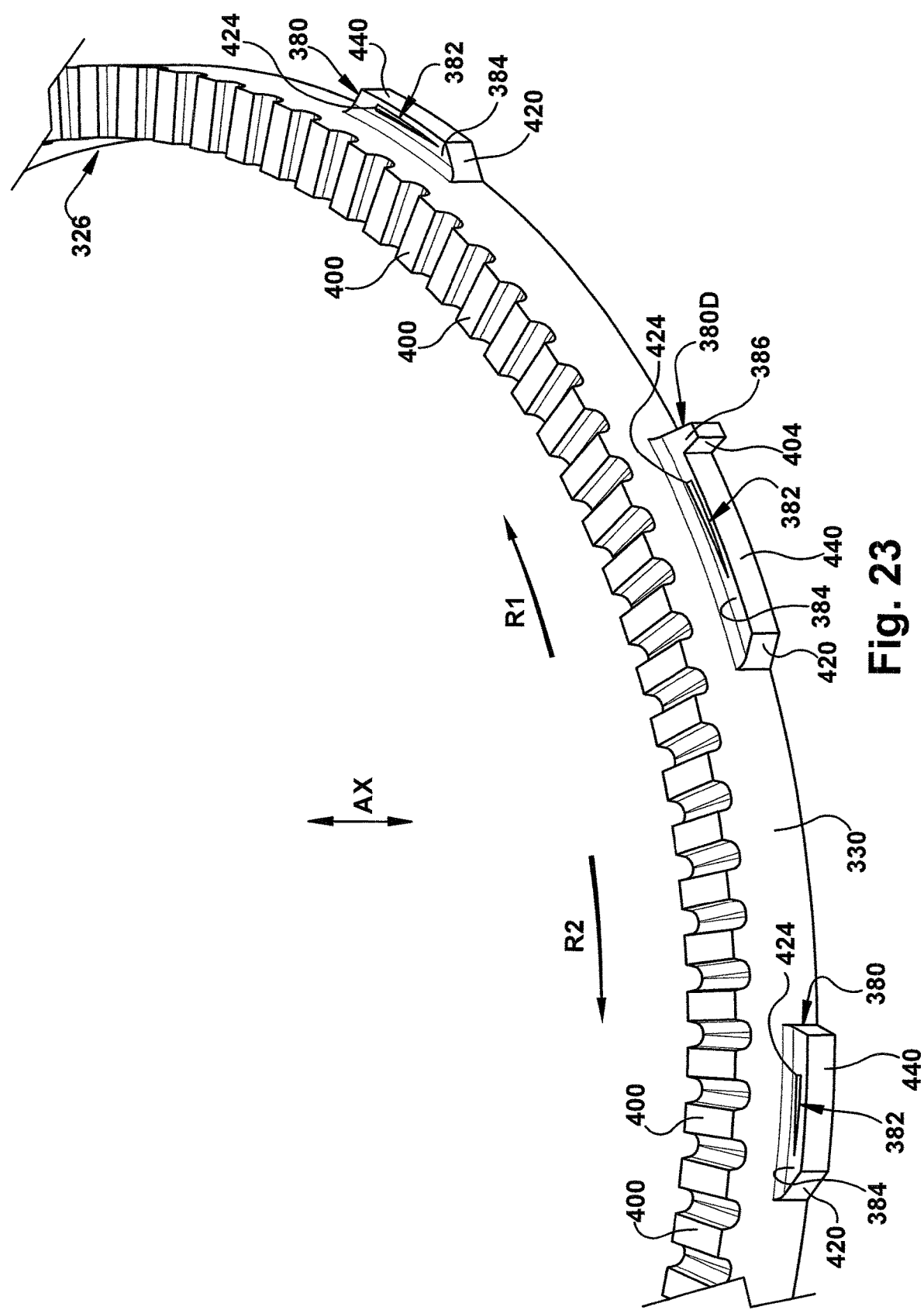
FIG. 23 is an enlarged perspective view of a portion of the tone ring illustrated in FIG. 22.
Figure 25:
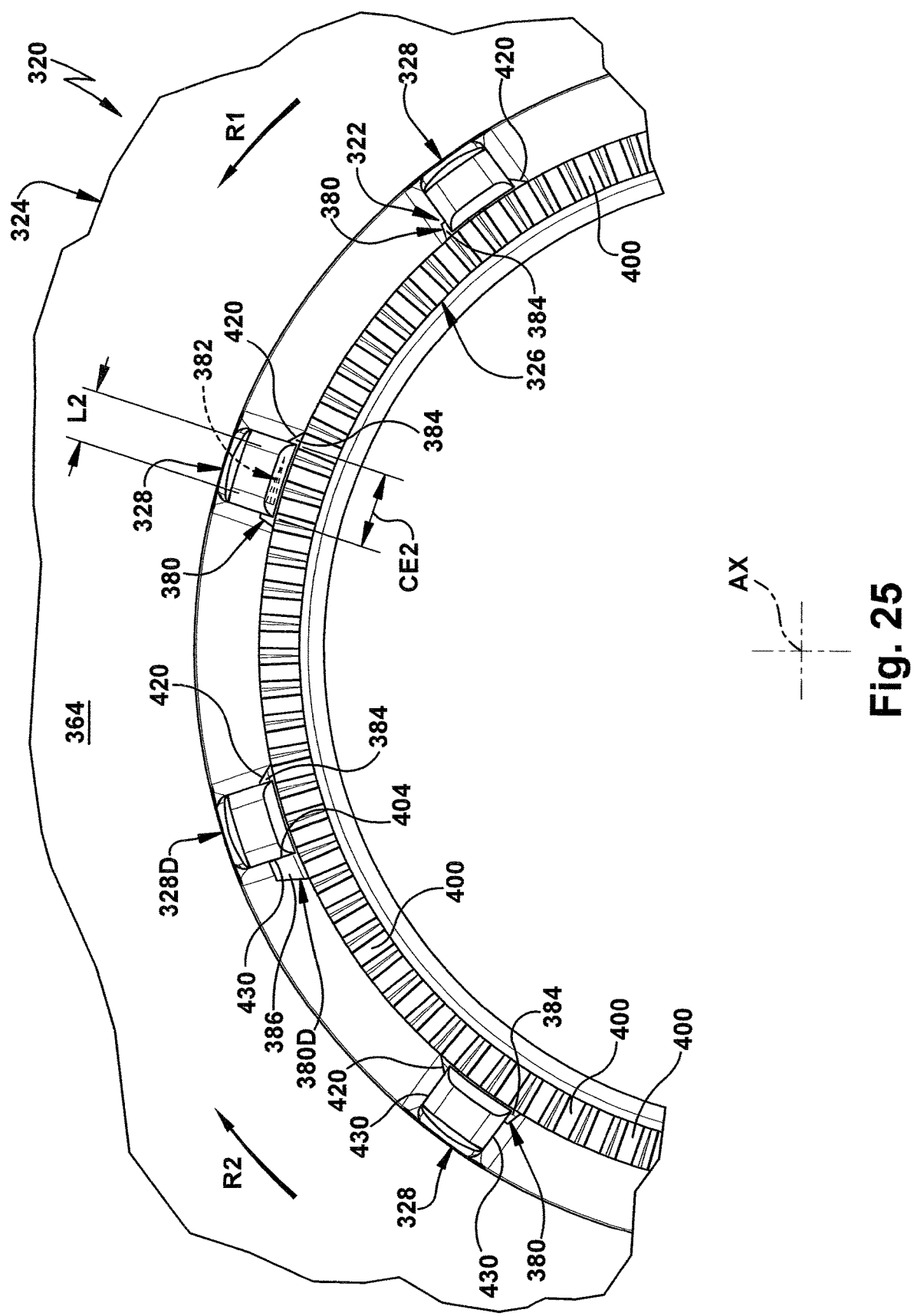
FIG. 25 is an enlarged plan view of a portion of the tone ring attached to the disc brake rotor.
Figure 26:
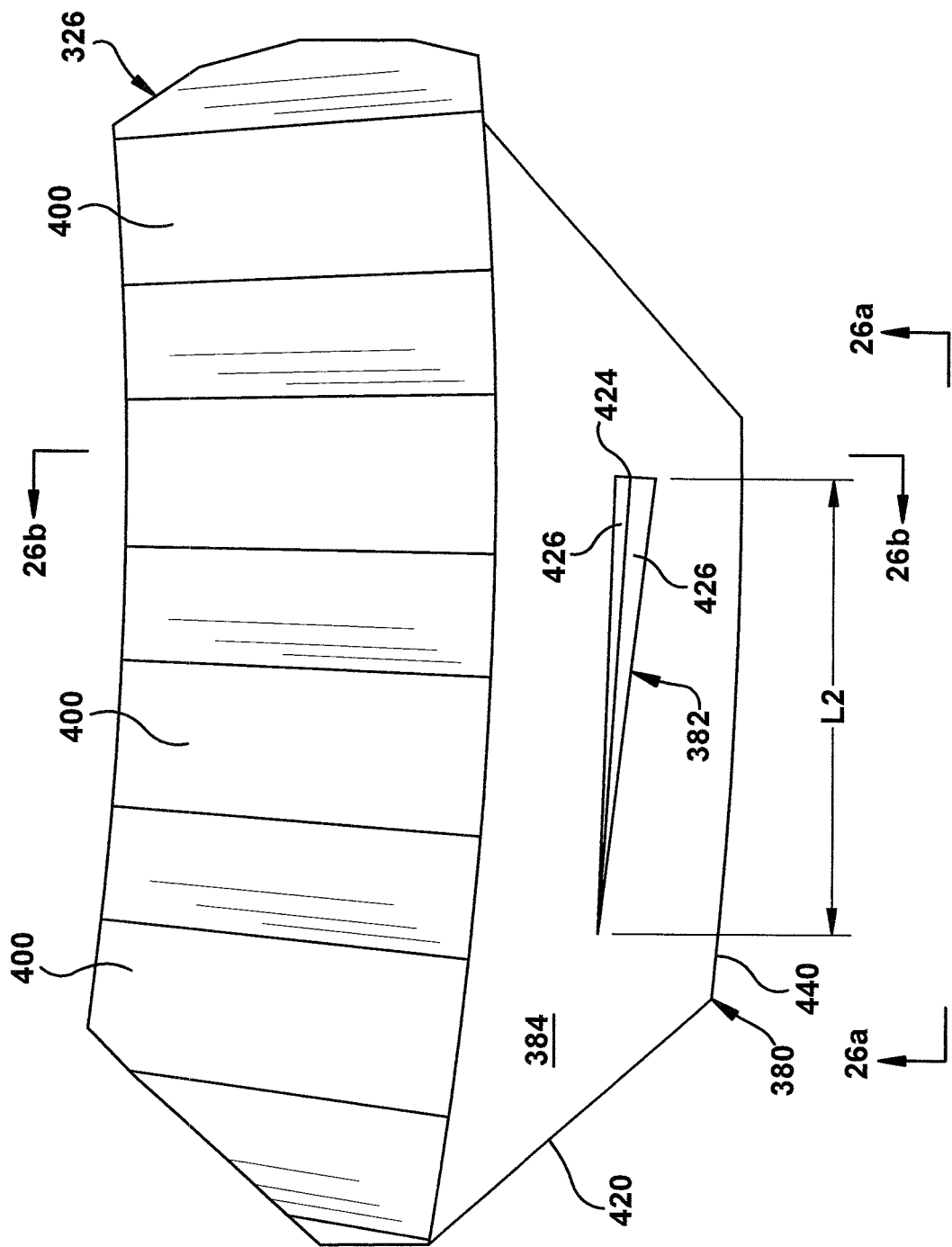
FIG. 26 is a greatly enlarged fragmentary plan view of a portion of a tone ring illustrated in FIG. 23.
Figure 26A:
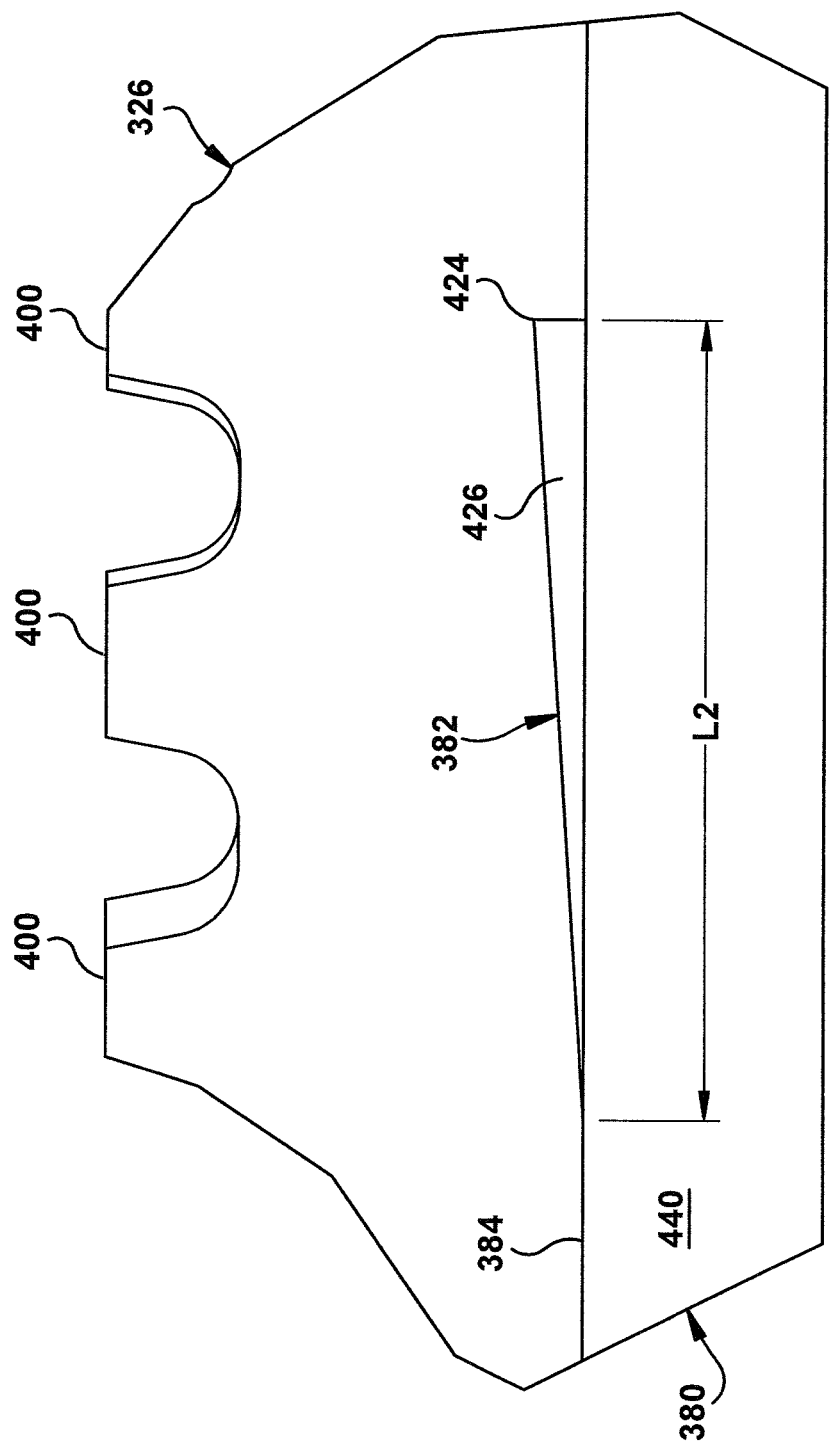
FIG. 26a is a side elevation view of the portion of the tone ring illustrated in FIG. 26, taken approximately along the line 26a-26a in FIG. 26, according to an aspect.
Figure 27:
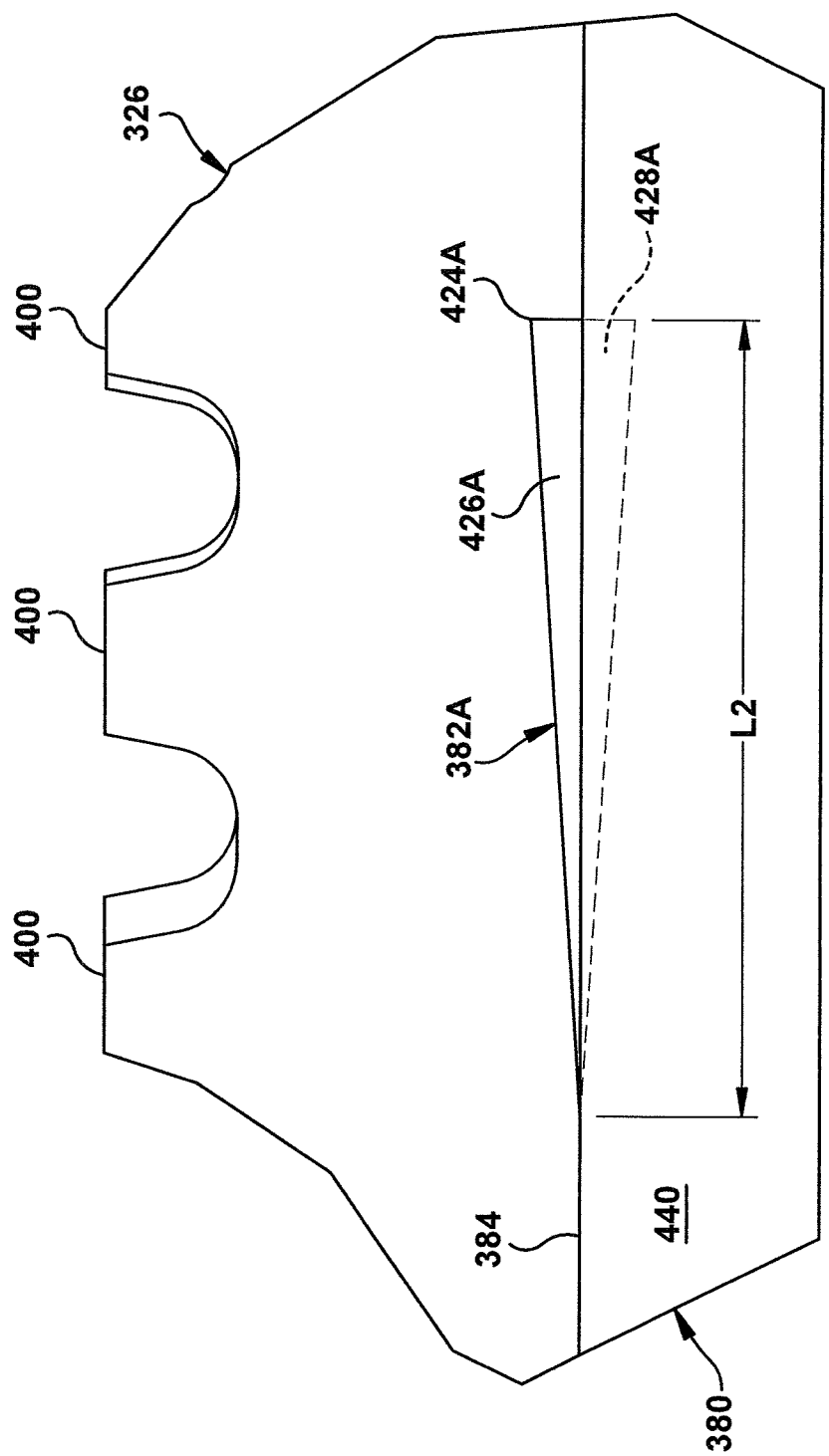
FIG. 27 is a side elevation view, similar to FIG. 26a, of the portion of the tone ring, according to another aspect.
Figure 28:
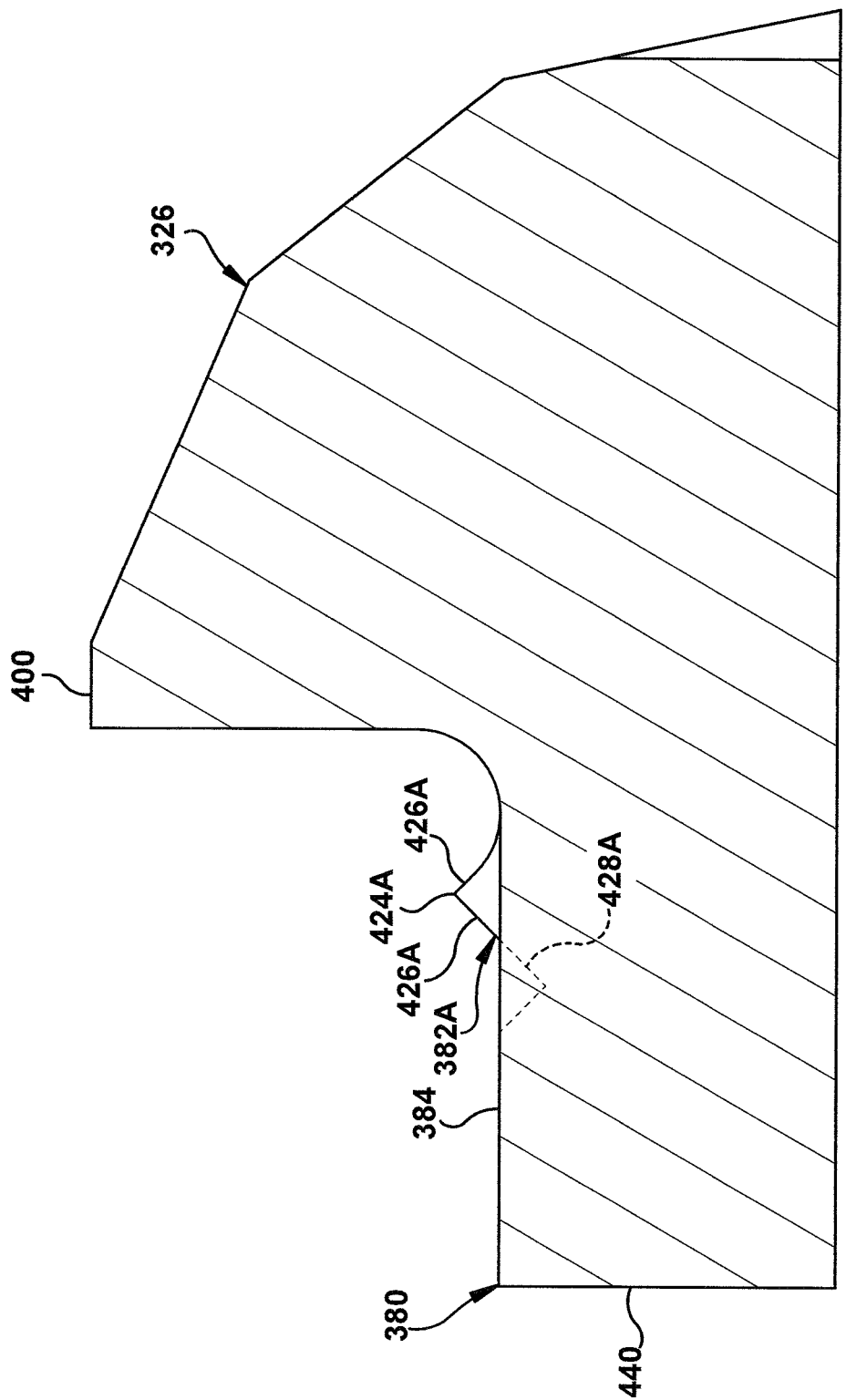
FIG. 28 is a cross-sectional view, similar to FIG. 26b, of the tone ring illustrated in FIG. 27.

The tone ring 326 may be made from any suitable material and in any suitable configuration. The tone ring 326 is preferably machined from tubular steel, which is typically a readily available stock material. The tone ring 326 is formed with a tone ring body 330 (FIGS. 22 and 23) made from the tubular steel and includes a plurality of circumferentially arrayed teeth 400 (FIGS. 23-25). The teeth 400 of the tone ring 326 are spaced apart a known distance and are machined into an axially inboard facing surface of the tone ring body 330. It will be apparent that the teeth 400 may extend from any suitable surface of the tone ring body and in any suitable direction. The teeth 400 of the tone ring 326 are capable of disrupting a magnetic field generated by an associated antilock braking system sensor (not shown). The tone ring 326 may be made from any suitable material that has the capability of disrupting magnetic fields.

As is known, the antilock braking system sensor detects disruptions to the magnetic field and produces electrical signals representative of, for example, the time between sensing disruption of the magnetic field by adjacent teeth 400. The antilock braking system sensor typically is attached to a component of the heavy-duty vehicle, such as an axle or axle component, in close proximity to the tone ring 326. The electrical signals produced by the antilock braking system sensor are communicated to an electronic control unit (not shown) of the antilock braking system. The electronic control unit controls the antilock braking system between actuated and unactuated states that are programmed into the electronic control unit.

The tone ring 326 also has a plurality of bosses 380 located and circumferentially spaced on the outer periphery of the tone ring body 330. At least four bosses 380, and preferably eight or ten bosses, are machined on the tone ring 326, and are uniformly spaced apart about the circumference of the tone ring. The size, number and locations of the bosses 380 preferably correspond to the size, number, and locations of the respective lugs 328 formed on the disc brake rotor portion 324. Each of the bosses 380 has a radial extent of less than about 4.5 mm, and preferably less than about 3 mm. Each boss 380 is received in a groove 340 of a respective one of the lugs 328 to secure the tone ring 326 to the disc brake rotor portion 324 and form the tone ring attachment structure 322.

At least one of the bosses 380 has at least one dart projection 382 (FIGS. 23 and 26-34) extending axially from a radially extending surface 384 of the boss. The radially extending surface 384 is preferably substantially planar and inboardly facing. The dart projection 382 may have a circumferentially extending length L2 (FIGS. 25-26 and 27) and is preferably located completely within the circumferential extent CE2 (FIG. 25) of the lug 328 when the tone ring 326 is completely attached to the disc brake rotor portion 324.

The dart projection 382 engages at least one surface defining the groove 340, for example, an axial inboard surface 442 (FIG. 24) of the lug 328, to inhibit movement in an axial direction AX (FIGS. 23-25) and rotational movement in a counterclockwise or first direction R1 of the tone ring 326 relative to the disc brake rotor portion 324. A tab 386 is formed on at least one of the bosses 380, such as a designated boss 380D. The tab 386 has a radially extending end surface 404 (FIGS. 23 and 25) that is engageable with a circumferential end surface 430 of one of the lugs 328, or a designated lug 328D, to inhibit rotational movement of the tone ring 326 relative to the disc brake rotor portion 324 in a clockwise or second direction R2 opposite the first direction R1.

The tone ring 326 is mounted on the disc brake rotor portion 324 by placing the tone ring within the disc brake rotor portion adjacent the inboard disc 364. The tone ring 326 is positioned so each boss 380, 380D is located between respective adjacent lugs 328, 328D. The tone ring 326 is then rotated, clockwise as viewed in FIGS. 23 and 25 or the second direction R2, until each respective boss 380, 380D is seated in a corresponding groove 340 of the respective lug 328, 328D. An angled leading edge 420 (FIGS. 23 and 25) is provided on each boss 380, 380D to guide and facilitate installation in the groove 340 of the respective lug 328, 328D. Unintentional rotation of the tone ring 326 relative to disc brake rotor portion 324 may cause the tone ring to unseat from the disc brake rotor and become ineffective. The end surface 404 (FIGS. 23 and 25) of the tab 386 of the designated boss 380D abuts a circumferential end surface 430 of a designated lug 328D to prevent rotation of the tone ring 326 relative to the disc brake rotor portion 324 in the second direction R2, such as clockwise as viewed FIG. 25.

Each boss 380, 380D includes the dart projection 382 formed on the radially extending surface 384 of the boss. The dart projection 382 may be formed from displaced material of the boss 380, 380D. The dart projection 382 engages the inboard surface 442 of the respective lug 328, 328D to inhibit relative movement in the axial direction AX and relative rotational movement in the first direction R1 between the tone ring 326 and the disc brake rotor portion 324.

An exemplary dart projection 382 (FIGS. 26-26*b*) may be formed on the radially extending surface 384 of the boss 380, 380D. Another exemplary dart projection 382A (FIGS. 27-28) may be formed in the radially extending surface 384 of the boss 380, 380D. A further exemplary dart projection 382B (FIGS. 29-31) may be formed as one or more arcuate projections extending radially at the intersection of the radially extending surface 384 and an axially extending surface 440 of the boss 380,380D. Yet another exemplary dart projection 382C (FIGS. 32-34) may be formed at the intersection of the radially extending surface 384 and the axially extending surface 440 of the boss 380, 380D. While four exemplary aspects of dart projections 382, 382A, 382B and 382C are shown and described in detail, it is contemplated that a dart projection could be of any suitable size and configuration and could be produced by any suitable process.

The dart projection 382 (FIGS. 26-26*b*) according to one aspect may have a triangular cross-section, taken in the circumferential direction, with a pair of side walls 426 extending axially from the radially extending surface 384 of the boss 380, 380D. The dart projection 382 may have an apex 424. At least a portion of the triangular cross-section of dart projection 382 is located above the radially extending surface 384. The dart projection 382 increases in height as it progresses to the right over its length L2, as viewed in FIGS. 26-26*b*, to the apex 424 at an end portion. Each boss 380, 380D may include one or more of the dart projections 382.

The bosses 380, 380D of the tone ring 326 are machined from material of the tubular steel on the outer periphery of the tone ring body 330. The bosses 380 are further machined to include the radially extending surface 384. At least one of the bosses 380, 380D has at least one dart projection 382 formed from material of the boss to extend from the radially extending surface 384 of the boss and, for example, extending in the inboard direction. The hardness of the tone ring 326 may be greater than or equal to the hardness of the lugs 328, 328D and the disc brake rotor portion 324.

The apex 424 is located at the counterclockwise end portion of each dart projection 382. The height of the apex 424 above the radially extending surface 384 is at least about 0.35 mm and preferably at least about 0.5 mm. The apex 424 of each of the dart projections 382 deforms and digs into a portion of a respective one of the lugs 328, 328D to prevent relative rotational movement. The apex 424 of the dart projection 382 is preferably located within the circumferential extent CE2 of the lug 328, 328D when the tone ring 326 is mounted to the disc brake rotor portion 324, as illustrated in FIG. 25. Each apex 424 of the dart projections 382 is preferably spaced at least about 0.5 mm, and more preferably spaced about 1.0 mm, from the circumferential end surface 430 (FIG. 25) of the respective lug 328, 328D.

Rotational movement in the first direction R1 of the tone ring 326 relative to the disc brake rotor portion 324 is prevented by the interaction of the apex 424 of the dart projection 382 and the inboard surface 442 (FIG. 24) of the lug 328, 328D. The dart projection 382 also functions to occupy at least a portion of any space between the radially extending surface 384 of the boss 380, 380D and the inboard surface 442 of the groove 340 of the lug 328, 328D to inhibit or prevent relative axial movement in the axial direction AX between the tone ring 326 and the disc brake rotor portion 324. The dart projection 382 forces the tone ring 326 against an outboard wall 444 of the groove 340 of the respective lug 328, 328D. The end surface 404 of tab 386 works in concert with the dart projection 382 to prevent rotational movement in the second direction R2 of the tone ring 326 relative to the disc brake rotor portion 324 by engaging the circumferential end surface 430 (FIG. 25) of the designated lug 328D.

The dart projection 382A according to another aspect may have a triangular cross-section, taken in the circumferential direction, with side walls 426A resulting from displaced material (FIGS. 27-28) extending axially from radially extending surface 384 of the boss 380, 380D. The dart projection 382A may have an apex 424A. The triangular cross-section of the dart projection 382A is located above the radially extending surface 384 taken in the circumferential direction. The dart projection 382A increases in height as it progresses to the right over its length L2, as viewed in FIG. 27, to the apex 424A. There is a void space 428A where material may be displaced from below the radially extending surface 384. Each boss 380, 380D may include one or more of the dart projections 382A.

As each boss 380, 380D is seated in a respective lug 328, 328D and rotated in the second direction R2, as illustrated in FIG. 23, the apexes 424A (FIGS. 27 and 28) of the dart projections 382A ride along and wedge against the inboard surface 442 (FIG. 24) of the groove 340 of the respective lugs. The dart projections 382A occupy at least a portion of any distance between the bosses 380, 380D and the inboard surfaces 442 of the lugs 328, 328D. Each dart projection 382A forces the tone ring 326 against the outboard wall 444 of the groove 340 of the respective lug 328, 328D.

The apex 424A is located at the counterclockwise end of each dart projection 382A. The height of the apex 424A above the radially extending surface 384 is at least about 0.35 mm and preferably at least about 0.5 mm. The apex 424A of each of the dart projections 382A digs into and deforms the inboard surface 442 of a respective one of the lugs 328, 328D to block relative rotational movement in the first direction R1. The apex 424A of the dart projection 382 is preferably located within the circumferential extent CE2 of the lug 328, 328D when the tone ring 326 is mounted to the disc brake rotor portion 324, as illustrated in FIG. 25. Each apex 424A of the dart projections 382A is preferably spaced at least about 0.5 mm, and more preferably spaced about 1.0 mm, from the circumferential end surface 430 (FIG. 25) of a respective lug 328.

Rotational movement in the first direction R1 of the tone ring 326 relative to the disc brake rotor portion 324 is prevented by the interaction of the apex 424A of the dart projection 382A and the inboard surface 442 (FIG. 24) of the lug 328, 328D. The dart projection 382A also functions to occupy at least a portion of any space between the radially extending surface 384 of the boss 380, 380D and the inboard surface 442 of the groove 340 of the respective lug 328, 328D to inhibit or prevent relative axial movement between the tone ring 326 and the disc brake rotor portion 324. The end surface 404 of tab 386 works in concert with the dart projection 382A to prevent rotational movement in the second direction R2 of the tone ring 326 relative to the disc brake rotor portion 324.

Figure 29:
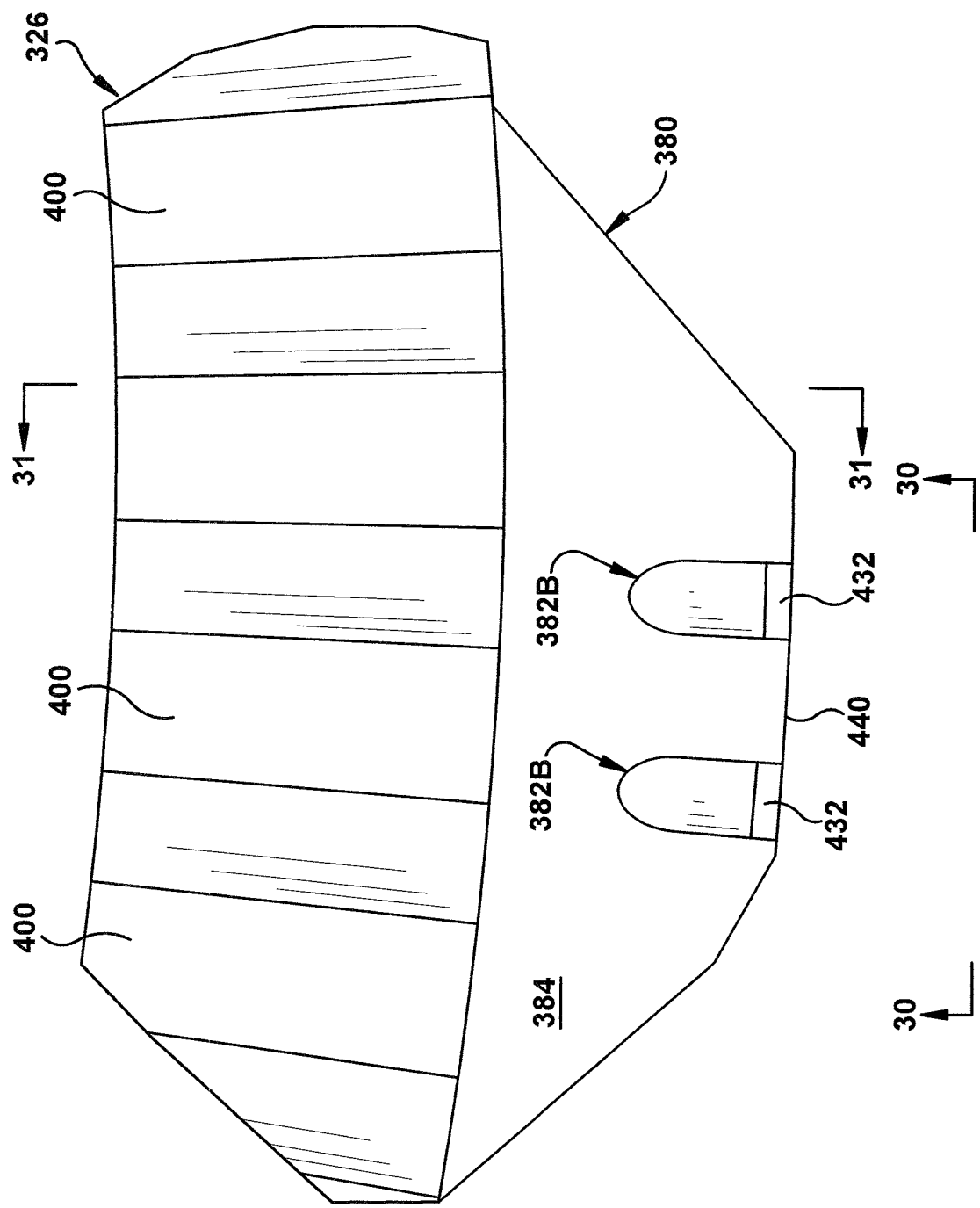
FIG. 29 is a greatly enlarged fragmentary plan view, similar to FIG. 26, of a portion of a tone ring, according to another aspect.
Figure 30:
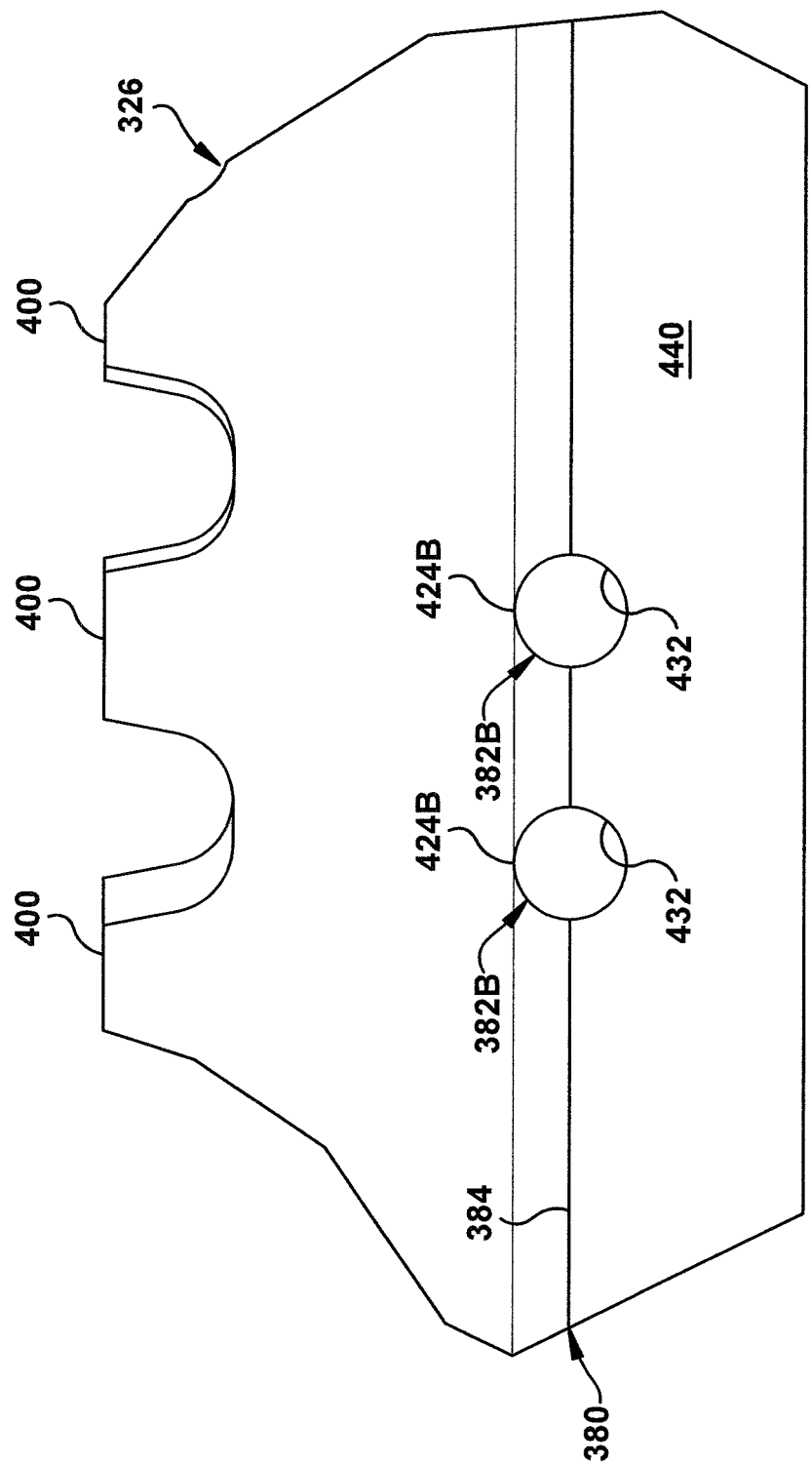
FIG. 30 is a side elevation view of the portion of the tone ring illustrated in FIG. 29, taken approximately along the line 30-30 in FIG. 29.
Figure 31:
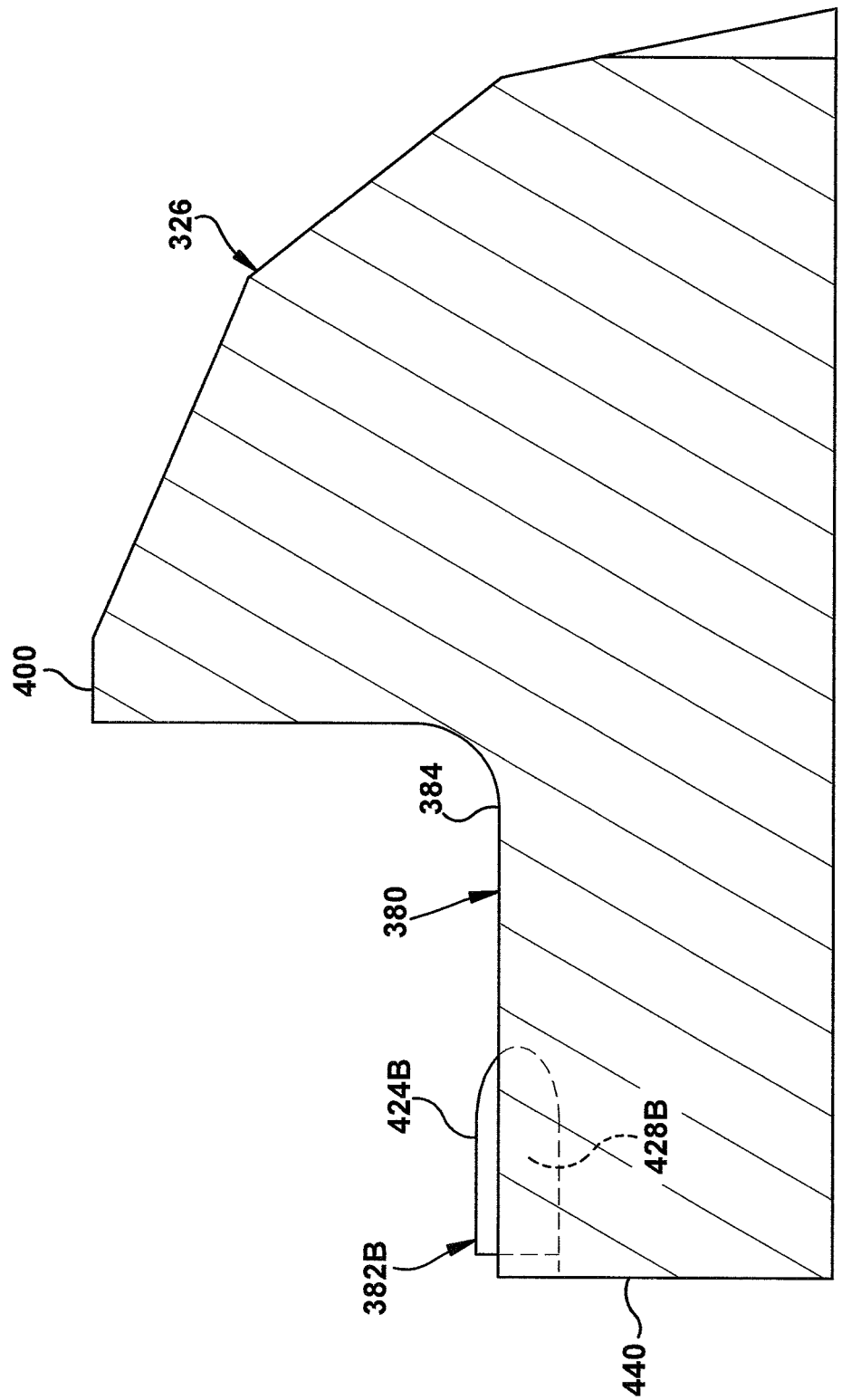
FIG. 31 is a cross-sectional view of the tone ring illustrated in FIG. 29, taken approximately along the line 31-31 in FIG. 29.
Figure 32:
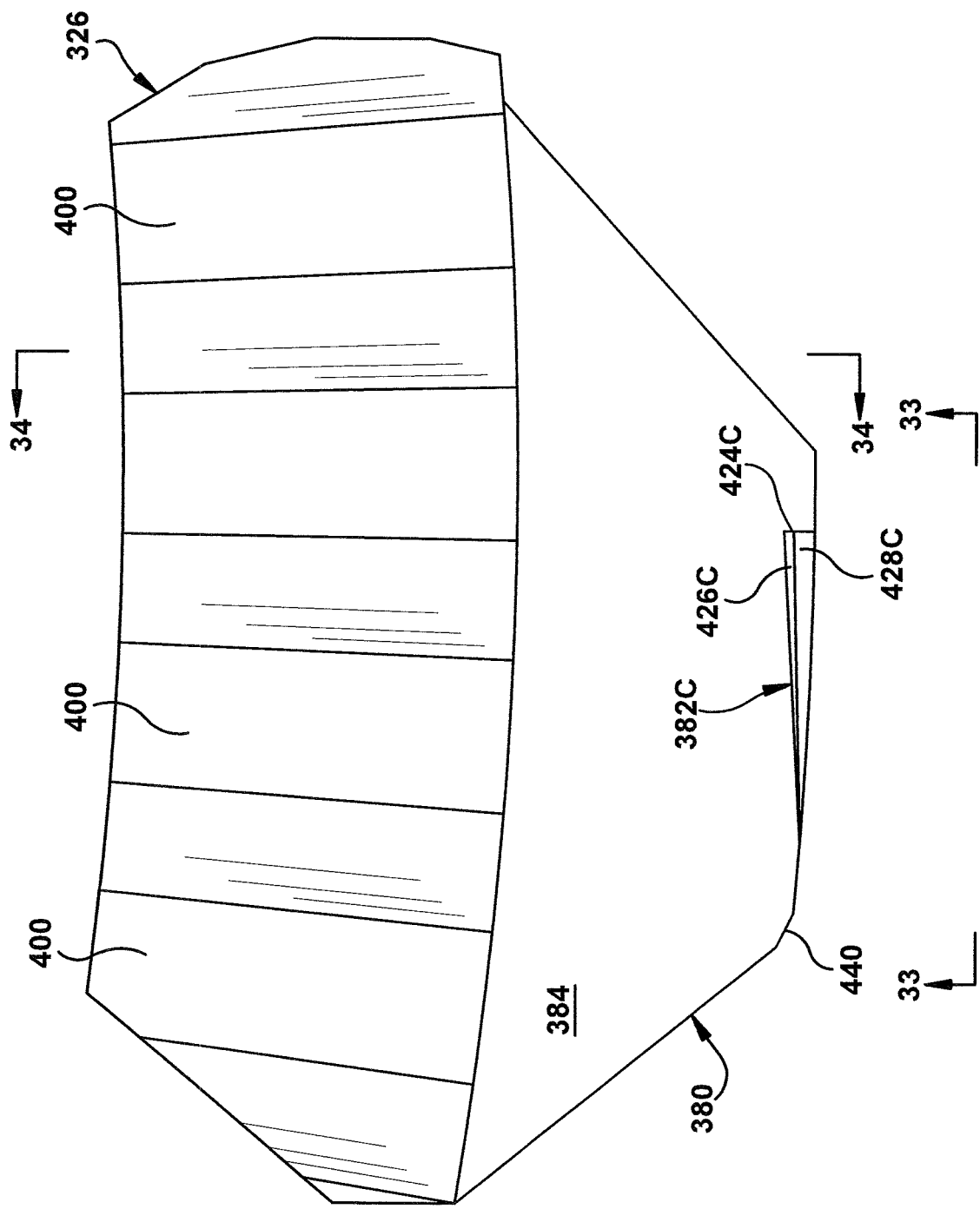
FIG. 32 is a greatly enlarged fragmentary plan view, similar to FIGS. 26 and 29, of a portion of a tone ring, according to yet another aspect.
Figure 33:
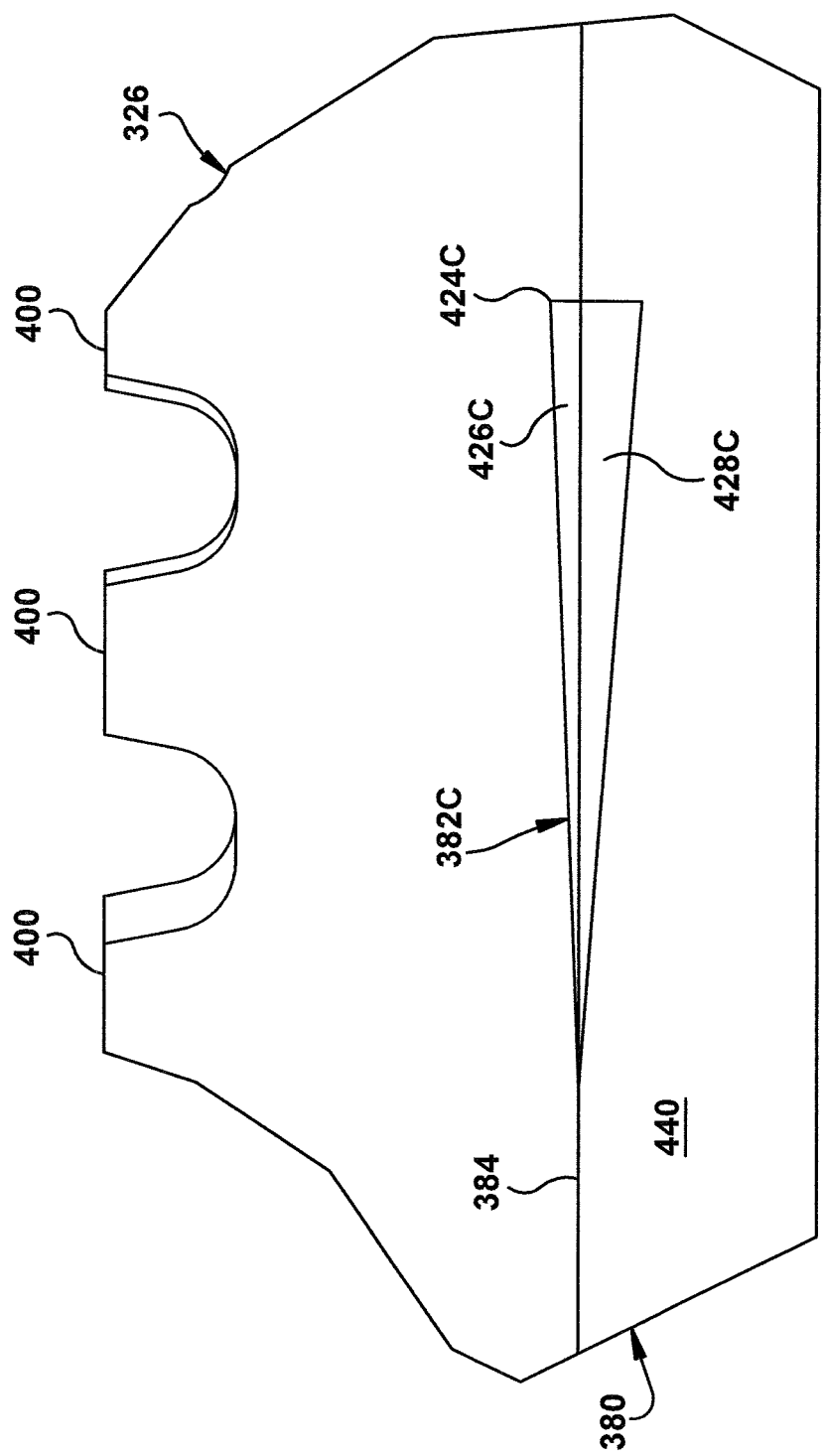
FIG. 33 is a side elevation view of the portion of the tone ring illustrated in FIG. 32, taken approximately along the line 33-33 in FIG. 32.
Figure 34:
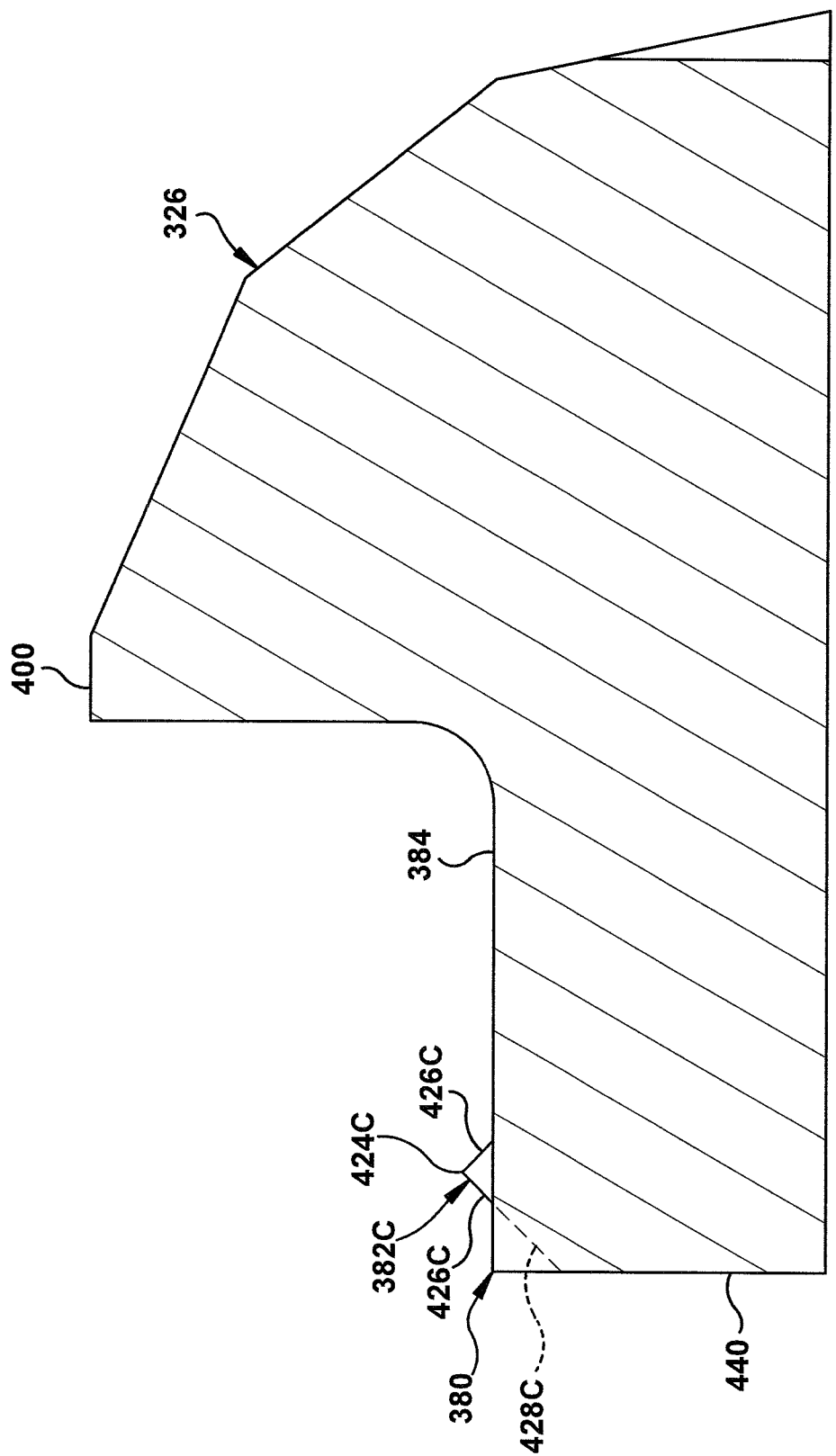
FIG. 34 is a cross-sectional view of the tone ring illustrated in FIG. 32, taken approximately along the line 34-34 in FIG. 32.

Alternatively, each boss 380, 380D may include at least one or more of the dart projection 382B (FIGS. 29-31) according to another aspect formed by displacing material radially inward to form a cavity or depression 432 in the axially extending surface 440 of the boss, as illustrated in FIG. 29. By way of example, two dart projections 382B are shown in FIGS. 29-31 and are formed by displacing material of the boss 380, 380D radially inward from the axially extending surface 440 to create a cylindrically shaped structure of compacted material. Each dart projection 382B has an arcuate cross-section taken in the radial direction above the radially extending surface 384. Each dart projection 382B may reduce in height or may have a substantially constant height as it progresses radially inward from the axially extending surface 440. It will be apparent that due to the displacement of material, the dart projection 382B could have different and varying cross-sections and heights. There is also some compacted and/or displaced material 428B below the radially extending surface 384.

The height of at least a portion of the dart projections 382B above the radially extending surface 384 is at least about 0.35 mm, and preferably at least about 0.5 mm. Alternatively, one dart projection 382B, such as the left one as viewed in FIGS. 29-30, could have a shorter height than the other dart projection on the right. As each boss 380, 380D is seated in a respective lug 328, 328D and rotated, apexes 424B (FIGS. 30-31) of dart projections 382B ride along and wedge against the inboard surface 442 (FIG. 24) of the groove 340 of the respective lugs to occupy at least a portion of any distance between the boss and inboard surfaces of the lugs. The dart projections 382B force the tone ring 326 against the outboard wall 444 of the groove 340 and the apexes 424B deform and dig into the inboard surface 442 of the lug 328, 328D. The dart projections 382B are preferably both located inside of the circumferential extent CE2 of the lug 328, 328D.

Alternatively, each boss 380, 380D may include at least one or more of the dart projection 382C (FIGS. 32-34) according to another aspect. The dart projection 382C may be formed to extend away from the radial extending surface 384 of the boss 380, 380D. The dart projection 382C may be formed at the intersection of the radially extending surface 384 and the axially extending surface 440 of the boss 380, 380D. The dart projection 382C may have a triangular cross-section formed by side walls 426C that result from displaced material of the boss 380, 380D. The dart projection 382C may have an apex 424C extending axially from the radially extending surface 384 of the boss 380, 380D. The apex 424C is located at the counterclockwise end of the dart projection 382C, as viewed in FIGS. 32-33. There is a void space 428C where material is displaced from below the radially extending surface 384 and axially extending surface 440 to form the dart projection 382C. Each boss 380, 380D may include one or more of the dart projections 382C.

The dart projection 382C has a triangular cross-section located above the radially extending surface 384 taken in the circumferential direction. The dart projection 382C increases in height as it progresses to the right, as viewed in FIGS. 32-33, to an apex 424C at an end portion. The height of the apex 424C above the radially extending surface 384 is at least about 0.35 mm, and preferably is at least about 0.5 mm. As each boss 380, 380D is seated in a respective lug 328, 328D and rotated in the second direction R2, as viewed in FIG. 23, the dart projection 382C rides along and wedges against the inboard surface 442 (FIG. 24) of the groove 340 in the respective lug 328, 328D to occupy at least a portion of any space between the boss and the inboard surfaces of the lugs. The dart projection 382C forces the tone ring 326 against the outboard wall 444 of the groove 340, and the apex 424C deforms and digs into the inboard surface 442 of the lug 328, 328D. The apex 424C and the side walls 426C of the dart projection 382C are preferably located within the circumferential extent CE2 of the lug 328, 328D, as illustrated in FIG. 25.

It is to be understood that in certain configurations of the tone ring 326, dart projections 382, 382A, 382C could be formed on the bosses 380, 380D such that the dart projections taper from apexes 424, 424A, 424C in an opposite circumferential direction than that shown without affecting the overall concept or operation of the disclosed subject matter.

The disc brake rotor assembly 320 operates in a harsh environment under the vehicle. Contaminants, such as water, brine, road spray or various road salts, can splash onto the disc brake rotor assembly 320 during operation of the vehicle, as is known. The contaminants can potentially create corrosion cells between the disc brake rotor portion 324 and the tone ring 326 in the grooves 340 in lugs 328, 328D. Rust-jacking may then develop in the grooves 340 from the corrosion cells and may damage the tone ring 326 and/or the disc brake rotor portion 324 or render at least one of them inoperable or less effective, causing down time of the heavy-duty vehicle. In order to further minimize the formation of corrosion cells and rust-jacking, the tone ring 326 may be provided with a corrosion resistant coating or treatment.

The corrosion resistant coating or treatment may be a zinc-rich coating, such as the zinc-rich coating 200 described above, applied to all surfaces of the tone ring 326 or selected surfaces or portions. The corrosion resistant coating or treatment may also be applied to the grooves 340 in the lugs 328, 328D of the disc brake rotor portion 324.

Figure 35:
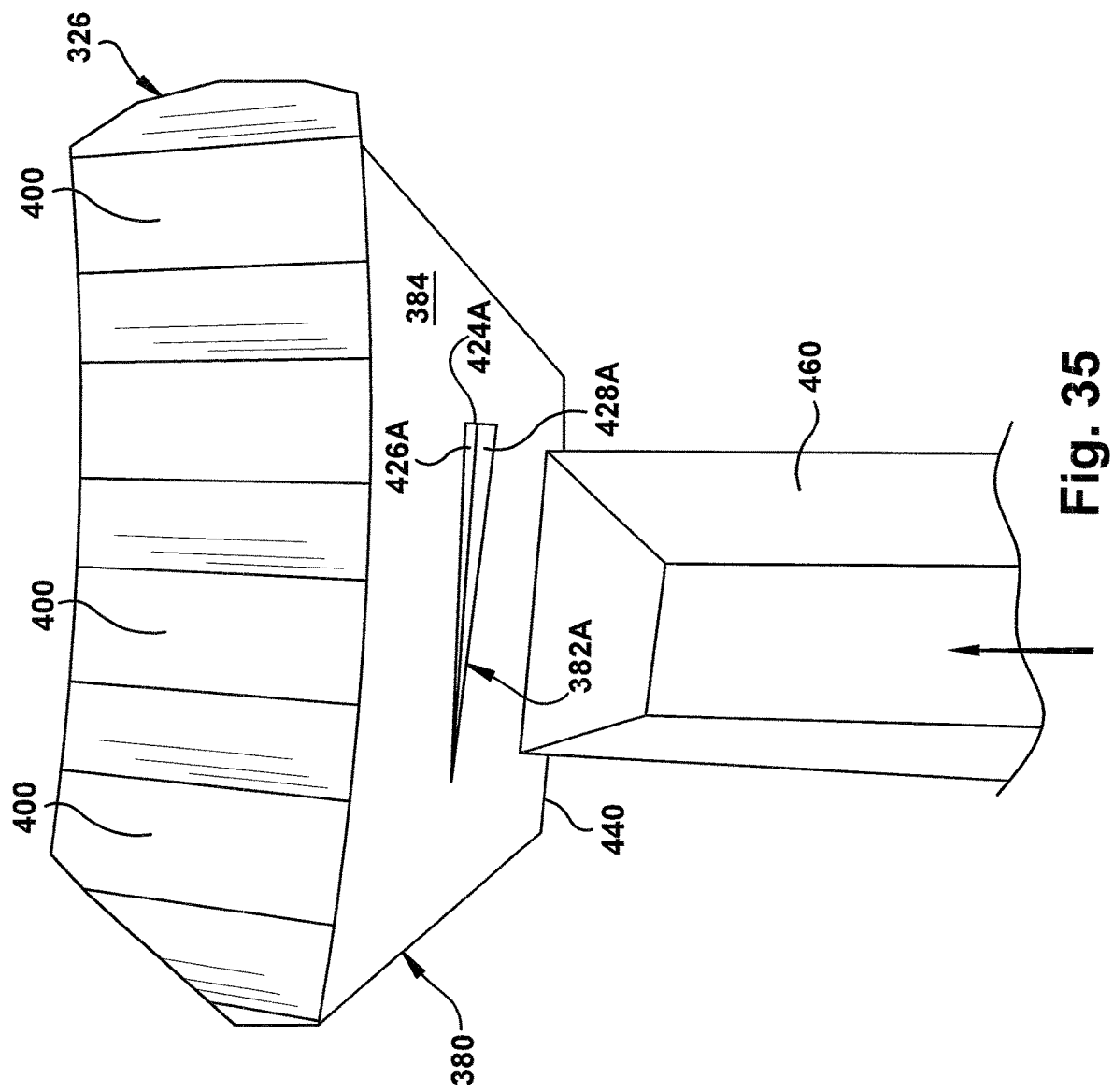
FIG. 35 is an illustration of a method of displacing material of a boss to form a dart projection as viewed in FIGS. 26-28.
Figure 36:
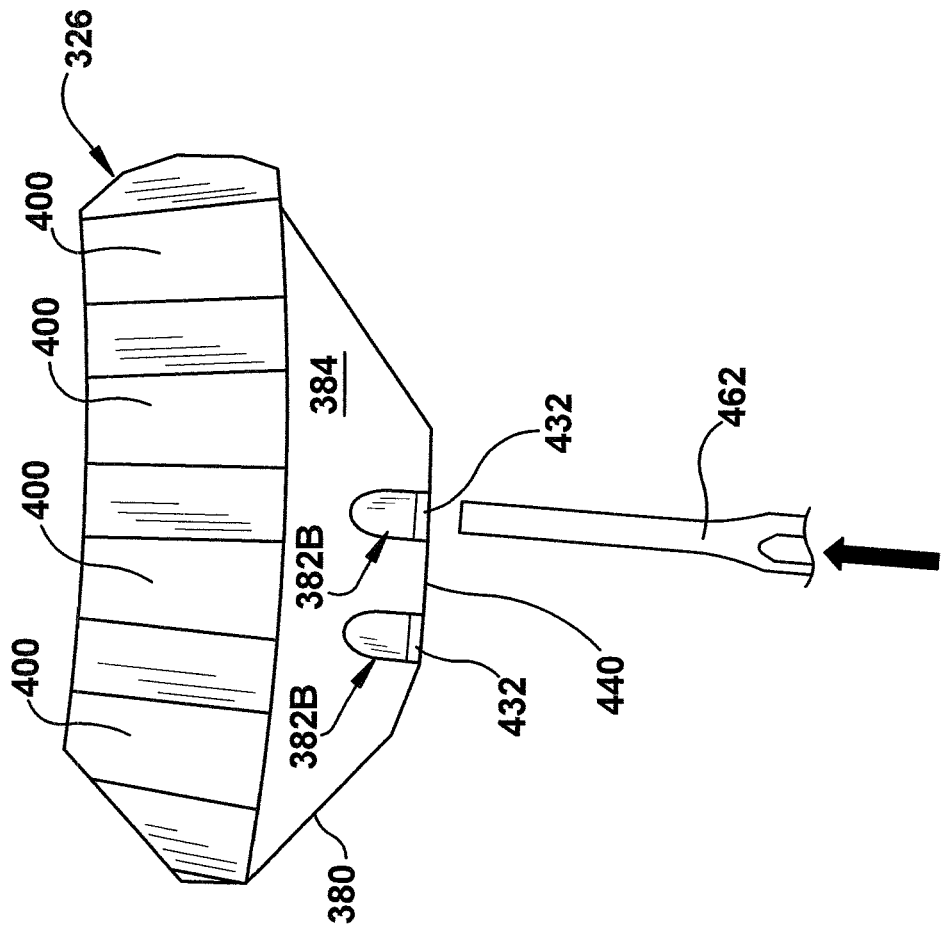
FIG. 36 is an illustration of another method of displacing material of a boss to form a dart projection as viewed in FIGS. 29-31.

Another aspect of the disclosed subject matter provides a method of making the tone ring 326 for attachment to the disc brake rotor portion 324. The method comprises the steps of providing the tone ring body 330, preferably made from tubular steel, with the plurality of bosses 380, 380D formed on the tone ring body or forming the bosses. The dart projection 382A, 382B, and 382C is formed on at least one of the bosses 380, 380D by displacing material of the at least one boss, as illustrated in FIGS. 35-36. The displacing may be done manually or with machine assistance. A suitable tool 460, such as a chisel, is moved preferably in a direction other than normal to the radially extending surface 384 of the boss 380, 380D on which the dart projection 382A, 382C is to be formed. The tool 460 displaces material of the boss 380, 380D to form the dart projection 382A, 382C. Alternatively, a suitable tool 462, such as a punch, is moved preferably in a direction normal to the axially extending surface 440 of the boss 380, 380D on which the dart projection 382B is to be formed. The tool 462 displaces material of the boss 380, 380D to form the dart projection 382B.

The improved tone ring 326 and tone ring attachment structure 322 of the disc brake rotor assembly 320 may be made with any suitable tool and by any suitable method. The improved tone ring 326 and tone ring attachment structure 322 of the disc brake rotor assembly 320 may be applied to any suitable rotor structure and/or tone ring structure.

Thus, the disc brake rotor assembly 320 includes an improved tone ring 326 and tone ring attachment structure 322 for mounting the tone ring to the disc brake rotor portion 324 that completely eliminates the metal roll pin stop structure used in the prior art. The disc brake rotor assembly 320 also includes the improved, more corrosion resistant tone ring 326 made from tubular steel. The dart projections of the tone ring 326 can be formed by displacing material of the tone ring. Thus, the improved tone ring 326 and tone ring attachment structure 322 of the disclosed subject matter overcome drawbacks, limitations and disadvantages found in prior art tone ring and tone ring mounting structures. The disc brake rotor assembly 320 has a relatively inexpensive, relatively quick to produce and corrosion-resistant tone ring attachment structure 322 enabled by the configuration of the tone ring 326.

It is to be understood that the structure and arrangement of the above-described disc brake rotor assembly 120, 320 for heavy-duty vehicles with the improved tone ring 124,326 and attachment structure 121, 322 of the subject disclosure may be altered or rearranged without affecting the overall concept or operation of the subject disclosure. In addition, the disc brake rotor assembly 120, 320 for heavy-duty vehicles with the improved tone ring 124,326 and attachment structure 121, 322 of the subject disclosure may be employed with other types of antilock braking systems than those shown and described above without affecting the overall concept or operation of the subject disclosure. Moreover, while reference has been made generally to a heavy-duty vehicle for the purpose of convenience, it is with the understanding that such reference includes at least trucks, tractor-trailers and semi-trailers, and trailers.

Accordingly, the disc brake rotor assembly 120, 320 for heavy-duty vehicles with the improved tone ring 124,326 and attachment structure 121, 322 of the subject disclosure is simplified, provides an effective, safe, inexpensive, and efficient structure which provides for eliminating difficulties encountered with prior art disc brake rotor assemblies, solves problems and obtains new results.

Certain terms have been used for brevity, clarity and understanding; but no unnecessary limitations are to be implied therefrom beyond the requirements of the prior art, because such terms are used for descriptive purposes only and are intended to be broadly construed. Moreover, the subject disclosure has been described with reference to exemplary aspects. It shall be understood that this description is by way of example and not by way of limitation, as the scope of the subject disclosure is not limited to the exact details shown or described. Features of any aspect of the subject disclosure may be employed with or without any other of the aspect(s). Potential modifications and alterations will occur to others upon a reading and understanding of this disclosure, and it is understood that the subject disclosure includes all such modifications and alterations and equivalents thereof.

What is claimed is:

1. An attachment structure for a disc brake rotor assembly used on a heavy-duty vehicle with an antilock braking system, the attachment structure comprising:
    a disc brake rotor including a disc portion;
    a plurality of circumferentially spaced lugs formed on the disc portion of the disc brake rotor, each one of the lugs formed with a groove;
    a tone ring having a plurality of teeth for disrupting a magnetic field produced by an associated antilock braking system;
    a plurality of bosses formed on the tone ring, each one of the bosses being receivable in a respective one of the grooves in the lugs of the disc portion; and
    a dart projection extending from a surface of at least one of the bosses, the dart projection engaging a surface of the groove in one of the lugs to inhibit relative rotational movement in a first direction and relative axial movement between the tone ring and the disc brake rotor, the tone ring and the disc brake rotor being free of further structure for inhibiting relative rotational movement in the first direction between the tone ring and the disc brake rotor.

2. The attachment structure of claim 1, wherein the dart projection is within a circumferential extent of the groove in the one of the lugs.

3. The attachment structure of claim 2, wherein the dart projection has an apex that is located within the circumferential extent of the groove in the one of the lugs by at least 0.5 mm from a circumferential end surface of the groove.

4. The attachment structure of claim 3, wherein the apex of the dart projection extends from the surface of the at least one of the bosses at least 0.35 mm.

5. The attachment structure of claim 1, wherein the tone ring is formed from tubular steel.

6. The attachment structure of claim 5, wherein the dart projection is formed in the at least one of the plurality of bosses from material displaced from another location of the at least one of the plurality of bosses.

7. The attachment structure of claim 1, wherein the dart projection is formed on a radially extending and substantially planar surface of the at least one of the plurality of bosses.

8. The attachment structure of claim 1, wherein the dart projection has a pair of side walls defining a triangular cross-sectional shape extending from the surface of the at least one of the bosses and increasing in height as the dart projection extends along a length of the surface of the at least one of the bosses in a circumferential direction.

9. The attachment structure of claim 1, wherein at least one of the bosses is formed with a tab, the tab being engageable with one of the lugs to inhibit relative rotational movement between the tone ring and the disc brake rotor in a second direction opposite the first direction.

10. The attachment structure of claim 1, wherein at least one of the bosses has a radial extent less than 4.5 mm.

11. The attachment structure of claim 1 further comprising a zinc-rich coating on the tone ring.

12. The attachment structure of claim 1, wherein the dart projection has a hardness greater than or equal to a hardness of the surface of the groove the dart projection engages.

13. The attachment structure of claim 1, wherein at least one of the lugs is integrally formed with two or more pins extending between an inboard disc and an outboard of the disc portion to form a Y-shaped structure.

14. The attachment structure of claim 1, wherein a ratio of a depth of a root portion of a selected one of the lugs to a depth of a boss retaining portion of the selected one of the lugs is at least 1.0.

15. The attachment structure of claim 1, wherein a ratio of a width of a boss retaining portion of a selected one of the lugs to a depth of the boss retaining portion of the selected one of the lugs is at least 1.0.

16. The attachment structure of claim 1, further including an annular passage extending between at least one of the lugs and an inboard disc of the disc portion and being in fluid communication with an air passage formed between the inboard disc and an outboard disc of the disc portion to thermally isolate the at least one of the lugs from the inboard disc.

17. A tone ring for attachment to a disc brake rotor used on a heavy-duty vehicle with an antilock braking system, the tone ring comprising:
    a body having a plurality of teeth capable of disrupting a magnetic field produced by the antilock braking system;
    a plurality of bosses formed on the body, each one of the bosses being receivable in a lug formed on the disc brake rotor; and
    a dart projection extending from a surface of at least one of the bosses, the dart projection being engageable with a surface of the lug of the disc brake rotor for inhibiting relative axial movement and relative rotational movement in a first direction between the tone ring and the disc brake rotor, the tone ring being free of further structure for inhibiting relative rotational movement in the first direction between the tone ring and the disc brake rotor.

18. The tone ring of claim 17, wherein the dart projection has a length within a circumferential extent of the groove of the lug.

19. The tone ring of claim 18, wherein the dart projection has an apex that can be positioned within the circumferential extent of the lug with the surface the dart projection engages by at least 0.5 mm from a circumferential end surface of the one of the lugs.

20. The tone ring of claim 19, wherein the apex of the dart projection extends from the surface of the at least one of the bosses at least 0.35 mm.

21. The tone ring of claim 17, wherein the tone ring is formed from tubular steel.

22. The tone ring of claim 21, wherein the dart projection is formed at a location on the at least one of the plurality of bosses from material displaced from another location of the at least one of the bosses.

23. The tone ring of claim 17, wherein the dart projection is formed on a substantially planar surface of the at least one of the bosses.

24. The tone ring of claim 17, wherein the dart projection has a pair of side walls defining a triangular cross-sectional shape extending from the surface of the at least one of the bosses, and increasing in height as the dart projection extends along a length of the surface of the at least one of the bosses in a circumferential direction.

25. The tone ring of claim 17, further including a tab formed on at least one of the bosses, the tab being engageable with one of the lugs to inhibit relative rotational movement between the tone ring and the disc brake rotor in a second direction opposite the first direction.

26. The tone ring of claim 17, wherein the at least one bosses has a radial extent less than 4.5 mm.

27. The tone ring of claim 17, further comprising a zinc-rich coating on the tone ring.

28. The tone ring attachment of claim 17, wherein the dart projection has a hardness greater than or equal to a hardness of the lug to enable the dart projection deforming the lug to inhibit relative rotational movement between the tone ring and the disc brake rotor in the first direction.

29. An attachment structure for a disc brake rotor assembly used on a heavy-duty vehicle with an antilock braking system, the attachment structure comprising:
   a disc brake rotor including a disc portion;
   a plurality of circumferentially spaced lugs formed on the disc portion, each one of the lugs being formed with a groove for receiving a tone ring, at least one of the lugs including a boss retaining portion and a root portion, wherein a ratio of a depth of the root portion to a depth of the boss retaining portion is at least 2.0.

30. The attachment structure of claim 29, wherein a ratio of a width of the boss retaining portion to the depth of the boss retaining portion is at least 2.0.

31. An attachment structure for a disc brake rotor assembly used on a heavy-duty vehicle with an antilock braking system, the attachment structure comprising:
   a disc brake rotor including a disc portion;
   a plurality of circumferentially spaced lugs formed on the disc portion, each one of the lugs being formed with a groove for retaining a tone ring, at least one of the lugs including a boss retaining portion and a root portion, wherein a ratio of a width of the boss retaining portion to a depth of the boss retaining portion is at least 2.0.

32. The tone ring attachment of claim 31, wherein a ratio of a depth of the root portion to a depth of the boss retaining portion is at least 2.0.

33. The tone ring attachment of claim 31, wherein one or more surfaces defining the groove of each one the lugs are coated with a zinc-rich coating.

34. An attachment structure for a disc brake rotor assembly used on a heavy-duty vehicle with an antilock braking system, the attachment structure comprising:
   a disc brake rotor including a disc portion;
   a plurality of circumferentially spaced lugs formed on the disc portion of the disc brake rotor, each one of the lugs formed with a groove, each one of the lugs formed from a material having a first hardness;
   a tone ring having a plurality of teeth for disrupting a magnetic field produced by an associated antilock braking system;
   a plurality of bosses formed on the tone ring, each one of the bosses being receivable in a respective one of the grooves in the lugs of the disc portion; and
   a dart projection extending from a surface of at least one of the bosses, the dart projection engaging a surface of the groove in one of the lugs to inhibit relative rotational movement in a first direction and relative axial movement between the tone ring and the disc brake rotor, the dart projection formed from a material having a second hardness greater than or equal to the first hardness of the lugs, whereby the dart projection digs into and deforms the surface of the groove in one of the lugs to inhibit relative rotational movement in the first direction.

* * * * *